US009990615B2

(12) United States Patent
Rivera et al.

(10) Patent No.: US 9,990,615 B2
(45) Date of Patent: *Jun. 5, 2018

(54) DIGITAL JUKEBOX DEVICE WITH KARAOKE AND/OR PHOTO BOOTH FEATURES, AND ASSOCIATED METHODS

(71) Applicant: TouchTunes Music Corporation, New York, NY (US)

(72) Inventors: Ed Rivera, New York, NY (US); Michael Tooker, Point Claire (CA); Francois Guy, Montreal (CA); Francois Beaumier, Montreal (CA); Charles Battle, New York, NY (US); Mounir Khenfir, Montreal (CA); Charles Garneau, Bois-des-Filion (CA)

(73) Assignee: TouchTunes Music Corporation, New York, NY (US)

( * ) Notice: Subject to any disclaimer, the term of this patent is extended or adjusted under 35 U.S.C. 154(b) by 413 days.

This patent is subject to a terminal disclaimer.

(21) Appl. No.: 14/693,377

(22) Filed: Apr. 22, 2015

(65) Prior Publication Data

US 2015/0227905 A1    Aug. 13, 2015

Related U.S. Application Data

(63) Continuation of application No. 14/075,853, filed on Nov. 8, 2013, now Pat. No. 9,041,784, which is a (Continued)

(51) Int. Cl.
*H04N 7/18* (2006.01)
*G06Q 20/14* (2012.01)
(Continued)

(52) U.S. Cl.
CPC ......... *G06Q 20/145* (2013.01); *G06F 3/0482* (2013.01); *G06F 3/04842* (2013.01);
(Continued)

(58) Field of Classification Search
CPC .. G06F 3/0482; G06F 3/04842; G07F 17/305; G07F 17/32; H04N 21/42203;
(Continued)

(56) References Cited

U.S. PATENT DOCUMENTS

| | | |
|---|---|---|
| 3,807,541 A | 4/1974 | Kortenhaus |
| 3,982,620 A | 9/1976 | Kotenhaus |

(Continued)

FOREIGN PATENT DOCUMENTS

| | | |
|---|---|---|
| AU | 199954012 | 4/2000 |
| CN | 1340939 | 3/2002 |

(Continued)

OTHER PUBLICATIONS

U.S. Appl. No. 08/817,426, filed Jun. 19, 1997, 2002-0010788, Audiovisual Distribution System.
(Continued)

*Primary Examiner* — Gims Philippe
(74) *Attorney, Agent, or Firm* — Nixon & Vanderhye, P.C.

(57) ABSTRACT

Certain exemplary embodiments relate to entertainment systems and, more particularly, certain exemplary embodiments relate to jukebox systems that incorporate digital downloading jukebox features along with karaoke jukebox and/or photo booth features. A combined karaoke/photo booth/jukebox may enable more integrated performance-like experiences in an in-home or out-of-home location or venue. By leveraging vast audio media libraries, trusted rights-respecting network infrastructure, and on-site image/video capturing from integrated recorders and/or remote portable devices, a more sociable experience may be created for karaoke jukebox patrons, e.g., where custom content can be generated and shared in a safe and legally appropriate manner.

25 Claims, 25 Drawing Sheets

Related U.S. Application Data continuation of application No. 13/621,922, filed on Sep. 18, 2012, now Pat. No. 9,324,064.

(60) Provisional application No. 61/584,750, filed on Jan. 9, 2012, provisional application No. 61/536,015, filed on Sep. 18, 2011.

(51) Int. Cl.

| | | |
|---|---|---|
| *G11B 27/00* | (2006.01) | |
| *G11B 27/031* | (2006.01) | |
| *H04N 21/214* | (2011.01) | |
| *H04N 21/41* | (2011.01) | |
| *H04N 21/422* | (2011.01) | |
| *G06Q 30/06* | (2012.01) | |
| *G10H 1/36* | (2006.01) | |
| *H04N 21/43* | (2011.01) | |
| *H04N 21/439* | (2011.01) | |
| *H04N 21/81* | (2011.01) | |
| *G06F 3/0482* | (2013.01) | |
| *G06F 3/0484* | (2013.01) | |
| *G06Q 20/12* | (2012.01) | |

(52) U.S. Cl.
CPC ....... *G06Q 20/123* (2013.01); *G06Q 30/0621* (2013.01); *G10H 1/365* (2013.01); *G11B 27/002* (2013.01); *G11B 27/031* (2013.01); *H04N 21/2143* (2013.01); *H04N 21/4104* (2013.01); *H04N 21/4126* (2013.01); *H04N 21/42203* (2013.01); *H04N 21/4302* (2013.01); *H04N 21/439* (2013.01); *H04N 21/8113* (2013.01); *G10H 2220/106* (2013.01); *G10H 2230/015* (2013.01)

(58) Field of Classification Search
CPC ........... H04N 21/2143; H04N 21/4104; H04N 21/4126
USPC .......................................................... 348/61
See application file for complete search history.

(56) References Cited

U.S. PATENT DOCUMENTS

| | | |
|---|---|---|
| 4,008,369 A | 2/1977 | Theurer et al. |
| 4,186,438 A | 1/1980 | Benson |
| 4,232,295 A | 11/1980 | McConnell |
| 4,335,809 A | 6/1982 | Wain |
| 4,335,908 A | 6/1982 | Burge |
| 4,336,935 A | 6/1982 | Goldfarb |
| 4,356,509 A | 10/1982 | Skerlos et al. |
| 4,369,442 A | 1/1983 | Werth et al. |
| 4,375,287 A | 3/1983 | Smith |
| 4,412,292 A | 10/1983 | Sedam |
| 4,413,260 A | 11/1983 | Siegel et al. |
| 4,521,014 A | 6/1985 | Sitrick |
| 4,528,643 A | 7/1985 | Freeny |
| 4,558,413 A | 12/1985 | Schmidt et al. |
| 4,572,509 A | 2/1986 | Sitrick |
| 4,577,333 A | 3/1986 | Lewis et al. |
| 4,582,324 A | 4/1986 | Koza |
| 4,588,187 A | 5/1986 | Dell |
| 4,593,904 A | 6/1986 | Graves |
| 4,597,058 A | 6/1986 | Izumi |
| 4,636,951 A | 1/1987 | Harlick |
| 4,652,998 A | 3/1987 | Koza |
| 4,654,799 A | 3/1987 | Ogaki |
| 4,658,093 A | 4/1987 | Hellman |
| 4,667,802 A | 5/1987 | Verduin et al. |
| 4,674,055 A | 6/1987 | Ogaki et al. |
| 4,675,538 A | 6/1987 | Epstein |
| 4,677,311 A | 6/1987 | Morita |
| 4,677,565 A | 6/1987 | Ogaki |
| 4,703,465 A | 10/1987 | Parker |
| 4,704,725 A | 11/1987 | Harvey et al. |
| 4,707,804 A | 11/1987 | Leal |
| 4,722,053 A | 1/1988 | Dubno et al. |
| 4,761,684 A | 8/1988 | Clark et al. |
| 4,766,581 A | 8/1988 | Korn et al. |
| 4,787,050 A | 11/1988 | Suzuki |
| 4,792,849 A | 12/1988 | McCalley et al. |
| 4,807,052 A | 2/1989 | Amano |
| 4,811,325 A | 3/1989 | Sharples |
| 4,814,972 A | 3/1989 | Winter et al. |
| 4,825,054 A | 4/1989 | Rust |
| 4,829,570 A | 5/1989 | Schotz |
| 4,852,154 A | 7/1989 | Lewis et al. |
| 4,857,714 A | 8/1989 | Sunyich |
| 4,868,832 A | 9/1989 | Marrington |
| 4,885,694 A | 12/1989 | Pray et al. |
| 4,905,279 A | 2/1990 | Nishio |
| 4,920,432 A | 4/1990 | Eggers |
| 4,922,420 A | 5/1990 | Nakagawa |
| 4,924,378 A | 5/1990 | Hershey |
| 4,926,485 A | 5/1990 | Yamashita |
| 4,937,807 A | 6/1990 | Weitz |
| 4,949,187 A | 8/1990 | Cohen |
| 4,953,159 A | 8/1990 | Hayden et al. |
| 4,956,768 A | 9/1990 | Sidi |
| 4,958,835 A | 9/1990 | Tashiro |
| 4,965,675 A | 10/1990 | Masashi et al. |
| 4,977,593 A | 12/1990 | Ballance |
| 4,999,806 A | 3/1991 | Chernow |
| 5,008,814 A | 4/1991 | Mathur |
| 5,012,121 A | 4/1991 | Hammond |
| 5,027,426 A | 6/1991 | Chiocca |
| 5,041,921 A | 8/1991 | Scheffler |
| 5,046,093 A | 9/1991 | Wachob |
| 5,053,758 A | 10/1991 | Cornett et al. |
| 5,058,089 A | 10/1991 | Yoshimaru et al. |
| 5,077,607 A | 12/1991 | Johnson et al. |
| 5,081,534 A | 1/1992 | Geiger et al. |
| 5,101,451 A | 3/1992 | Ash et al. |
| 5,101,499 A | 3/1992 | Streck et al. |
| 5,106,097 A | 4/1992 | Levine |
| 5,117,407 A | 5/1992 | Vogel |
| 5,128,862 A | 7/1992 | Mueller |
| 5,138,712 A | 8/1992 | Corbin |
| 5,148,159 A | 9/1992 | Clark et al. |
| 5,155,847 A | 10/1992 | Kirouac et al. |
| 5,159,678 A | 10/1992 | Wengelski et al. |
| 5,163,131 A | 11/1992 | Row et al. |
| 5,166,886 A | 11/1992 | Molnar et al. |
| 5,172,413 A | 12/1992 | Bradley et al. |
| 5,180,309 A | 1/1993 | Egnor |
| 5,189,630 A | 2/1993 | Barstow et al. |
| 5,191,573 A | 3/1993 | Hair |
| 5,191,611 A | 3/1993 | Lang |
| 5,192,999 A | 3/1993 | Graczyk |
| 5,197,094 A | 3/1993 | Tillery |
| 5,203,028 A | 4/1993 | Shiraishi |
| 5,210,854 A | 5/1993 | Beaverton et al. |
| 5,214,761 A | 5/1993 | Barrett et al. |
| 5,222,134 A | 6/1993 | Waite et al. |
| 5,228,015 A | 7/1993 | Arbiter et al. |
| 5,231,157 A | 7/1993 | Herzig et al. |
| 5,237,157 A | 8/1993 | Kaplan |
| 5,237,322 A | 8/1993 | Heberle |
| 5,239,480 A | 8/1993 | Huegel |
| 5,250,747 A | 10/1993 | Tsumura |
| 5,252,775 A | 10/1993 | Urano |
| 5,260,999 A | 11/1993 | Wyman |
| 5,261,104 A | 11/1993 | Bertram et al. |
| 5,262,875 A | 11/1993 | Mincer et al. |
| 5,276,866 A | 1/1994 | Paolini |
| 5,278,904 A | 1/1994 | Servi |
| 5,282,028 A | 1/1994 | Johnson et al. |
| 5,289,476 A | 2/1994 | Johnson et al. |
| 5,289,546 A | 2/1994 | Hetherington |
| 5,315,161 A | 5/1994 | Robinson |
| 5,315,711 A | 5/1994 | Barone et al. |
| 5,319,455 A | 6/1994 | Hoarty et al. |

(56) References Cited

U.S. PATENT DOCUMENTS

| | | |
|---|---|---|
| 5,321,846 A | 6/1994 | Yokota et al. |
| 5,327,230 A | 7/1994 | Dockery |
| 5,335,313 A | 8/1994 | Douglas |
| 5,339,095 A | 8/1994 | Redford |
| 5,339,413 A | 8/1994 | Koval |
| 5,341,350 A | 8/1994 | Frank |
| 5,355,302 A | 10/1994 | Martin et al. |
| 5,357,276 A | 10/1994 | Banker |
| 5,369,778 A | 11/1994 | SanSoucie |
| 5,375,206 A | 12/1994 | Hunter |
| 5,386,251 A | 1/1995 | Movshovich |
| 5,389,950 A | 2/1995 | Martin et al. |
| 5,404,505 A | 4/1995 | Levinson |
| 5,406,634 A | 4/1995 | Anderson et al. |
| 5,408,417 A | 4/1995 | Wilder |
| 5,410,326 A | 4/1995 | Goldstein |
| 5,410,703 A | 4/1995 | Nilsson et al. |
| 5,418,713 A | 5/1995 | Allen |
| 5,420,923 A | 5/1995 | Beyers |
| 5,428,252 A | 6/1995 | Walker |
| 5,428,606 A | 6/1995 | Moskowitz |
| 5,431,492 A | 7/1995 | Rothschild |
| 5,440,632 A | 8/1995 | Bacon et al. |
| 5,444,499 A | 8/1995 | Saitoh |
| 5,445,295 A | 8/1995 | Brown |
| 5,455,619 A | 10/1995 | Truckenmiller et al. |
| 5,455,926 A | 10/1995 | Keele |
| 5,457,305 A | 10/1995 | Akel |
| 5,465,213 A | 11/1995 | Ross |
| 5,465,329 A | 11/1995 | Whistler |
| 5,467,326 A | 11/1995 | Miyashita et al. |
| 5,469,370 A | 11/1995 | Ostrover et al. |
| 5,469,573 A | 11/1995 | McGill et al. |
| 5,471,576 A | 11/1995 | Yee |
| 5,473,746 A | 12/1995 | Pritt et al. |
| 5,475,835 A | 12/1995 | Hickey |
| 5,481,509 A | 1/1996 | Knowles |
| 5,487,167 A | 1/1996 | Dinallo et al. |
| 5,489,103 A | 2/1996 | Okamoto |
| 5,495,610 A | 2/1996 | Shing |
| 5,496,178 A | 3/1996 | Back |
| 5,499,921 A | 3/1996 | Sone |
| 5,511,000 A | 4/1996 | Kaloi |
| 5,513,117 A | 4/1996 | Small |
| 5,515,173 A | 5/1996 | Mankovitz et al. |
| 5,519,435 A | 5/1996 | Anderson |
| 5,519,457 A | 5/1996 | Nishigaki et al. |
| 5,521,631 A | 5/1996 | Budow et al. |
| 5,521,918 A | 5/1996 | Kim |
| 5,521,922 A | 5/1996 | Fujinami et al. |
| 5,523,781 A | 6/1996 | Brusaw |
| 5,528,732 A | 6/1996 | Klotz |
| 5,532,734 A | 7/1996 | Goertz |
| 5,532,991 A | 7/1996 | Sasaki |
| 5,546,039 A | 8/1996 | Hewitt et al. |
| 5,548,729 A | 8/1996 | Akiyoshi |
| 5,550,577 A | 8/1996 | Verbiest |
| 5,554,968 A | 9/1996 | Lee |
| 5,555,244 A | 9/1996 | Gupta |
| 5,557,515 A | 9/1996 | Abbruzzese et al. |
| 5,557,541 A | 9/1996 | Schulhof |
| 5,557,724 A | 9/1996 | Sampat et al. |
| 5,559,505 A | 9/1996 | McNair |
| 5,559,549 A | 9/1996 | Hendricks |
| 5,559,714 A | 9/1996 | Banks et al. |
| 5,561,709 A | 10/1996 | Remillard |
| 5,565,908 A | 10/1996 | Ahmad |
| 5,566,237 A | 10/1996 | Dobbs |
| 5,570,363 A | 10/1996 | Holm |
| 5,578,999 A | 11/1996 | Matsuzawa et al. |
| 5,579,404 A | 11/1996 | Fielder et al. |
| 5,583,561 A | 12/1996 | Baker et al. |
| 5,583,937 A | 12/1996 | Ullrich et al. |
| 5,583,994 A | 12/1996 | Rangan |
| 5,583,995 A | 12/1996 | Gardner et al. |
| 5,592,482 A | 1/1997 | Abraham |
| 5,592,551 A | 1/1997 | Lett |
| 5,592,611 A | 1/1997 | Midgely et al. |
| 5,594,509 A | 1/1997 | Florin |
| 5,596,702 A | 1/1997 | Stucka et al. |
| 5,607,099 A | 3/1997 | Yeh et al. |
| 5,612,581 A | 3/1997 | Kageyama |
| 5,613,909 A | 3/1997 | Stelovsky |
| 5,616,876 A | 4/1997 | Cluts |
| 5,617,565 A | 4/1997 | Augenbraun et al. |
| 5,619,247 A | 4/1997 | Russo |
| 5,619,249 A | 4/1997 | Billock et al. |
| 5,619,250 A | 4/1997 | McClellan et al. |
| 5,619,698 A | 4/1997 | Lillich |
| 5,623,666 A | 4/1997 | Pike |
| 5,631,693 A | 5/1997 | Wunderlich et al. |
| 5,636,276 A | 6/1997 | Brugger |
| 5,638,426 A | 6/1997 | Lewis |
| 5,642,337 A | 6/1997 | Oskay et al. |
| 5,643,831 A | 7/1997 | Ochiai et al. |
| 5,644,714 A | 7/1997 | Kikinis |
| 5,644,766 A | 7/1997 | Coy |
| 5,654,714 A | 8/1997 | Takahashi et al. |
| 5,659,466 A | 8/1997 | Norris et al. |
| 5,661,517 A | 8/1997 | Budow et al. |
| 5,661,802 A | 8/1997 | Nilssen |
| 5,663,756 A | 9/1997 | Blahut et al. |
| 5,668,592 A | 9/1997 | Spaulding |
| 5,668,778 A | 9/1997 | Quazi |
| 5,668,788 A | 9/1997 | Allison |
| 5,675,734 A | 10/1997 | Hair |
| 5,680,533 A | 10/1997 | Yamato et al. |
| 5,684,716 A | 11/1997 | Freeman |
| 5,689,641 A | 11/1997 | Ludwig et al. |
| 5,691,778 A | 11/1997 | Song |
| 5,691,964 A | 11/1997 | Niederlein et al. |
| 5,696,914 A | 12/1997 | Nahaboo et al. |
| 5,697,844 A | 12/1997 | Von Kohorn |
| 5,703,795 A | 12/1997 | Mankowitz |
| 5,708,811 A | 1/1998 | Arendt |
| 5,712,976 A | 1/1998 | Falcon et al. |
| 5,713,024 A | 1/1998 | Halladay |
| 5,715,416 A | 2/1998 | Baker |
| 5,717,452 A | 2/1998 | Janin et al. |
| 5,721,583 A | 2/1998 | Harada et al. |
| 5,721,815 A | 2/1998 | Ottesen et al. |
| 5,721,827 A | 2/1998 | Logan et al. |
| 5,721,829 A | 2/1998 | Dunn et al. |
| 5,724,525 A | 3/1998 | Beyers et al. |
| 5,726,909 A | 3/1998 | Krikorian |
| 5,734,719 A | 3/1998 | Tsevdos et al. |
| 5,734,961 A | 3/1998 | Castille |
| 5,739,451 A | 4/1998 | Winksy et al. |
| 5,743,745 A | 4/1998 | Reintjes |
| 5,745,391 A | 4/1998 | Topor |
| 5,748,254 A | 5/1998 | Harrison et al. |
| 5,748,468 A | 5/1998 | Notenboom et al. |
| 5,748,954 A | 5/1998 | Mauldin |
| 5,751,336 A | 5/1998 | Aggarwal et al. |
| 5,752,232 A | 5/1998 | Basore et al. |
| 5,757,936 A | 5/1998 | Lee |
| 5,758,340 A | 5/1998 | Nail |
| 5,761,655 A | 6/1998 | Hoffman |
| 5,762,552 A | 6/1998 | Vuong |
| 5,774,527 A | 6/1998 | Handelman et al. |
| 5,774,668 A | 6/1998 | Choqiuer |
| 5,774,672 A | 6/1998 | Funahashi |
| 5,778,395 A | 7/1998 | Whiting |
| 5,781,889 A | 7/1998 | Martin et al. |
| 5,786,784 A | 7/1998 | Gaudichon |
| 5,790,172 A | 8/1998 | Imanaka |
| 5,790,671 A | 8/1998 | Cooper |
| 5,790,856 A | 8/1998 | Lillich |
| 5,790,935 A | 8/1998 | Payton |
| 5,793,364 A | 8/1998 | Bolanos et al. |
| 5,793,980 A | 8/1998 | Glaser |
| 5,798,785 A | 8/1998 | Hendricks |
| 5,802,283 A | 9/1998 | Grady et al. |
| 5,802,558 A | 9/1998 | Pierce |

(56) References Cited

U.S. PATENT DOCUMENTS

| | | |
|---|---|---|
| 5,802,599 A | 9/1998 | Cabrera |
| 5,805,804 A | 9/1998 | Laursen et al. |
| 5,808,224 A | 9/1998 | Kato |
| 5,809,246 A | 9/1998 | Goldman |
| 5,812,643 A | 9/1998 | Schelberg et al. |
| 5,815,146 A | 9/1998 | Youden et al. |
| 5,825,884 A | 10/1998 | Zdepski et al. |
| 5,828,343 A | 10/1998 | MacDonald et al. |
| 5,831,555 A | 11/1998 | Yu et al. |
| 5,831,663 A | 11/1998 | Waterhouse et al. |
| 5,832,024 A | 11/1998 | Schotz et al. |
| 5,832,287 A | 11/1998 | Atalla |
| 5,835,843 A | 11/1998 | Haddad |
| 5,842,869 A | 12/1998 | McGregor et al. |
| 5,845,104 A | 12/1998 | Rao |
| 5,845,256 A | 12/1998 | Pescitelli et al. |
| 5,848,398 A | 12/1998 | Martin |
| 5,851,149 A | 12/1998 | Xidos et al. |
| 5,854,887 A | 12/1998 | Kindell |
| 5,857,020 A | 1/1999 | Peterson |
| 5,857,707 A | 1/1999 | Devlin |
| 5,862,324 A | 1/1999 | Collins |
| 5,864,811 A | 1/1999 | Tran et al. |
| 5,864,868 A | 1/1999 | Contois |
| 5,864,870 A | 1/1999 | Guck |
| 5,867,714 A | 2/1999 | Todd |
| 5,870,721 A | 2/1999 | Norris |
| 5,880,386 A | 3/1999 | Wachi et al. |
| 5,880,769 A | 3/1999 | Nemirofsky et al. |
| 5,884,028 A | 3/1999 | Kindell |
| 5,884,298 A | 3/1999 | Smith |
| 5,887,139 A | 3/1999 | Madison, Jr. et al. |
| 5,887,193 A | 3/1999 | Takahashi |
| 5,893,162 A | 4/1999 | Lau et al. |
| 5,895,455 A | 4/1999 | Bellinger et al. |
| 5,896,094 A | 4/1999 | Narisada et al. |
| 5,903,266 A | 5/1999 | Berstis et al. |
| 5,913,040 A | 6/1999 | Rakavy |
| 5,914,712 A | 6/1999 | Sartain et al. |
| 5,915,094 A | 6/1999 | Kouloheris |
| 5,915,238 A | 6/1999 | Tjaden |
| 5,917,537 A | 6/1999 | Lightfoot |
| 5,917,835 A | 6/1999 | Barrett |
| 5,918,213 A | 6/1999 | Bernard et al. |
| 5,920,700 A | 7/1999 | Gordon et al. |
| 5,920,702 A | 7/1999 | Johnson |
| 5,923,885 A | 7/1999 | Johnson |
| 5,926,531 A | 7/1999 | Petite |
| 5,926,624 A | 7/1999 | Katz et al. |
| 5,930,765 A | 7/1999 | Martin |
| 5,931,908 A | 8/1999 | Gerba |
| 5,933,090 A | 8/1999 | Christenson |
| 5,940,504 A | 8/1999 | Griswold |
| 5,949,411 A | 9/1999 | Doerr et al. |
| 5,949,688 A | 9/1999 | Montoya |
| 5,953,429 A | 9/1999 | Wakai et al. |
| 5,956,716 A | 9/1999 | Kenner et al. |
| 5,959,869 A | 9/1999 | Miller |
| 5,959,945 A | 9/1999 | Kleiman |
| 5,960,167 A | 9/1999 | Roberts et al. |
| 5,963,916 A | 10/1999 | Kaplan |
| 5,966,495 A | 10/1999 | Takahashi |
| 5,970,467 A | 10/1999 | Alavi |
| 5,978,855 A | 11/1999 | Metz et al. |
| 5,978,912 A | 11/1999 | Rakavy et al. |
| 5,980,261 A | 11/1999 | Mino et al. |
| 5,999,499 A | 12/1999 | Pines et al. |
| 5,999,624 A | 12/1999 | Hopkins |
| 6,002,720 A | 12/1999 | Yurt |
| 6,005,599 A | 12/1999 | Asai et al. |
| 6,008,735 A | 12/1999 | Chiloyan et al. |
| 6,009,274 A | 12/1999 | Fletcher |
| 6,011,758 A | 1/2000 | Dockes et al. |
| 6,018,337 A | 1/2000 | Peters |
| 6,018,726 A | 1/2000 | Tsumura |
| 6,021,386 A | 2/2000 | Davis |
| 6,023,705 A | 2/2000 | Bellinger et al. |
| 6,025,868 A | 2/2000 | Russo |
| 6,034,925 A | 3/2000 | Wehmeyer |
| 6,038,591 A | 3/2000 | Wolfe et al. |
| 6,040,829 A | 3/2000 | Croy et al. |
| 6,041,354 A | 3/2000 | Biliris et al. |
| 6,049,891 A | 4/2000 | Inamoto |
| 6,054,987 A | 4/2000 | Richardson |
| 6,055,573 A | 4/2000 | Gardenswartz et al. |
| 6,057,874 A | 5/2000 | Michaud |
| 6,069,672 A | 5/2000 | Claassen |
| 6,072,982 A | 6/2000 | Haddad |
| 6,107,937 A | 8/2000 | Hamada |
| 6,118,450 A | 9/2000 | Proehl et al. |
| 6,124,804 A | 9/2000 | Kitao et al. |
| 6,131,088 A | 10/2000 | Hill |
| 6,131,121 A | 10/2000 | Mattaway et al. |
| 6,134,547 A | 10/2000 | Huxley et al. |
| 6,138,150 A | 10/2000 | Nichols et al. |
| 6,148,142 A | 11/2000 | Anderson |
| 6,151,077 A | 11/2000 | Vogel et al. |
| 6,151,634 A | 11/2000 | Glaser |
| 6,154,207 A | 11/2000 | Farris et al. |
| 6,157,935 A | 12/2000 | Tran et al. |
| 6,161,059 A | 12/2000 | Tedesco et al. |
| 6,170,060 B1 | 1/2001 | Mott et al. |
| 6,173,172 B1 | 1/2001 | Masuda et al. |
| 6,175,861 B1 | 1/2001 | Williams, Jr. et al. |
| 6,182,126 B1 | 1/2001 | Nathan et al. |
| 6,185,184 B1 | 2/2001 | Mattaway et al. |
| 6,185,619 B1 | 2/2001 | Joffe et al. |
| 6,191,780 B1 | 2/2001 | Martin et al. |
| 6,192,340 B1 | 2/2001 | Abecassis |
| 6,195,732 B1 | 2/2001 | Adams et al. |
| 6,198,408 B1 | 3/2001 | Cohen |
| 6,202,060 B1 | 3/2001 | Tran |
| 6,209,060 B1 | 3/2001 | Machida |
| 6,212,138 B1 | 4/2001 | Kalis et al. |
| 6,216,175 B1 | 4/2001 | Sliger et al. |
| 6,216,227 B1 | 4/2001 | Goldstein et al. |
| 6,219,692 B1 | 4/2001 | Stiles |
| 6,223,209 B1 | 4/2001 | Watson |
| 6,226,412 B1 | 5/2001 | Schwab |
| 6,226,715 B1 | 5/2001 | Van Der Wolf et al. |
| 6,240,550 B1 | 5/2001 | Nathan et al. |
| 6,243,725 B1 | 6/2001 | Hempleman et al. |
| 6,247,022 B1 | 6/2001 | Yankowski |
| 6,256,773 B1 | 7/2001 | Bowman-Amuah |
| 6,262,569 B1 | 7/2001 | Carr et al. |
| 6,280,327 B1 | 8/2001 | Leifer et al. |
| 6,282,709 B1 | 8/2001 | Reha et al. |
| 6,288,688 B1 | 9/2001 | Hughes et al. |
| 6,288,991 B1 | 9/2001 | Kajiyama et al. |
| 6,289,382 B1 | 9/2001 | Bowman-Amuah |
| 6,292,443 B1 | 9/2001 | Awazu et al. |
| 6,298,373 B1 | 10/2001 | Burns et al. |
| 6,301,710 B1 | 10/2001 | Fujiwara |
| 6,302,793 B1 | 10/2001 | Fertitta et al. |
| 6,308,204 B1 | 10/2001 | Nathan et al. |
| 6,311,214 B1 | 10/2001 | Rhoads |
| 6,315,572 B1 | 11/2001 | Glaser |
| 6,323,911 B1 | 11/2001 | Schein et al. |
| 6,332,025 B2 | 12/2001 | Takahashi et al. |
| 6,336,219 B1 | 1/2002 | Nathan |
| 6,341,166 B1 | 1/2002 | Basel |
| 6,344,862 B1 | 2/2002 | Williams et al. |
| 6,346,951 B1 | 2/2002 | Mastronardi |
| 6,353,820 B1 | 3/2002 | Edwards et al. |
| 6,356,971 B1 | 3/2002 | Katz et al. |
| 6,359,616 B1 | 3/2002 | Ogura et al. |
| 6,359,661 B1 | 3/2002 | Nickum |
| 6,370,580 B2 | 4/2002 | Kriegsman |
| 6,381,575 B1 | 4/2002 | Martin et al. |
| 6,384,737 B1 | 5/2002 | Hsu et al. |
| 6,393,584 B1 | 5/2002 | McLaren et al. |
| 6,396,480 B1 | 5/2002 | Schindler et al. |
| 6,397,189 B1 | 5/2002 | Martin et al. |
| 6,407,987 B1 | 6/2002 | Abraham |

(56) References Cited

U.S. PATENT DOCUMENTS

| | | |
|---|---|---|
| 6,408,435 B1 | 6/2002 | Sato |
| 6,408,437 B1 | 6/2002 | Hendricks et al. |
| 6,421,651 B1 | 7/2002 | Tedesco et al. |
| 6,425,125 B1 | 7/2002 | Fries et al. |
| 6,430,537 B1 | 8/2002 | Tedesco et al. |
| 6,430,738 B1 | 8/2002 | Gross et al. |
| 6,434,678 B1 | 8/2002 | Menzel |
| 6,438,450 B1 | 8/2002 | DiLorenzo |
| 6,442,549 B1 | 8/2002 | Schneider |
| 6,446,080 B1 | 9/2002 | Van Ryzin et al. |
| 6,446,130 B1 | 9/2002 | Grapes |
| 6,449,688 B1 | 9/2002 | Peters et al. |
| 6,470,496 B1 | 10/2002 | Kato et al. |
| 6,473,794 B1 | 10/2002 | Guheen et al. |
| 6,488,508 B2 | 12/2002 | Okamoto |
| 6,490,570 B1 | 12/2002 | Numaoka |
| 6,493,871 B1 | 12/2002 | McGuire et al. |
| 6,496,927 B1 | 12/2002 | McGrane et al. |
| 6,498,855 B1 | 12/2002 | Kokkosoulis et al. |
| 6,522,707 B1 | 2/2003 | Brandstetter et al. |
| 6,535,911 B1 | 3/2003 | Miller et al. |
| 6,538,558 B2 | 3/2003 | Sakazume et al. |
| 6,543,052 B1 | 4/2003 | Ogasawara |
| 6,544,122 B2 | 4/2003 | Araki et al. |
| 6,549,719 B2 | 4/2003 | Mankovitz |
| D475,029 S | 5/2003 | Nathan et al. |
| 6,560,651 B2 | 5/2003 | Mott et al. |
| 6,570,507 B1 | 5/2003 | Lee et al. |
| 6,571,282 B1 | 5/2003 | Bowman-Amuah |
| 6,577,735 B1 | 6/2003 | Bharat |
| 6,578,051 B1 | 6/2003 | Mastronardi et al. |
| 6,587,403 B1 | 7/2003 | Keller et al. |
| 6,590,561 B1 | 7/2003 | Shnier |
| 6,590,838 B1 | 7/2003 | Gerlings et al. |
| 6,598,230 B1 | 7/2003 | Ballhorn |
| 6,622,307 B1 | 9/2003 | Ho |
| 6,628,939 B2 | 9/2003 | Paulsen |
| 6,629,318 B1 | 9/2003 | Radha et al. |
| 6,643,620 B1 | 11/2003 | Contolini et al. |
| 6,643,690 B2 | 11/2003 | Duursma et al. |
| 6,654,801 B2 | 11/2003 | Mann et al. |
| 6,658,090 B1 | 12/2003 | Harjunen et al. |
| 6,662,231 B1 | 12/2003 | Drosset et al. |
| 6,702,585 B2 | 3/2004 | Okamoto |
| 6,724,974 B2 | 4/2004 | Naruto et al. |
| 6,728,824 B1 | 4/2004 | Chen |
| 6,728,956 B2 | 4/2004 | Ono |
| 6,728,966 B1 | 4/2004 | Arsenault et al. |
| 6,744,882 B1 | 6/2004 | Gupta et al. |
| 6,751,794 B1 | 6/2004 | McCaleb et al. |
| 6,755,744 B1 | 6/2004 | Nathan et al. |
| 6,762,585 B2 | 7/2004 | Liao |
| 6,789,215 B1 | 9/2004 | Rupp et al. |
| 6,816,578 B1 | 11/2004 | Kredo et al. |
| 6,850,252 B1 | 2/2005 | Hoffberg |
| 6,898,161 B1 | 5/2005 | Nathan |
| 6,904,592 B1 | 6/2005 | Johnson |
| 6,920,614 B1 | 7/2005 | Schindler et al. |
| 6,928,653 B1 | 8/2005 | Ellis et al. |
| 6,934,700 B1 | 8/2005 | Ijdens et al. |
| 6,942,574 B1 | 9/2005 | LeMay et al. |
| 6,974,076 B1 | 12/2005 | Siegel |
| 7,024,485 B2 | 4/2006 | Dunning et al. |
| 7,073,172 B2 | 7/2006 | Chamberlain |
| 7,103,583 B1 | 9/2006 | Baum et al. |
| 7,107,109 B1 | 9/2006 | Nathan et al. |
| 7,111,129 B2 | 9/2006 | Percival |
| 7,114,013 B2 | 9/2006 | Bakke et al. |
| 7,124,194 B2 | 10/2006 | Nathan et al. |
| 7,181,458 B1 | 2/2007 | Higashi |
| 7,188,352 B2 | 3/2007 | Nathan et al. |
| 7,195,157 B2 | 3/2007 | Swartz et al. |
| 7,198,571 B2 | 4/2007 | LeMay et al. |
| 7,205,471 B2 | 4/2007 | Looney et al. |
| 7,206,417 B2 | 4/2007 | Nathan |
| 7,210,141 B1 | 4/2007 | Nathan et al. |
| 7,231,656 B1 | 6/2007 | Nathan |
| 7,237,198 B1 | 6/2007 | Chaney |
| 7,281,652 B2 | 10/2007 | Foss |
| 7,293,277 B1 | 11/2007 | Nathan |
| 7,356,831 B2 | 4/2008 | Nathan |
| 7,406,529 B2 | 7/2008 | Reed |
| 7,415,707 B2 | 8/2008 | Taguchi et al. |
| 7,418,474 B2 | 8/2008 | Schwab |
| 7,424,731 B1 | 9/2008 | Nathan et al. |
| 7,430,736 B2 | 9/2008 | Nguyen et al. |
| 7,433,832 B1 | 10/2008 | Bezos et al. |
| 7,448,057 B1 | 11/2008 | Nathan |
| 7,483,958 B1 | 1/2009 | Elabbady et al. |
| 7,500,192 B2 | 3/2009 | Mastronardi |
| 7,512,632 B2 | 3/2009 | Mastronardi et al. |
| 7,519,442 B2 | 4/2009 | Nathan et al. |
| 7,533,182 B2 | 5/2009 | Wurtzel et al. |
| 7,549,919 B1 | 6/2009 | Nathan et al. |
| 7,574,727 B2 | 8/2009 | Nathan et al. |
| 7,647,613 B2 | 1/2010 | Drakoulis et al. |
| 7,657,910 B1 | 2/2010 | McAulay et al. |
| D616,414 S | 5/2010 | Nathan et al. |
| 7,749,083 B2 | 7/2010 | Nathan et al. |
| 7,757,264 B2 | 7/2010 | Nathan |
| 7,761,538 B2 | 7/2010 | Lin et al. |
| 7,770,165 B2 | 8/2010 | Olson et al. |
| 7,778,879 B2 | 8/2010 | Nathan et al. |
| 7,783,593 B2 | 8/2010 | Espino |
| 7,783,774 B2 | 8/2010 | Nathan et al. |
| 7,793,331 B2 | 9/2010 | Nathan et al. |
| 7,819,734 B2 | 10/2010 | Nathan et al. |
| 7,822,687 B2 | 10/2010 | Brillon et al. |
| D629,382 S | 12/2010 | Nathan et al. |
| 7,870,088 B1 * | 1/2011 | Chen ............... G06F 17/30743 |
| D642,553 S | 8/2011 | Nathan et al. |
| 7,996,873 B1 | 8/2011 | Nathan et al. |
| 8,015,200 B2 | 9/2011 | Seiflien et al. |
| 8,028,318 B2 | 9/2011 | Nathan |
| 8,032,879 B2 | 10/2011 | Nathan et al. |
| 8,037,412 B2 | 10/2011 | Nathan et al. |
| 8,052,512 B2 | 11/2011 | Nathan et al. |
| 8,103,589 B2 | 1/2012 | Nathan et al. |
| 8,151,304 B2 | 4/2012 | Nathan et al. |
| D665,375 S | 8/2012 | Garneau et al. |
| 8,292,712 B2 | 10/2012 | Nathan et al. |
| 8,332,895 B2 | 12/2012 | Nathan et al. |
| 8,429,530 B2 | 4/2013 | Neuman et al. |
| 2001/0016815 A1 | 8/2001 | Takahashi et al. |
| 2001/0023403 A1 | 9/2001 | Martin et al. |
| 2001/0030660 A1 | 10/2001 | Zainoulline |
| 2001/0030912 A1 | 10/2001 | Kalis et al. |
| 2001/0037367 A1 | 11/2001 | Iyer |
| 2001/0044725 A1 | 11/2001 | Matsuda et al. |
| 2002/0002079 A1 | 1/2002 | Martin et al. |
| 2002/0002483 A1 | 1/2002 | Siegel et al. |
| 2002/0113824 A1 | 8/2002 | Myers |
| 2002/0116476 A1 | 8/2002 | Eyal et al. |
| 2002/0118949 A1 | 8/2002 | Jones et al. |
| 2002/0120925 A1 | 8/2002 | Logan |
| 2002/0123331 A1 | 9/2002 | Lehaff et al. |
| 2002/0126141 A1 | 9/2002 | Mastronardi |
| 2002/0129036 A1 | 9/2002 | Ho Yuen Lok et al. |
| 2002/0162104 A1 | 10/2002 | Raike et al. |
| 2003/0004833 A1 | 1/2003 | Pollak et al. |
| 2003/0005099 A1 | 1/2003 | Sven et al. |
| 2003/0006911 A1 | 1/2003 | Smith et al. |
| 2003/0008703 A1 | 1/2003 | Gauselmann |
| 2003/0018740 A1 | 1/2003 | Sonoda et al. |
| 2003/0027120 A1 | 2/2003 | Jean |
| 2003/0031096 A1 | 2/2003 | Nathan et al. |
| 2003/0041093 A1 | 2/2003 | Yamane et al. |
| 2003/0065639 A1 | 4/2003 | Fiennes et al. |
| 2003/0076380 A1 | 4/2003 | Yusef et al. |
| 2003/0088538 A1 | 5/2003 | Ballard |
| 2003/0093790 A1 | 5/2003 | Logan et al. |
| 2003/0101450 A1 | 5/2003 | Davidsson et al. |
| 2003/0104865 A1 | 6/2003 | Ltkis et al. |
| 2003/0108164 A1 | 6/2003 | Laurin et al. |

(56) References Cited

U.S. PATENT DOCUMENTS

| | | |
|---|---|---|
| 2003/0135424 A1 | 7/2003 | Davis et al. |
| 2003/0144910 A1 | 7/2003 | Flaherty et al. |
| 2003/0176218 A1 | 9/2003 | LeMay et al. |
| 2003/0191753 A1 | 10/2003 | Hoch |
| 2003/0208586 A1 | 11/2003 | Mastronardi et al. |
| 2003/0225834 A1 | 12/2003 | Lee et al. |
| 2004/0010800 A1* | 1/2004 | Goci .................... G07F 5/18 725/78 |
| 2004/0025185 A1 | 2/2004 | Goci et al. |
| 2004/0085334 A1 | 5/2004 | Reaney |
| 2004/0103150 A1 | 5/2004 | Ogdon et al. |
| 2004/0145477 A1 | 7/2004 | Easter |
| 2004/0158555 A1 | 8/2004 | Seedman et al. |
| 2004/0204220 A1 | 10/2004 | Fried et al. |
| 2004/0205171 A1 | 10/2004 | Nathan et al. |
| 2004/0220926 A1 | 11/2004 | Lamkin et al. |
| 2005/0048816 A1 | 3/2005 | Higgins |
| 2005/0060405 A1 | 3/2005 | Nathan et al. |
| 2005/0073782 A1 | 4/2005 | Nathan |
| 2005/0086172 A1 | 4/2005 | Stefik |
| 2005/0111671 A1 | 5/2005 | Nathan |
| 2005/0125833 A1 | 6/2005 | Nathan et al. |
| 2005/0201254 A1 | 9/2005 | Looney et al. |
| 2005/0267819 A1 | 12/2005 | Kaplan |
| 2006/0018208 A1 | 1/2006 | Nathan et al. |
| 2006/0031896 A1 | 2/2006 | Pulitzer |
| 2006/0035707 A1 | 2/2006 | Nguyen et al. |
| 2006/0062094 A1 | 3/2006 | Nathan et al. |
| 2006/0143575 A1 | 6/2006 | Sauermann |
| 2006/0227673 A1 | 10/2006 | Yamashita et al. |
| 2006/0239131 A1 | 10/2006 | Nathan et al. |
| 2006/0293773 A1 | 12/2006 | Nathan et al. |
| 2007/0025701 A1 | 2/2007 | Kawasaki et al. |
| 2007/0086280 A1 | 4/2007 | Cappello et al. |
| 2007/0121430 A1 | 5/2007 | Nathan |
| 2007/0139410 A1 | 6/2007 | Abe et al. |
| 2007/0142022 A1 | 6/2007 | Madonna et al. |
| 2007/0160224 A1 | 7/2007 | Nathan |
| 2007/0204263 A1 | 8/2007 | Nathan et al. |
| 2007/0209053 A1 | 9/2007 | Nathan |
| 2007/0220052 A1 | 9/2007 | Kudo et al. |
| 2007/0247979 A1 | 10/2007 | Brillon et al. |
| 2008/0065925 A1 | 3/2008 | Oliverio et al. |
| 2008/0066016 A1 | 3/2008 | Dowdy et al. |
| 2008/0069545 A1 | 3/2008 | Nathan et al. |
| 2008/0077962 A1 | 3/2008 | Nathan |
| 2008/0086379 A1 | 4/2008 | Dion et al. |
| 2008/0096659 A1 | 4/2008 | Kreloff et al. |
| 2008/0137849 A1 | 6/2008 | Nathan |
| 2008/0155588 A1 | 6/2008 | Roberts et al. |
| 2008/0168807 A1 | 7/2008 | Dion et al. |
| 2008/0171594 A1 | 7/2008 | Fedesna et al. |
| 2008/0195443 A1 | 8/2008 | Nathan et al. |
| 2008/0198271 A1 | 8/2008 | Malki |
| 2008/0222199 A1 | 9/2008 | Tiu et al. |
| 2008/0239887 A1 | 10/2008 | Tooker et al. |
| 2008/0305738 A1 | 12/2008 | Khedouri et al. |
| 2009/0030802 A1 | 1/2009 | Plotnick et al. |
| 2009/0037969 A1 | 2/2009 | Nathan et al. |
| 2009/0042632 A1 | 2/2009 | Guenster et al. |
| 2009/0063976 A1 | 3/2009 | Bull et al. |
| 2009/0070341 A1 | 3/2009 | Mastronardi et al. |
| 2009/0091087 A1 | 4/2009 | Wasmund |
| 2009/0100092 A1 | 4/2009 | Seiflein et al. |
| 2009/0129753 A1 | 5/2009 | Wagenlander |
| 2009/0138111 A1 | 5/2009 | Mastronardi |
| 2009/0172565 A1 | 7/2009 | Jackson et al. |
| 2009/0177301 A1 | 7/2009 | Hayes |
| 2009/0241061 A1 | 9/2009 | Asai et al. |
| 2009/0265734 A1 | 10/2009 | Dion et al. |
| 2009/0282491 A1 | 11/2009 | Nathan |
| 2009/0287696 A1 | 11/2009 | Galuten |
| 2009/0307314 A1 | 12/2009 | Smith et al. |
| 2009/0316929 A1 | 12/2009 | Tashev |
| 2010/0042505 A1 | 2/2010 | Straus |
| 2010/0211818 A1 | 8/2010 | Nathan et al. |
| 2010/0241259 A1 | 9/2010 | Nathan |
| 2010/0247081 A1 | 9/2010 | Victoria Pons |
| 2010/0269066 A1 | 10/2010 | Nathan |
| 2010/0299232 A1 | 11/2010 | Nathan et al. |
| 2011/0066943 A1 | 3/2011 | Brillon et al. |
| 2011/0283236 A1 | 11/2011 | Beaumier et al. |
| 2011/0321026 A1 | 12/2011 | Nathan et al. |
| 2012/0009985 A1 | 1/2012 | Nathan et al. |
| 2012/0053713 A1 | 3/2012 | Nathan |
| 2012/0053931 A1 | 3/2012 | Holzichter |
| 2012/0105464 A1 | 5/2012 | Franceus |
| 2012/0143732 A1 | 6/2012 | Nathan et al. |
| 2012/0150614 A1 | 6/2012 | Dion et al. |
| 2012/0158531 A1 | 6/2012 | Dion et al. |
| 2012/0166965 A1 | 6/2012 | Nathan et al. |
| 2012/0240140 A1 | 9/2012 | Nathan |
| 2013/0021281 A1 | 1/2013 | Tse et al. |
| 2013/0040715 A1 | 2/2013 | Nathan et al. |
| 2013/0044995 A1 | 2/2013 | Cappello et al. |
| 2013/0070093 A1 | 3/2013 | Rivera et al. |
| 2013/0091054 A1 | 4/2013 | Nathan et al. |
| 2014/0026154 A1 | 1/2014 | Nathan |
| 2014/0081797 A1 | 3/2014 | Rivera et al. |

FOREIGN PATENT DOCUMENTS

| | | |
|---|---|---|
| DE | 3406058 | 8/1985 |
| DE | 3723737 | 1/1988 |
| DE | 3820835 | 1/1989 |
| DE | 3815071 | 11/1989 |
| DE | 4244198 | 6/1994 |
| DE | 19539172 | 9/1996 |
| DE | 19610739 | 9/1997 |
| DE | 19904007 | 8/2000 |
| EP | 0082077 | 6/1983 |
| EP | 0140593 | 5/1985 |
| EP | 0256921 | 2/1988 |
| EP | 0283304 | 9/1988 |
| EP | 0283350 | 9/1988 |
| EP | 0309298 | 3/1989 |
| EP | 0313359 | 4/1989 |
| EP | 0340787 | 11/1989 |
| EP | 0363186 | 4/1990 |
| EP | 0425168 | 5/1991 |
| EP | 0464562 | 1/1992 |
| EP | 0480558 | 4/1992 |
| EP | 0498130 | 8/1992 |
| EP | 0507110 | 10/1992 |
| EP | 0529834 | 3/1993 |
| EP | 0538319 | 4/1993 |
| EP | 0631283 | 12/1994 |
| EP | 0632371 | 1/1995 |
| EP | 0711076 | 5/1996 |
| EP | 0786122 | 7/1997 |
| EP | 0817103 | 1/1998 |
| EP | 0841616 | 5/1998 |
| EP | 0919964 | 6/1999 |
| EP | 0959570 | 11/1999 |
| EP | 0974896 | 1/2000 |
| EP | 0974941 | 1/2000 |
| EP | 0982695 | 3/2000 |
| EP | 1001391 | 5/2000 |
| EP | 1170951 | 1/2002 |
| EP | 1288802 | 3/2003 |
| EP | 1408427 | 4/2004 |
| EP | 1549919 | 4/2004 |
| EP | 1962251 | 8/2008 |
| FR | 2602352 | 2/1988 |
| FR | 2808906 | 11/2001 |
| GB | 2122799 | 1/1984 |
| GB | 2166328 | 4/1986 |
| GB | 2170943 | 8/1986 |
| GB | 2193420 | 2/1988 |
| GB | 2238680 | 6/1991 |
| GB | 2254469 | 10/1992 |
| GB | 2259398 | 3/1993 |
| GB | 2262170 | 6/1993 |
| GB | 2380377 | 4/2003 |

(56) References Cited

FOREIGN PATENT DOCUMENTS

| | | |
|---|---|---|
| GB | 2505584 | 8/2014 |
| JP | 57173207 | 10/1982 |
| JP | 58-179892 | 10/1983 |
| JP | 60-253082 | 12/1985 |
| JP | 61084143 | 4/1986 |
| JP | 62-192849 | 8/1987 |
| JP | 62-284496 | 12/1987 |
| JP | 63-60634 | 3/1988 |
| JP | 2-153665 | 6/1990 |
| JP | 5-74078 | 3/1993 |
| JP | 5122282 | 5/1993 |
| JP | 07281682 | 10/1995 |
| JP | 07-311587 | 11/1995 |
| JP | 8274812 | 10/1996 |
| JP | 08279235 | 10/1996 |
| JP | 08289976 | 11/1996 |
| JP | 928918 | 2/1997 |
| JP | 9114470 | 5/1997 |
| JP | 9127964 | 5/1997 |
| JP | 09-244900 | 9/1997 |
| JP | 10-098344 | 4/1998 |
| JP | 10-222537 | 8/1998 |
| JP | 11-003088 | 1/1999 |
| JP | 11-024686 | 1/1999 |
| JP | 11-095768 | 4/1999 |
| JP | 2000-209500 | 7/2000 |
| JP | 2002-83640 | 3/2002 |
| JP | 2002-537584 | 11/2002 |
| JP | 2003-076380 | 3/2003 |
| JP | 2003-084903 | 3/2003 |
| JP | 2003-099072 | 4/2003 |
| JP | 2005-107267 | 4/2005 |
| JP | 2005-184237 | 7/2005 |
| JP | 2006-048076 | 2/2006 |
| JP | 2007-018730 A | 1/2007 |
| JP | 2007-034253 | 2/2007 |
| JP | 2007-041722 | 2/2007 |
| JP | 2007/505410 | 3/2007 |
| JP | 07504517 | 3/2007 |
| JP | 2007-102982 | 4/2007 |
| JP | 2007-104072 | 4/2007 |
| JP | 2007-128609 | 5/2007 |
| JP | 2007-164078 | 6/2007 |
| JP | 2007-164298 | 6/2007 |
| JP | 2007/179333 | 7/2007 |
| JP | 2007-241748 | 9/2007 |
| JP | 2008-058656 | 3/2008 |
| JP | 2008-292875 A | 12/2008 |
| JP | 2009-017529 | 1/2009 |
| JP | 2009-075540 | 4/2009 |
| JP | 2009-100134 A | 5/2009 |
| WO | WO 86/01326 | 2/1986 |
| WO | WO 90/00429 | 1/1990 |
| WO | WO 90/07843 | 7/1990 |
| WO | WO 91/08542 | 6/1991 |
| WO | WO 91/20082 | 12/1991 |
| WO | WO 93/16557 | 8/1993 |
| WO | WO 93/18465 | 9/1993 |
| WO | WO 93/021732 | 10/1993 |
| WO | WO 94/03894 | 2/1994 |
| WO | WO 94/14273 | 6/1994 |
| WO | WO 94/15306 | 7/1994 |
| WO | WO 94/15416 | 7/1994 |
| WO | WO 95/03609 | 2/1995 |
| WO | WO 95/29537 | 11/1995 |
| WO | WO 96/12255 | 4/1996 |
| WO | WO 96/12256 | 4/1996 |
| WO | WO 96/12257 | 4/1996 |
| WO | WO 96/12258 | 4/1996 |
| WO | WO 98/07940 | 2/1998 |
| WO | WO 98/11487 | 3/1998 |
| WO | WO 98/45835 | 10/1998 |
| WO | WO 99/35753 | 7/1999 |
| WO | WO 01/00290 | 1/2001 |
| WO | WO 01/08148 | 2/2001 |
| WO | WO 01/71608 | 9/2001 |
| WO | WO 02/060546 | 8/2002 |
| WO | WO 02/095752 | 11/2002 |
| WO | WO 01/084353 | 1/2003 |
| WO | WO 03/069613 | 8/2003 |
| WO | WO 2004/029775 | 4/2004 |
| WO | 2005/026916 | 3/2005 |
| WO | WO 2006/014739 | 2/2006 |
| WO | WO 2006/056933 | 6/2006 |
| WO | WO 2007/092542 | 8/2007 |
| WO | WO 2008-033853 | 3/2008 |
| WO | WO 2008126311 A1 | 10/2008 |
| WO | WO 2011094330 | 8/2011 |
| WO | WO 2013/040603 | 3/2013 |

OTHER PUBLICATIONS

U.S. Appl. No. 08/817,438, filed Oct. 2, 1997, System for Distributing and Selecting Audio and Video Information and Method Implemented by Said System.
U.S. Appl. No. 08/817,690, filed Jul. 23, 1997, 2002-0016968, Intelligent Digital Audiovisual Playback System.
U.S. Appl. No. 08/817,968, filed Oct. 2, 1997, Intelligent Digital Audiovisual Playback System.
U.S. Appl. No. 09/161,584, filed Sep. 28, 1998, Wireless Digital Transmission System for Loudspeakers.
U.S. Appl. No. 09/523,734, filed Feb. 22, 1999, Intellegent Digital Audiovisual Playback System.
U.S. Appl. No. 09/290,999, filed Apr. 14, 1999, Device and Process for Supplying Backed-Up Electric Power for an Audiovisual System.
U.S. Appl. No. 09/583,863, filed Jun. 1, 2000, U.S. Pat. No. 7,992,178, Downloading File Reception Process.
U.S. Appl. No. 09/585,325, filed Jun. 2, 2000, Process for Ordering a Selection in Advance, Digital System and Jukebox for Embodiment of the Process.
U.S. Appl. No. 09/621,677, filed Jul. 24, 2000, U.S. Pat. No. 8,074,253, Audiovisual Reproduction System.
U.S. Appl. No. 09/664,494, filed Sep. 18, 2000, Method for the Distribution of Audio-visual Information and System for the Distribution of Audio-Visual Information.
U.S. Appl. No. 10/965,742, filed Oct. 18, 2004, U.S. Pat. No. 8,189,819, Sound Control Circuit for a Digital Audiovisual Reproduction System.
U.S. Appl. No. 11/035,882, filed Jan. 18, 2005, U.S. Pat. No. 8,661,477, System for Distributing and Selecting Audio and Video Information and Method Implementing by Said System.
U.S. Appl. No. 11/513,018, filed Aug. 31, 2006, U.S. Pat. No. 8,165,318, Process for Adjusting the Sound Volume of a Digital Sound Recording.
U.S. Appl. No. 11/698,060, filed Jan. 26, 2007, U.S. Pat. No. 8,184,508, Intelligent Digital Audiovisual Playback System.
U.S. Appl. No. 11/714,868, filed Mar. 7, 2007, U.S. Pat. No. 8,428,273, Wireless Digital Transmission System for Loudspeakers.
U.S. Appl. No. 11/979,179, filed Oct. 31, 2007, U.S. Pat. No. 8,225,369, Home Digital Audiovisual Information Recording and Playback System.
U.S. Appl. No. 12/071,003, filed Feb. 14, 2008, U.S. Pat. No. 8,214,874, Method for the Distribution of Audio-visual Information and a System for the Distribution of Audio-visual Information.
U.S. Appl. No. 12/230,254, filed Aug. 26, 2008, U.S. Pat. No. 7,996,438, Device and Process for Remote Management of a Network of Audiovisual Information Reproduction Systems.
U.S. Appl. No. 12/232,869, filed Sep. 25, 2008, U.S. Pat. No. 8,127,324, Audiovisual Reproduction System.
U.S. Appl. No. 12/318,864, filed Jan. 9, 2009, U.S. Pat. No. 8,332,887, Systems and/or Methods for Distributing Advertisements From a Central Advertisement Network to a Peripheral Device via a Local Advertisement Server.
U.S. Appl. No. 12/458,372, filed Jul. 9, 2009, U.S. Pat. No. 8,726,330, Intelligent Digital Audiovisual Playback System.
U.S. Appl. No. 12/662,639, filed Apr. 27, 2010, U.S. Pat. No. 7,987,282, An Audiovisual Distribution System for Playing an

(56) References Cited

OTHER PUBLICATIONS

Audiovisual Piece Among a Plurality of Audiovisual Devices Connected to a Central Server Through a Network.
U.S. Appl. No. 12/801,119, filed May 24, 2010, U.S. Pat. No. 8,469,820, Communication Device and Method Between an Audiovisual Information Playback System and an Electronic Game Machine.
U.S. Appl. No. 12/801,744, filed Jun. 23, 2010, U.S. Pat. No. 8,275,668, Process for Ordering a Selection in Advance, Digital System and Jukebox for Embodiment of the Process.
U.S. Appl. No. 12/805,437, filed Jul. 30, 2010, U.S. Pat. No. 8,145,547, Method of Communications for an Intelligent Digital Audiovisual Playback System.
U.S. Appl. No. 12/805,992, filed Aug. 27, 2007, U.S. Pat. No. 8,473,416, Jukebox With Customizable Avatar.
U.S. Appl. No. 29/371,355, filed Dec. 14, 2010, U.S. Pat. No. D655,657, Wheel or Wheel Cover.
U.S. Appl. No. 13/100,715, filed May 4, 2011, U.S. Pat. No. 8,724,436, Audiovisual Distribution System for Playing an Audiovisual Piece Among a Plurality of Audiovisual Devices Connected to a Central Server Through a Network.
U.S. Appl. No. 13/151,771, filed Jun. 2, 2011, U.S. Pat. No. 8,479,240, Remote Management System for At Least One Audiovisual Information Reproduction Device.
U.S. Appl. No. 13/164,258, filed Jun. 20, 2011, U.S. Pat. No. 8,495,109, Downloading File Reception Process.
U.S. Appl. No. 29/401,754, filed Sep. 16, 2011, U.S. Pat. No. D670,675, Jukebox.
U.S. Appl. No. 13/290,470, filed Nov. 7, 2011, U.S. Pat. No. 8,683,541, Audio Visual Reproduction System.
U.S. Appl. No. 13/673,086, filed Nov. 9, 2012, U.S. Pat. No. 8,719,873, Digital Downloading Jukebox System With User-Tailored Music Management, Communications and Other Tools.
U.S. Appl. No. 13/670,553, filed Nov. 7, 2012, 20130067512, Systems Andor Methods for Distributing Advertisements From a Central Advertisement Network to a Peripheral Device via a Loca Advertisement Server.
U.S. Appl. No. 14/139,385, filed Dec. 23, 2013, U.S. Pat. No. 8,751,611, Digital Downloading Jukebox System With User-Tailored Music Management, Communications and Other Tools.
"About Ecast" leaflet, 2 pages, at least as early as Nov. 8, 2013.
Ahanger et al.; A Digital On-Demand Video Service Supporting Content-Based Queries; 1993; 9 pages.
Austin Cyber Limits: Name That Tune [online], [retrieved Jul. 23, 2001]. Retrieved from the Internet: <http://www.pbs.ork/klru/austin/games/namethattune.html>.
Back to the Tunes [online], [retrieved Jul. 23, 2001]. Retrieved from the Internet: <http://citc5.hispeed.com/rules.html>.
Bonczek et al, "The DSS Development System", 1983 National Computer Conference, Anaheim, California, May 16-19, 1983, pp. 441-455.
Chan et al., "Distributed servers architectures for networked video services", IEEE Trans on Networking, vol. 9, No. 2, pp. 125-136, 2001.
Chen et al., "Optimization of the grouped sweeping scheduling (GSS) with heterogeneous multimedia streams", ACM Multimedia, pp. 1-7, 1993.
Crutcher et al., "The networked video Jukebox", IEEE, Trans. on circuits and systems for video technology, vol. 4, No. 2, pp. 105-120, 1994.
"Darts Revolution Again", Replay Magazine, Mar. 1991, pp. 146-148.
Derfler et al., "How Networks Work", Millennium Ed., Que Corporation, Jan. 2000.
Drews, C.; Pestoni, F.; "Virtual jukebox: reviving a classic," Proceedings of the 35th Annual Hawaii International Conference System Sciences, pp. 887-893, Jan. 7-10, 2002.
"Ecast Forges Landmark International Technology Partnership", Business Wire at www.findarticles.com/cf_0/m0EIN/2000_July_25/63663604/print.html, 2 pages, Jul. 25, 2000.
"Ecast Selects Viant to Build Siren Entertainment System (TM)", ScreamingMedia, PR Newswire San Francisco, industry.java.sum.com/javanews/stories/story2/0,1072,17618,00.html, 3 pages, Aug. 3, 1999.
Fachbuch, "Unterhaltungselektronic von A-Z" gfu 1, VDE-Verlag GmbH, pp. 12-13, 1983-1984.
"Foobar 2000 Evaluation Updated," MonkeyBiz, Aug. 3, 2008, 4 pages (with partial English translation). http://monkeybizinfo.blogspot.jp/2008/08/foobar2000.html.
Gallardo et al., "Tangible Jukebox: back to palpable music", ACM TEI, pp. 199-202, 2010.
Gralla, "How the Internet Works", Millennium Ed., Que Corporation, Aug. 1999.
Galen A. Grimes, Chapter 18, "Taking Advantage of Web-based Audio" [online] [retrieved Mar. 24, 2000].
Hewlett-Packard Development Co; HP Open View Storage Data Protector Admin's Guideline Manual Edition; May 2003; Copyright 2003, 60 pages http://h20000.www2.hp.com/bc/docs/support/SupportManual/c006637931/c00663793.pdf.
Hicks et al., "Dynamic software updating", ACM PLDI, pp. 13-23, 2001.
IBM Technical Disclosure Bulletin, vol. 30, No. 5, Oct. 1987, "Method for Automated Assembly of Software Versions", pp. 353-355.
IBM Technical Disclosure Bulletin, vol. 32, No. 9A, Feb. 1990, "Robotic Wafer Handling System for Class 10 Environments" pp. 141-143.
IBM Technical Disclosure Bulletin, vol. 33, No. 12, May 1991, "High-speed Opens and Shorts Substrate Tester", pp. 251-259.
IBM Technical Disclosure Bulletin, vol. 41, No. 1, Jan. 1998, "Safe Mechanism for Installing Operating System Updates with Applications," pp. 557-559.
iTouch 8 Plus brochure, JVL Corporation, 2005, 2 pages.
iTouch 27 New Games brochure, JVL Corporation, 2005, 2 pages.
Johnny Rockets Name That Tune [online], [retrieved Mar. 7, 2002]. Retrieved from the Internet: <http://www.johnnyrockets.com/docs/funstuff.html>.
Petri Koskelainem, "Report on Streamworks™" [online] [retrieved Mar. 24, 2000].
Kozierok, The PC Guide, Site Version 2.2.0, http://www.pcguide.com, Apr. 17, 2001.
Kraiss et al., "Integrated document caching and prefetching in storage hierarchies based on Markov chain predictions", The VLDB Journal, vol. 7, issue 3, pp. 141-162, 1998.
Liang et al., "Dynamic class loading in the Java virtual machine", ACM OOPSLA, pp. 36-44, 1998.
Look and iTouch brochure, JVL Corporation, 2004, 2 pages.
Ludescher et al., "File Storage Management for TFTF physics data", IEEE, pp. 856-859, 1992.
Megatouch Champ brochure, Merit Industries, Inc., 2005, 2 pages.
Melnik et al., "A mediation infrastructure for digital library services", ACM DL, pp. 123-132, 2000.
Definition of "Dynamically," Merriam Webster's Collegiate Dictionary, Tenth Edition, Merriam-Webster, Inc., Copyright 1999, pp. 361.
Mickey B's Jukebox Revue—Name That Tune! [online], [retrieved Jul. 23, 2001]. Retrieved from the Internet: <http://mickeyb.com/tune/>.
Mod Box Internet brochure, Merit Entertainment, 2006, 2 pages.
Newsome et al., "Proxy compilation of dynamically loaded Java classes with MoJo", ACM LCTES, pp. 204-212, Jun. 2002.
Outlaw, Computer Technology Review, "Virtual Servers Offer Performance Benefits for Network Imaging", 1993.
Patent Abstract of Japan vol. 95, No. 010 & JP 07 281682 A (Naguo Yuasa), 27 October 1 JP 07 281682, figure 1-6 abrége.
Peter Pawlowski, "Basic Player Whose Appearance and Functions can be Customized Freely 'Foobar 2000' v1.0 is Unveiled," Windows Forest, Japan, Jan. 12, 2010, 3 pages (with partial English translation). http://forest.impress.co.jp/docs/news/20100112_341870.html.
Pohlmann, "Principles of Digital Audio", Third Edition, 1995.

(56) References Cited

OTHER PUBLICATIONS

PR Newswire, Press Release, "MusicMatch Announces Commerical Availability of Meta Trust Certified MusicMatch jukebox", New York; Nov. 15, 1999, extracted from Internet, http://proquest.umi.com on Sep. 17, 2002.
Rollins et al., "Pixie: A jukebox architecture to support efficient peer content exchange", ACM Multimedia, pp. 179-188, 2002.
Schneier, "Applied Cryptography", Second Edition, John Wiley & Sons, Inc. New York, 1996.
Sprague et al., "Music selection using the partyvote democratic Jukebox", ACM AVI, pp. 433-436, 2008.
W. Richard Stevens, "TCP/IP Illustrated: vol. 1, the Protocols," Copyright 1994.
Stewart, "Ecast Deploys Marimba's Castanet to Power an Internet-Based, Entertainment Management System for the Out-of-Home Market", Marimba, Press Release, 3 pages, www.marimba.com/news/releases/ecast.dec13.html, Dec. 13, 1999.
Strauss et al., "Information Jukebox a semi public device for presenting multimedia information content", Pers. Ubiquit Comput, 7, pp. 217-220, 2003.
Tom & Liz's Name That Tune [online], [retrieved Jul. 23, 2001]. Retrieved from the Internet: <http://home.att.net/~tomnliz/Music.html>.
U.S. Appl. No. 29/371,255, Garneau et al., filed Dec. 14, 2010.
U.S. Appl. No. 61/536,015, filed Sep. 18, 2011; Rivera et al.
U.S. Appl. No. 29/401,854, filed Sep. 16, 2011; Garneau et al.
U.S. Appl. No. 61/129,637, Dion, filed Jul. 9, 2008.
U.S. Appl. No. 61/202,617, Dion, filed Mar. 18, 2009.
U.S. Appl. No. 61/584,750, filed Jan. 9, 2012; Rivera et al.
Vortex Brochure, JVL Corporation, 2005, 2 pages.
Waingrow, "Unix Hints & Hacks", Que Corporation, Indianapolis, IN, 1999.
White, "How Computers Work", Millennium Ed., Que Corporation, Indianapolis, IN, Sep. 1999 (Sep. 22, 1999).
Yuki Murata, iTunes no 'Kankyo Settei' Catalog & Tips 10 Sen, Mac People, ASCII Corporation, Oct. 1, 2007.
Office Action dated Jan. 28, 2014 in corresponding Great Britain Application No. 1320224.7.
Office Action dated Jan. 16, 2014 in corresponding Great Britain Application No. 1320224.7.
International Search Report and Written Opinion dated Feb. 1, 2013 in corresponding PCT Application No. PCT/US12/55849.
Office Action dated Feb. 23, 2016 in corresponding JP Patent Appln. No. Tokugan 2004-530943.
U.S. Appl. No. 13/138,660, filed Mar. 5, 2012, U.S. Pat. No. 9,076,155, Jukebox with Connection to External Social Networking Services and Associated Systems and Methods.
U.S. Appl. No. 13/833,173, filed Mar. 15, 2013, 2013-0205243 A1, Digital Jukebox Device with Improved Karaoke-Related User Interfaces, and Associated Methods.
Patent Examination Report No. 3 Australian Patent Application No. 2015203639 dated Jun. 10, 2016.
Office Action in corresponding Korean Appin. No. 10-2016-7019509 dated Oct. 11, 2017 with partial translation.

* cited by examiner

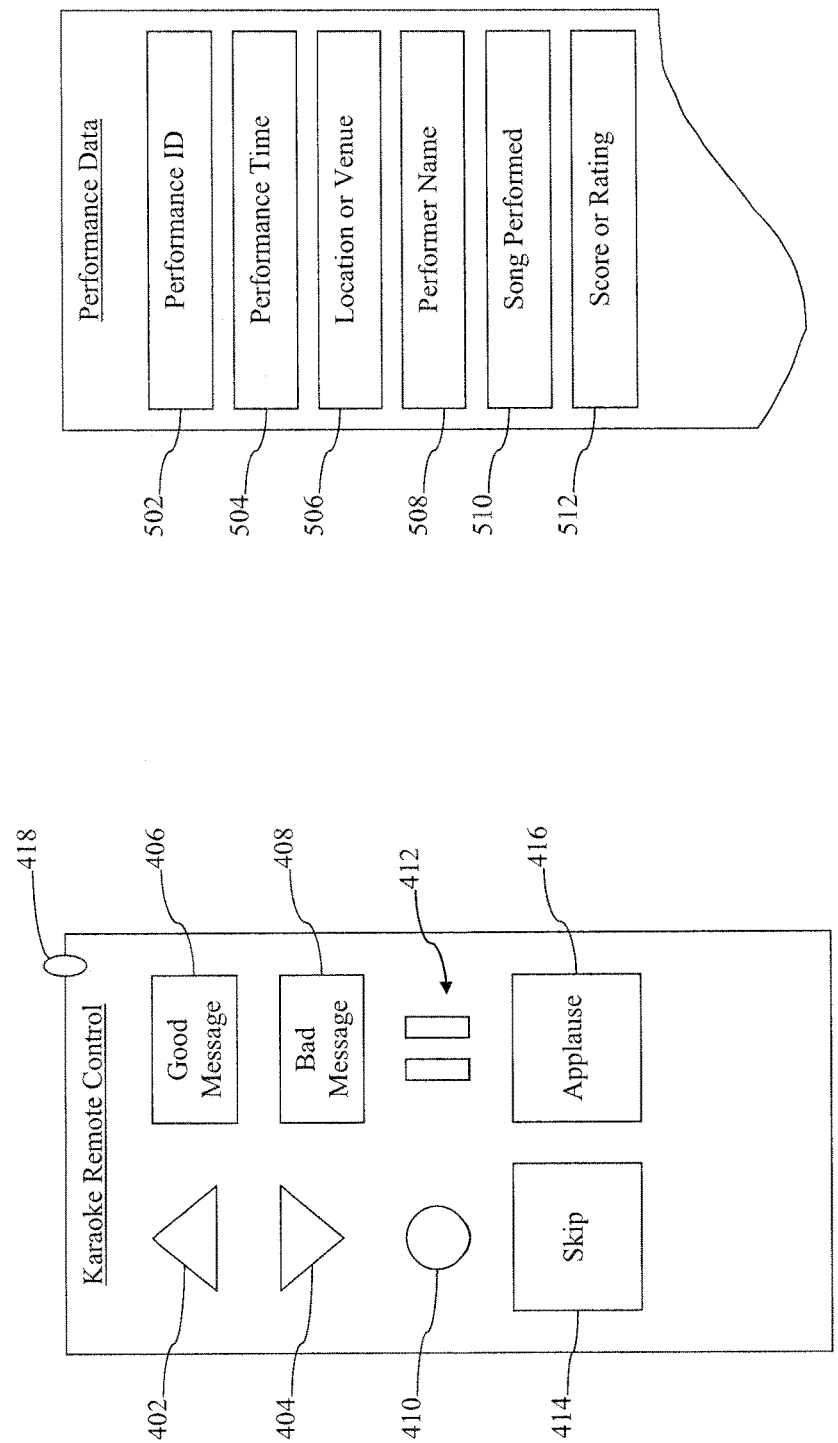

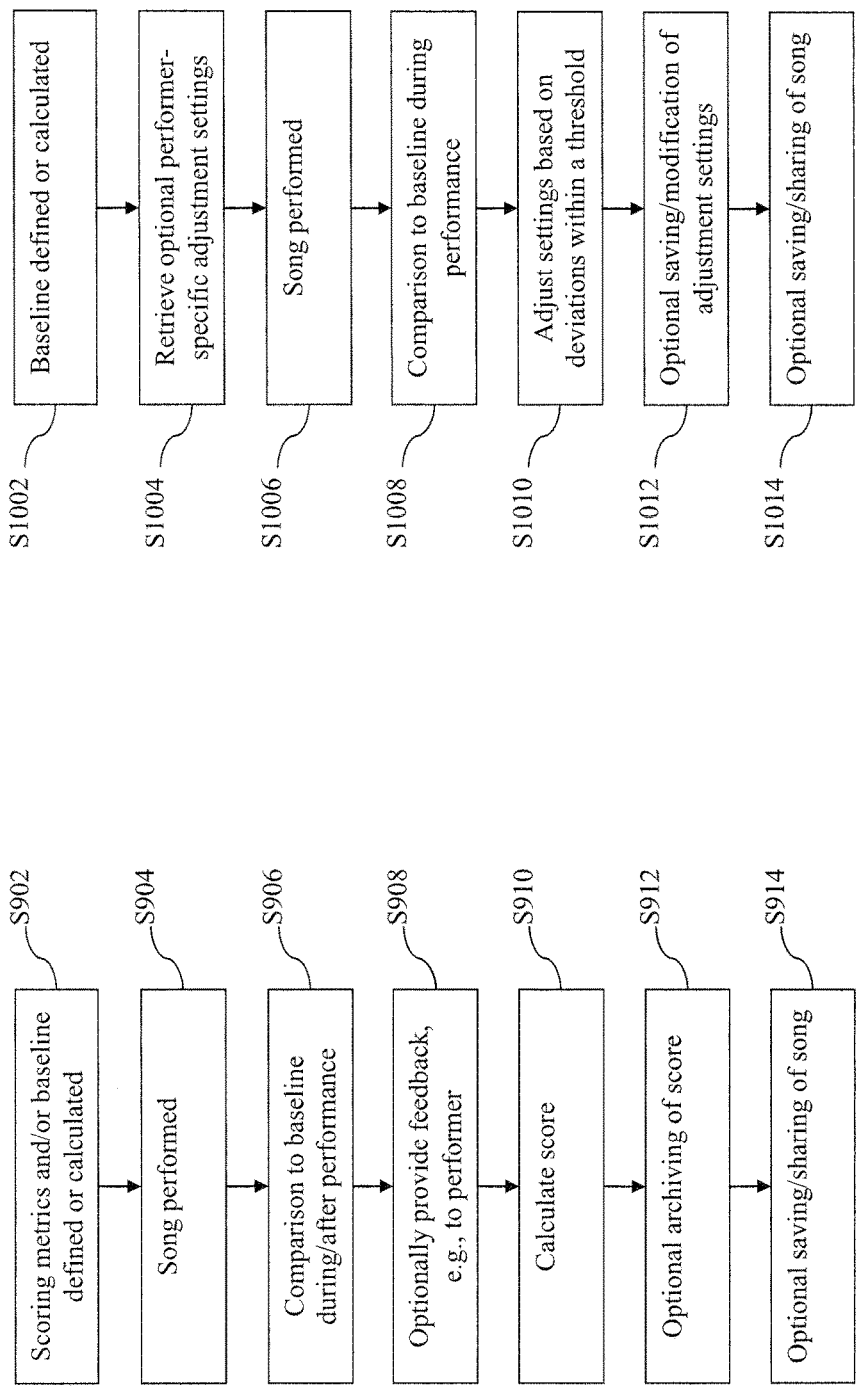

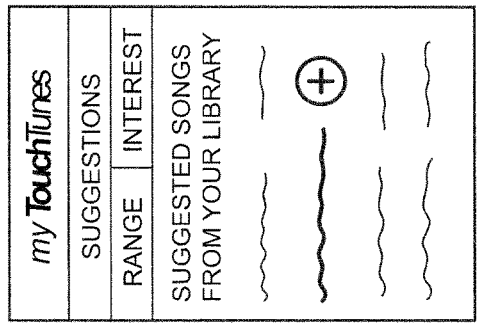
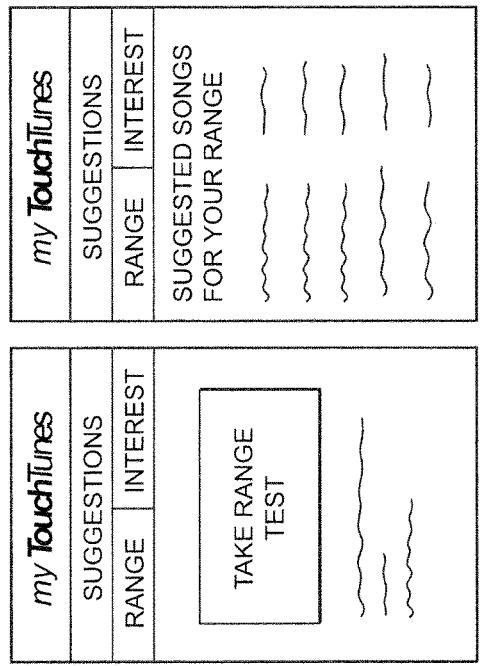
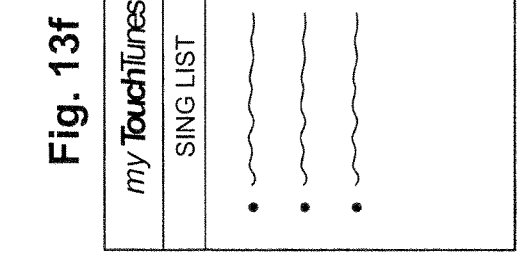
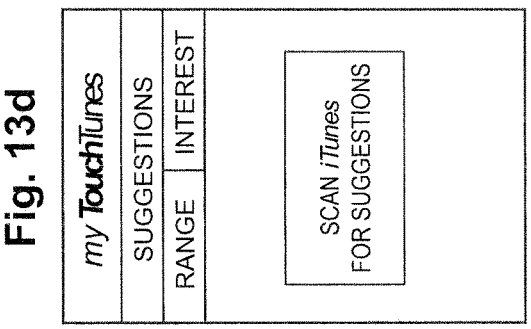
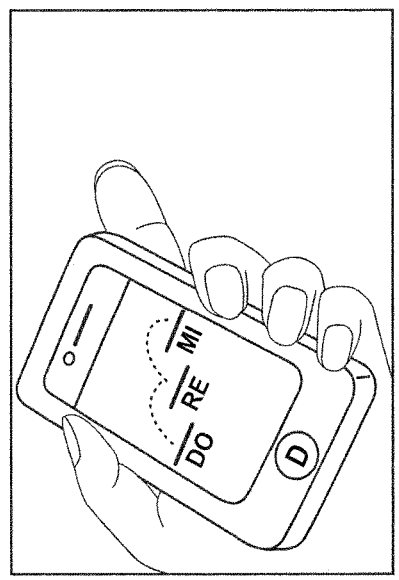
Fig. 13a Fig. 13b Fig. 13c Fig. 13d Fig. 13e Fig. 13f Fig. 19a Fig. 19b Fig. 19c Fig. 19d Fig. 19e Fig. 19f

DIGITAL JUKEBOX DEVICE WITH KARAOKE AND/OR PHOTO BOOTH FEATURES, AND ASSOCIATED METHODS

CROSS-REFERENCES TO RELATED APPLICATIONS

This application is a continuation of application Ser. No. 14/075,853 filed Nov. 8, 2013, which is a continuation of application Ser. No. 13/621,922 filed Sep. 18, 2012, which claims the benefit of U.S. Provisional Application Nos. 61/584,750 filed Jan. 9, 2012, and 61/536,015 filed Sep. 18, 2011, the entire contents of each of which is hereby incorporated by reference in this application. This application also incorporates by reference the entire contents of U.S. application Ser. No. 12/929,466 filed Jan. 26, 2011; Ser. No. 12/737,395 filed Jan. 7, 2011; 61/202,617 filed Mar. 18, 2009; Ser. No. 12/318,864 filed Jan. 9, 2009; Ser. No. 12/222,785 filed Aug. 15, 2008; Ser. No. 12/076,761 filed Mar. 21, 2008; Ser. No. 11/902,790 filed Sep. 25, 2007; and Ser. No. 11/902,658 filed Sep. 24, 2007.

TECHNICAL FIELD

Certain exemplary embodiments relate to entertainment systems and, more particularly, certain exemplary embodiments relate to jukebox systems that incorporate digital downloading jukebox features along with karaoke jukebox and/or photo booth features.

BACKGROUND AND SUMMARY

Jukeboxes have been around for decades and provide users with the ability to select desired music for reproduction in a convenient and advantageous manner. Jukeboxes conventionally have been provided in commercial establishments, such as restaurants and bars, in order to provide desired music on demand for patrons thereof for a fee. Over the last several years, a new generation of jukebox devices have become available that provide significant improvements in the operation thereof for all parties involved. More specifically, the conventional standalone phonorecord and CD jukeboxes are being replaced by digital downloading jukeboxes that are controlled by and communicate with a central server. An example of this new generation jukebox system is shown in U.S. Pat. No. 6,308,204, the entire disclosure of which is incorporated herein by reference. A leading provider of this new generation of jukebox systems is TouchTunes Music Corporation.

FIG. 1 shows an overview of an exemplary embodiment of a digital downloading jukebox system 10. As shown in FIG. 1, the jukebox system 10 includes a central server 12 that contains a master library of audio content (typically music), as well as or alternatively audiovisual content (typically music and associated video or graphics), that can be downloaded therefrom. The jukebox system also includes a series of remote jukebox devices 16, 16a-16f. Each of these jukebox devices are generally located in a bar, restaurant, club, or other desired location, and are operable to play music (e.g., from a suitable storage location such as, for example, from a local server, a central and potentially remote server, from local storage, etc.) in response to receiving a payment from a user, such as coins, bills, credit/debit card, etc., and having one or more songs selected by the user for play. In an alternative embodiment, a music service is paid for on a subscription basis by the location, and the selected music is free for the end-user. The jukebox device 16 typically includes a screen 18 that presents information to the user and allows the user to select songs therefrom, as well as an audio system 20 that plays the selected songs. The screen 18 may also be used for displaying song-related video or graphics. The screen 18 may also be used to display advertisements for the jukebox itself in order to attract customers thereto, to display other types of advertisements, and/or to display any other desired information.

The jukebox devices 16 (sometimes referred to herein as simply "jukeboxes") are operable to communicate with the central server 12 through a communications network 14, such as, for example, the Internet. The jukeboxes 16 periodically communicate with the server 12 in order to provide information to the server 12 regarding the specific songs that have been played on the jukebox. The central server then uses this information in order to determine the appropriate royalties and/or other payments that are owed for songs played on each jukebox. Thus, one advantage of this new generation of jukeboxes is that the sound reproduction and/or other applicable music rights can be adhered to in a more accurate and reliable manner, thereby assuring the proper royalties are paid to the artists or music owners. The central server 12 can also provide new songs to the jukebox 16 in order to assure that the appropriate or most popular songs are maintained on the jukebox based on the specific customers at that location. Thus, the songs available on each jukebox can be customized through communication with the central server in order to provide the songs and/or types of music that customers generally request at each jukebox location. As described in the above-referenced U.S. Pat. No. 6,308,204, the central server can also advantageously be used to update the operating software on the jukeboxes in order to, for example, change the operation of the jukebox, such as to provide new or improved features. Thus, another advantage of this new generation of jukeboxes is that the songs (or other audio and/or visual content), and the operation of the jukebox itself can be remotely changed as desired without the need to have someone (such as a routeman) personally service the jukebox. Instead, such updates can be done using the central server 12.

As indicated above, the jukebox devices 16 each include a mass storage device, such as a hard drive, which stores the songs and associated video/graphics data (if any), as well as any other desired graphical information for reproduction on the jukebox. The mass storage device of the jukebox typically has limited storage capacity relative to the storage device of the central server 12. As a result, only a fraction of the songs stored on the central server are typically stored on the mass storage device of the jukebox at any one time. There may be other reasons as well, such as for security of the data or limited room in the jukebox itself, for having limited storage capacity on the jukebox and/or limiting the number of songs stored thereon. For example, physical space may be limited on wall-mount jukeboxes or the like, which are designed to be small in size as compared to free-standing models. As explained above, the songs on the jukebox can be changed through communication with the central server, but typically any one jukebox only stores a relatively small subset of the complete library of songs maintained by the central server at any one time.

In order to increase the revenue that a jukebox generates, making the most desired or popular songs available on the jukebox over time may be seen as an advantage. If customers cannot find songs they like on the jukebox, usage of the jukebox (and the revenue generated thereby) can decrease. On the other hand, it is not always possible to predict in advance exactly what a customer at any particular location will desire to play on the jukebox. In fact, there are likely many instances where a customer would have selected a song that exists on the central server but is not currently present on the jukebox. As a result, the jukebox may not be enjoyed and used to its fullest extent. In order to address this problem and increase revenue, jukebox systems have in the past provided a feature that enables the user to search for songs on the central server from the jukebox and request an immediate download of a desired song from the central server to the jukebox for an additional fee. This feature enables the user to play any song in the master library of songs maintained by the central server using the jukebox, regardless of whether or not the specific song is presently stored in the mass storage of the jukebox itself. Thus, the user can first look for desired songs on the local storage of the jukebox and then, if desired, search further on the central server for desired songs (e.g., in connection with search functionality, potentially accessible by selecting a central server search function button on the screen). The jukebox device typically charges an additional fee (such as five credits instead on one credit) for an immediate download and play of a song from the central server as opposed to a standard play directly from the jukebox's local storage.

In addition to all the features of a conventional jukebox, there is a need for an integrated karaoke experience. In that regard, current jukeboxes typically are turned off or otherwise deactivated during karaoke nights, where karaoke providers bring in their own separate equipment and set it up at the venue, or the venue itself simply sets up the separate karaoke system in which it has separately invested. The deactivation of the jukebox device, even if only temporary, represents a loss of potential revenue during such karaoke establishments. The setup and tear-down of the separate karaoke systems also is inconvenient and sometimes burdensome, e.g., for short-staffed venues, for venues where there is not a lot of space, etc. Moreover, conventional jukeboxes have been largely shut out from "karaoke-only" establishments. Because jukeboxes and karaoke device belong in different classes in the real world, a whole market remains unavailable and thus untapped.

As is known, the karaoke environment involves an organized process of selecting music from an exclusive karaoke catalog that contains legally licensed music. Unfortunately, it has been very challenging to develop a sufficiently feature-rich solution to allow a true karaoke experience to take place in a bar or public venue. Karaoke systems in place today for commercial uses typically present music that the "KJ" or "Karaoke Jockey" (as opposed to the "DJ") has accumulated. It has been observed that few KJs make any effort to obtain legally licensed versions of the songs that make use of Even genuine efforts to license songs from appropriate karaoke music suppliers are fraught with risk, as the suppliers themselves oftentimes do not have coherent and effective licensing capability. And even genuine efforts to license songs still cannot provide to KJs the vast music catalog available on jukebox devices.

Thus, it will be appreciated that there is a need in the art for a new catalog management and royalty payment strategy that goes beyond what has been put in place for conventionally licensed music for mechanical reproduction and performance, e.g., so as to accommodate karaoke environments. For instance, certain exemplary embodiments provide a way to comply with obligations to respect author rights, in the more complicated karaoke environment where a different set of rights is implicated, e.g., in connection with vocal elimination and replacement, generation of new content, etc.

In this vein, as is known, the karaoke experience creates a new work, namely, a combination of the original music and the performer(s) singing. There oftentimes is a desire for performers to retain audio or audio and video copies of their performances. To meet this need, however, would imply the potentially recurring usage of the original music track and the appropriate tracking and management of these produced works, e.g., to comply with current copyright laws. Thus, another challenge facing the development of a karaoke application involves providing the ability to create these new performance works, while also managing them in a manner that respects the licensing demands of the original rights holder(s). Media management, however, is hampered currently, as digital media and ubiquitous player technology has become widespread.

One aspect of certain exemplary embodiments relates to providing, in the venue or location corresponding to the physical jukebox and karaoke environment, the ability to seamlessly transition between conventional jukebox usage or, jukebox plus broadcast TV (as in using the jukebox audio system to play the sound for a football game being presented on the venues televisions), and/or a new karaoke-appropriate audio and video configuration. In so doing, it may be desirable to make adjustments to a number of settings of the combined karaoke jukebox system.

For instance, the volume settings for all zones may be altered to fairly present the stage environment and provide the performer with suitable audio monitor capability. In addition, video screens may be repurposed to provide information about upcoming performers and lyrics for the current song. As alluded to above, it would be desirable to have this transition take place in a seamless manner, demanding very little skill from venue staff or the karaoke master of ceremonies or the de facto "KJ."

Thus, it will be appreciated that there is a need in the art for techniques for improving jukeboxes by also incorporating karaoke features that provide karaoke performs a "take-away" while addressing licensing, reporting, and/or other requirements, both at and away from the venue and location, while also enabling for a seamless transition between jukebox and karaoke modes of operation.

The inventors of the instant application have recognized that karaoke can be a positive, social, experience that is fun and sometimes even competitive. Performance is a part of the karaoke experience, for both performers and the audience. The more people involved in the experience, the more fun it tends to be. Smart technology can provide new KJ features. Smart technology also can leverage opportunities to create a connected karaoke experience for a connected world.

Thus, an aspect of certain exemplary embodiments relates to encouraging more people to perform, and/or connecting more people to the performance—before, during, and/or after a performance.

An aspect of certain exemplary embodiments relates to providing a karaoke jukebox connected system with collaborative touch points (including, for example, user devices such as mobile phones, tablets, etc.; jukeboxes themselves; game or other fixed or portable terminals in a location; etc.) that define unique moments.

Another aspect of certain exemplary embodiments relates to treating a performance as a moment of the karaoke experience that other moments both lead to and stem from.

Another aspect of certain exemplary embodiments relates to defining moments in the experience by providing unique or signature interactions that help make the experience immersive and unique for patrons, whether they are performing or watching at the location or remote from the location.

Certain exemplary embodiments relate to a jukebox device usable in a jukebox mode, and (a) a karaoke mode, and/or (b) a photo-booth mode, as shown and described herein.

Certain exemplary embodiments relate to a method for operating a jukebox device usable in a jukebox mode, and (a) a karaoke mode, and/or (b) a photo-booth mode, as shown and described herein.

Certain exemplary embodiments relate to a system including a jukebox device usable in a jukebox mode, and (a) a karaoke mode, and/or (b) a photo-booth mode, as shown and described herein.

In certain exemplary embodiments, a method of recording a karaoke performance in which a karaoke performer sings a song through a first microphone connected to a jukebox that is playing the song is provided. A user can check in to a site where the jukebox is located via an application running on a portable electronic device being operated by the user. The application has access to a karaoke queue maintained by the jukebox, with the karaoke queue indicating the songs that are being sung. There is a synchronizing of times as between the jukebox and the electronic device upon said check in. The electronic device is caused to capture at least video of the karaoke performance mediated by the jukebox. The captured video is received from the electronic device at a network location. At the network location, the captured video is combined, with reference to the synchronized times, with high-quality audio captured by the first microphone connected to the jukebox and high-quality song audio corresponding to the song associated with the karaoke performance, in order to create a combined recording of the karaoke performance.

In certain exemplary embodiments, a method of generating a file corresponding to a performance in which a performer sings a song with backup instrumentation is provided. Audiovisual data captured from a user device is received, with the audiovisual data including first audio data and first video data. Audio-only data having a quality higher than the first audio data is received. The first audio data and the audio-only data are digitally combined such that the first audio data is at least partially replaced with the audio-only data in order to produce a new audiovisual data file with user-generated video content synchronized with high-quality audio content based on a common time reference value.

According to certain exemplary embodiments, non-transitory computer readable storage mediums tangibly store programs that, when executed, implement these and/or other methods.

Similarly, according to certain exemplary embodiments, systems are configured to implement these and/or other methods. For instance, in certain exemplary embodiments, a digital jukebox system is provided. In the system, there is provided a digital jukebox device comprising processing resources including at least one processor and a memory, with the processing resources being configured to cause the digital jukebox device to operate in standard jukebox and karaoke jukebox modes. The standard jukebox mode is programmed to cause the digital jukebox device to reproduce instances of media when corresponding payments have been made. The karaoke jukebox mode is programmed to cause the digital jukebox device to enable a karaoke performer to participate in a karaoke performance in which the karaoke performer sings a song through a first microphone connected to the digital jukebox device that is playing the song. A check-in module is configured to enable a user to check in to a site where the digital jukebox device is located via an application running on a portable electronic device being operated by the user, with the application having access to a karaoke queue maintained by the digital jukebox device, the karaoke queue indicating the songs that are being sung. A synchronization module is configured to cause time to be synchronized as between the digital jukebox device and the electronic device upon said a successful check-in operation performed in connection with the check-in module. A non-transitory computer readable medium is configured to receive, via the application, at least video of the karaoke performance mediated by the jukebox captured by the electronic device. A mixer is configured to combine, with reference to the synchronized times, the captured video with high-quality audio captured by the first microphone connected to the jukebox and high-quality song audio corresponding to the song associated with the karaoke performance, in order to create a combined recording of the karaoke performance.

The exemplary embodiments, aspects, and advantages disclosed herein may be provided in any suitable combination or sub-combination to achieve yet further exemplary embodiments.

BRIEF DESCRIPTION OF THE DRAWINGS

These and other features, aspects, and advantages of the instant invention will be further understood by review of the following detailed description of the exemplary embodiments when read in conjunction with the appended drawings, in which:

FIG. 4 is an example karaoke jukebox remote control usable in connection with certain exemplary embodiments;

FIG. 5 shows example performance data associated with a karaoke performance on a karaoke jukebox in accordance with certain exemplary embodiments;

FIG. 9 a flowchart showing an illustrative process for scoring a karaoke performance, in accordance with certain exemplary embodiments;

FIG. 10 is a flowchart showing an illustrative process for adjusting aspects of a karaoke performance, in accordance with certain exemplary embodiments;

FIGS. 13a-13f show a second use case pertaining to smart song suggestions in accordance with certain exemplary embodiments;

Figures 19A, 19B, 19C, 19D, 19E, 19F:
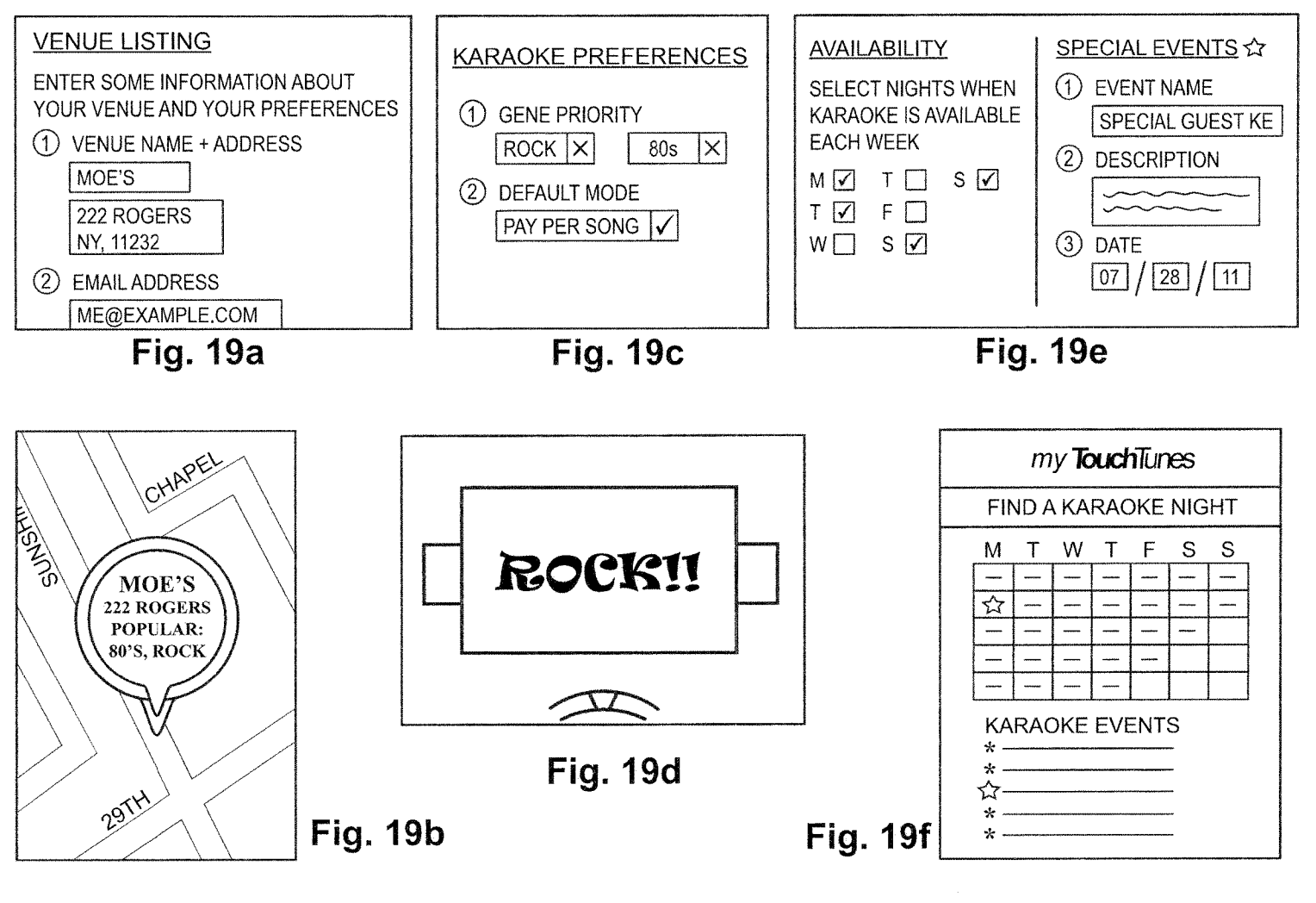

FIGS. 19a-19f show a seventh use case pertaining to performer engagement in accordance with certain exemplary embodiments;

DETAILED DESCRIPTION OF EXEMPLARY EMBODIMENTS

Figure 1:
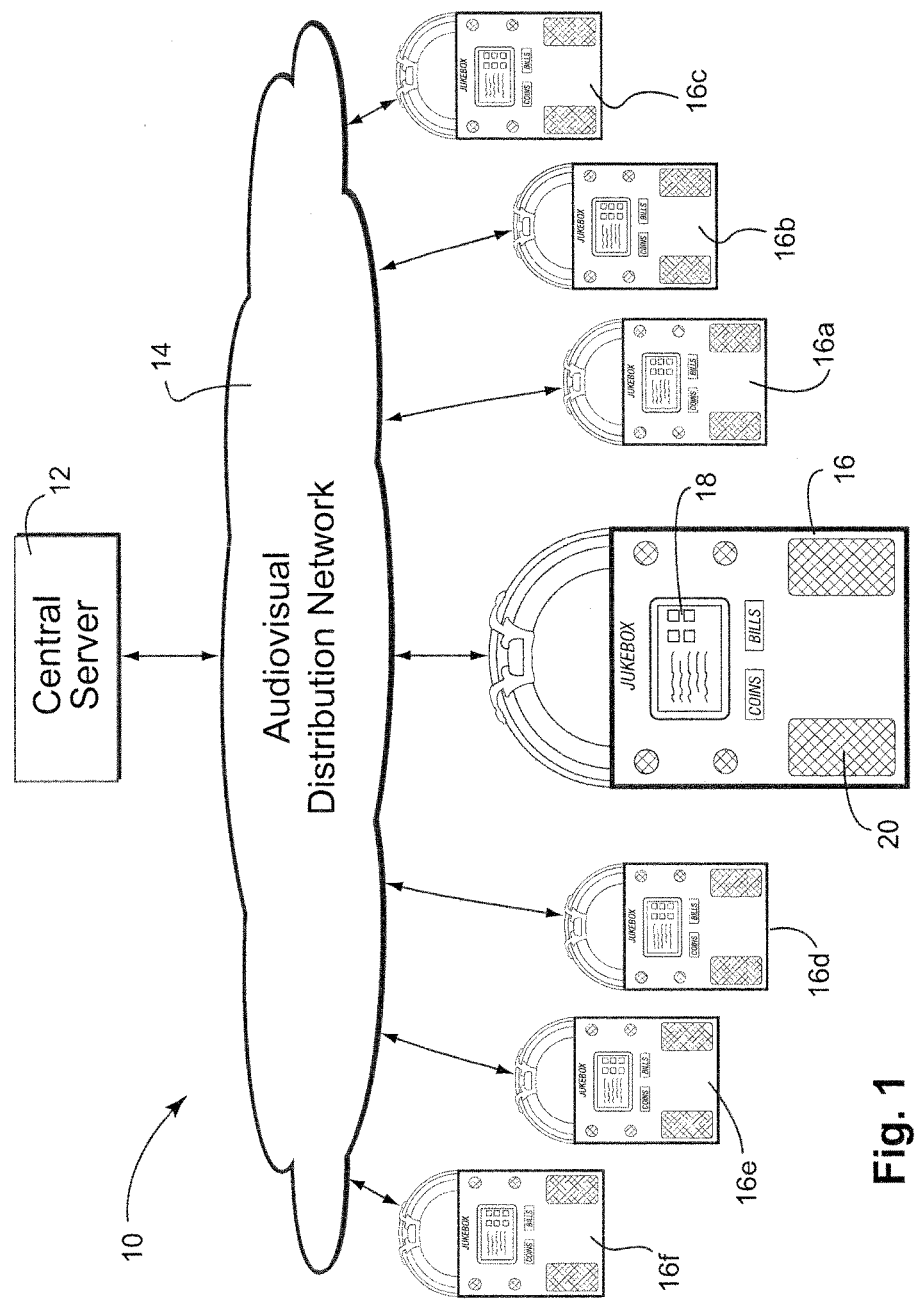
FIG. 1 is a block diagram of a conventional downloading digital jukebox system.
Figure 2:
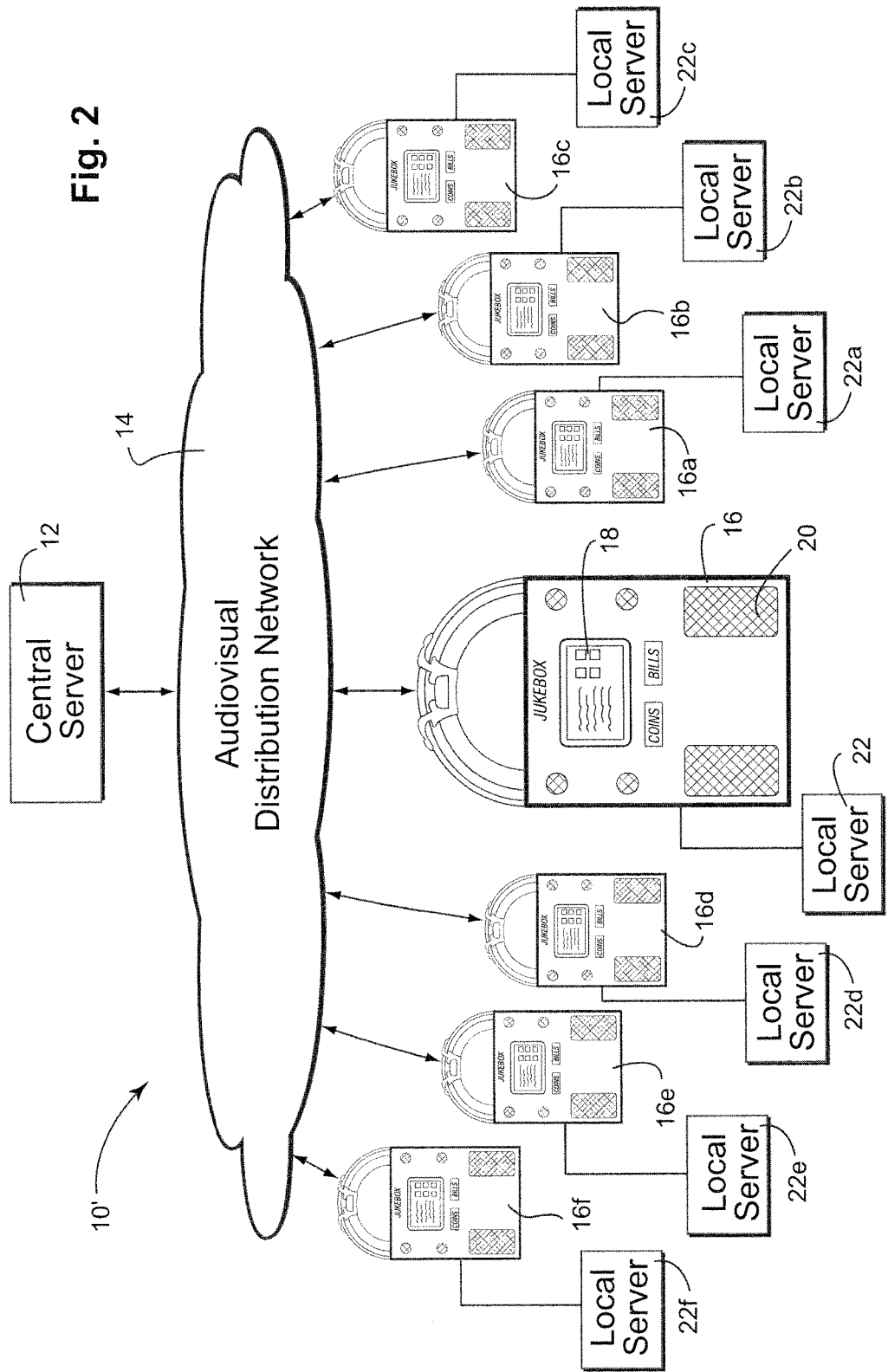
FIG. 2 is a block diagram of an exemplary embodiment of an improved jukebox system 10'.

Referring now more particularly to the drawings, FIG. 2 is a block diagram of an exemplary embodiment of an improved jukebox system 10'. The jukebox system 10' includes similar elements as shown in FIG. 1 and described above, including a central server 12 connectable to communications network 14 and to remote jukebox devices 16, 16a-16f. However, the jukebox system 10' further includes local servers 22, 22a-22f respectively connected to each of the jukebox devices 16, 16a-16f. The central server 12 includes a master library of songs (and/or other content). Each of the jukebox devices includes a subset of the master library on a local storage device of the jukebox. The central server may be used to individually manage the contents of the jukebox device, by monitoring usage of and updating the subset of songs on each of the jukebox devices with the intent of maximizing the usage thereof. The central server 12 periodically receives data from each of the jukeboxes for the purpose of royalty accounting and payment for songs played. The jukebox devices may connect to the network in any suitable manner, such as dial-up modem or broadband modem (e.g., DSL, cable, wireless broadband, or satellite). The communications network 14 may be any suitable network capable of distributing data (e.g., audiovisual data) from the central server 12 to the jukeboxes 16 and enabling data to be uploaded from the jukeboxes 16 to the central server 12.

The songs (and/or other data) may be digitized, compressed and encrypted by the central server 12 prior to sending songs to the jukeboxes for security and bandwidth purposes using known techniques. The songs are then decompressed and decrypted by the jukeboxes for storage and reproduction thereon. Thus, each of the jukeboxes maintains in a database a library of digitized songs for play on the jukebox, wherein the library can be changed or updated through communication by the central server. The jukeboxes may also receive and store data constituting images (e.g., still and/or moving video and/or graphical images) that can be displayed on the display 18 of the jukebox device 16. In one exemplary embodiment of the invention, the jukebox devices have similar structure and operation described in U.S. Pat. No. 6,308,204 referenced above. Thus, the jukebox devices 16 each may include one or more microprocessors, such as a main CPU and an audio DSP, a memory, such as a hard drive, for storing songs and/or other content, a display of displaying visual items, an audio arrangement 20 for providing audio, a communication system for enabling the jukebox to communicate with the central server 12 through the communications network 14, and operating software, including a multitasking operating system, that controls the operation of the jukebox. The operating software also may be updateable through communication with the central server 12 as described, for example, in U.S. Pat. No. 6,308,204 referenced above. The jukeboxes 16 further include one or more payment devices, such as coin, bill and/or credit card input devices, for enabling a customer to pay for usage of the jukebox device in a convenient manner. The screen 18 may be an interactive device such as, for example, a touch screen that enables the user to input selections by touching the screen.

Each jukebox device has, in one embodiment, a local server 22 that can be accessed by the jukebox device. The local servers are respectively connected to the jukebox devices using Ethernet or other type of local connection. In another embodiment, the local server may simply be a logical extension (e.g., partition, directory, or area) of the jukebox's hard drive, rather than a separate hardware device. The local servers 22 may each include a mirror copy of the master library of musical recordings maintained by the central server 12. The local server 22 can be loaded with the master library by the entity that owns and/or controls the jukebox network prior to shipping the local server and jukebox device to the jukebox distributor or operator. Of course, over time, the local sever will no longer correspond identically to the central server, due to the fact that the central server may be continually updated with additional or new songs. Thus, the local servers 22 also may be updated periodically to maintain a correspondence with the library on the central server 12. This updating can be done, for example, by the central server 12 through communication with the jukebox devices connected with the local servers 22 using, for example, either dial-up or broadband modems. Alternatively, the updating can be done personally with an update tool that can be connected by a routeman or other person directly to the jukebox or local server for the purpose of updating the contents of the local server. The portable tool could include a removable storage medium, such as a hard drive, that could be returned to and reused by the owner of the jukebox system for future updates. The tool itself could be kept by the operator or other person in charge of maintaining specific jukeboxes for use upon receipt of the updated removable storage medium from the owner of the jukebox system.

For security reasons, the local server 22 may not include all of the digital data that constitutes any one song that is stored on the local server 22. In addition, the part of the song that is on the local server is encrypted. The jukebox device 16 contains the missing part of each of the songs on the local server, thereby enabling the jukebox to assemble the complete song based on the contents of the local server and the memory on the jukebox device. The missing data located on the jukebox is needed in order to decrypt the songs. For example, a single block (or other small fraction) of data for each song may be missing on the local server but present on the jukebox device, and the encryption may be based on the missing block and may proceed on a block by block basis. Thus, none of the blocks can be decrypted without obtaining and/or decrypting a preceding block. This feature provides significant security and prevents or deters theft or other type of unauthorized use or copying of the songs on the local server. Thus, in this embodiment, each local server must be specifically assigned to a specific jukebox device so that the decryption described above can be properly performed.

In accordance with an exemplary embodiment, the local servers may also each be individually registered with and identified to the central server 12, so that the central server can individually manage and monitor each local server. The same is true for the jukebox device itself, i.e., it may also be registered with the central server so that it too can be individually monitored and managed by the central server. As will be understood from the foregoing description, the local servers become an important and advantageous part of the jukebox system by allowing the contents thereof to be accessed by the jukebox device to provide additional services (such as providing additional songs) not available on the jukebox device itself. As will be explained below, the song library of the central server and/or the storage capacity itself can be advantageously used to provide services to other jukeboxes, such as fee-based residential and commercial jukeboxes and/or other fee-based equipment. One use of the local servers may be to provide an immediate song downloading feature.

Figure 3:
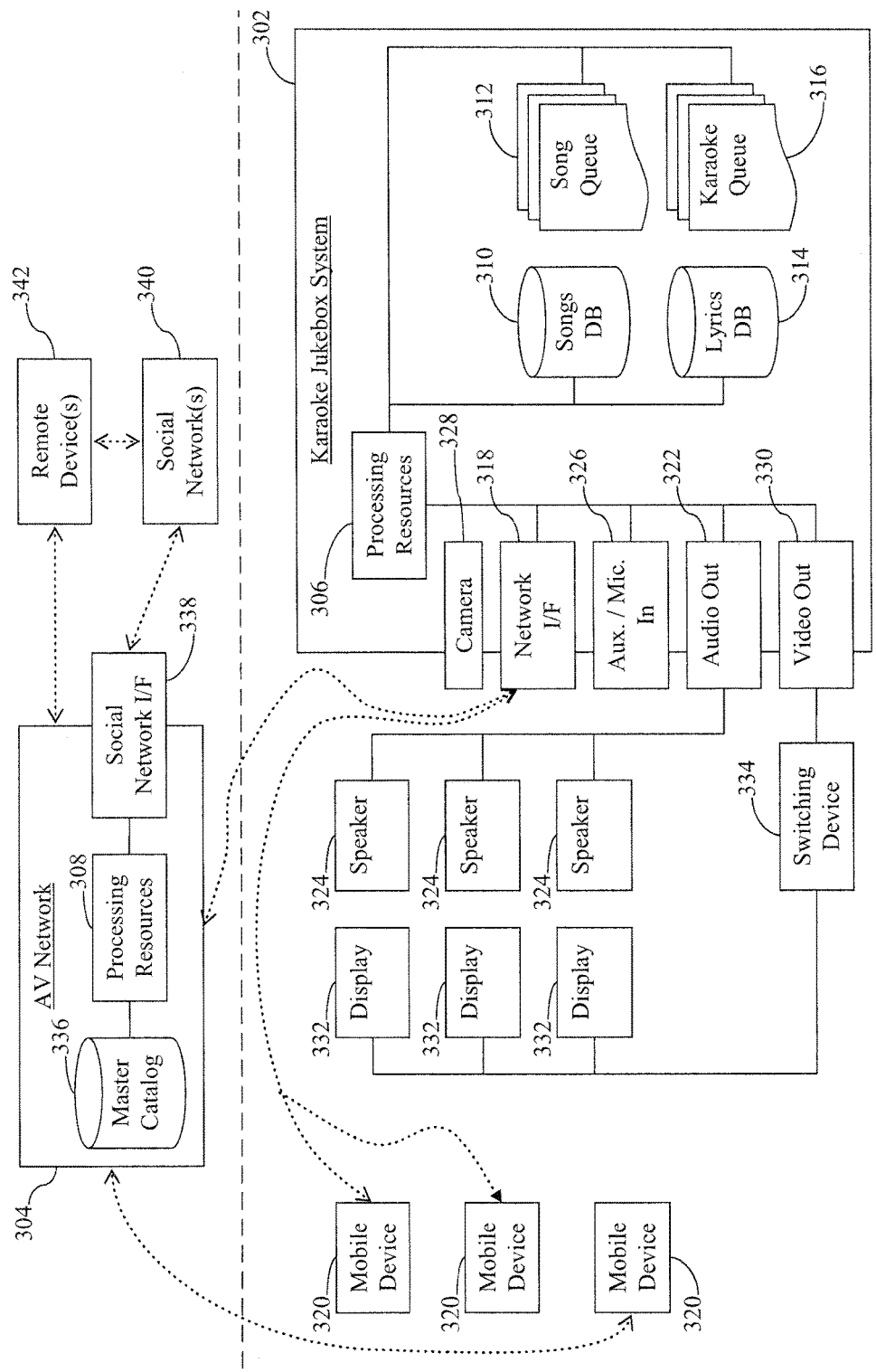
FIG. 3 is a schematic view of a combined jukebox karaoke system for use within a venue or location in accordance with certain exemplary embodiments.

FIG. 3 is a schematic view of a combined jukebox karaoke system for use within a venue or location in accordance with certain exemplary embodiments. Elements shown below the dashed line in FIG. 3 are provided in a single venue or location, whereas elements shown above the dashed line are provided outside of that venue or location. It will be appreciated that multiple venues and/or locations may be connected to the AV Network, for example, although multiple such karaoke jukebox systems and/or related components are omitted from FIG. 3 for clarity purposes. Also, it will be appreciated that one or more karaoke jukebox systems, displays, speakers, zones, mobile devices, remote devices, social networks, and/or the like, may be provided in different locations and that the numbers of the various elements shown in FIG. 3 are provided for explanatory purposes. In other words, more or fewer mobile devices, displays, remote devices, social networks, may be connected or interconnected in different embodiments.

As shown in FIG. 3, a karaoke jukebox system 302 is connected to an audiovisual (AV) network 304. The karaoke jukebox system 302 includes processing resources 306 (e.g., at least one processor, a memory, a non-transitory computer readable storage medium, and/or the like) that may help execute modules used in karaoke, jukebox, photo booth, and/or other operating modes. The AV network 304 also may include processing resources 308 (including, for example, at least one processor, a memory, a non-transitory computer readable storage medium, and/or the like). The karaoke jukebox system 302 may include a songs database 310, a song queue 312, and a process or module to manage such database and queue. It will be appreciated that the songs database 310 may be provided on a local server in certain exemplary embodiments. Similarly, the karaoke jukebox system 302 may include a lyrics database 314 and a karaoke queue 316, e.g., to help manage operations when the karaoke jukebox system 302 is operating in karaoke mode. In certain exemplary embodiments, the lyrics database 314 may be located at a remote location and thus may be accessible over a suitable network connection.

The songs to be used for karaoke may be stored in the songs database 310 in certain exemplary embodiments. However, in different exemplary embodiments, the songs to be used for karaoke may be stored in a database separate from the songs database 310. That separate database may be a part of, or at least accessibly by (e.g., from a remote location) the karaoke jukebox system 302. In still other exemplary embodiments, songs from the song database 310 may be used for karaoke, e.g., if a vocal eliminator or other transform is applied so as to suitably reduce (and sometimes even eliminate) some or all of the main vocal tracks in the song. Of course, the vocal eliminator may be bypassed when the jukebox is operating in its normal jukebox mode. In certain exemplary embodiments, these features may be combined in various combinations and/or sub-combinations. For instance, two or more database of karaoke songs may be provided separate from the songs database 310, e.g., with one database of karaoke songs being available on the karaoke jukebox system 302 and another database of karaoke songs being located remote from, but still being accessible and managed by, the process of the karaoke jukebox system 302. A premium or at least increased number of credits may be charged for accessing songs from the remote database of karaoke songs, e.g., as specified in a fee table and as read by the system 302 when modes are changed and a selection is made in a respective mode. In certain exemplary embodiments, another premium may be charged for selecting a song from the "regular" songs database 310 and then applying the vocal eliminator or other transforms to it, also potentially as specified in the fee table. This second premium may be higher than the first premium in certain exemplary embodiments.

Metadata may be associated with songs in the karaoke database or catalog. Such metadata information may include, for example, lyrics of a song, rated difficulty, key, range, snippet (e.g., available for playback on a mobile device), an indication as to when the song was last played at a given location or venue, its popularity, frequency of play, etc. This and/or other information may be used in helping to develop recommendations for patrons in general or patrons who are recognized jukebox and/or karaoke users (e.g., based on their known favorites, known vocal ranges, etc.), when a recommendation function of the jukebox is activated by the patron, when the patron logs into the jukebox, etc.

In certain exemplary embodiments, a simple karaoke and/or song queue may be maintained. However, in certain other exemplary embodiments, a priority queue may be maintained, e.g., based on additional credits paid. Additionally, or in the alternative, smart queuing may help to group similar or dissimilar songs or songs that sound good together in a group (e.g., a medley of different songs), space apart duplicates, delete duplicates, space apart or move together songs that are known to get a good crowd reaction, etc. A program or program module corresponding to this smart queuing function may implement this dynamic reordering based on, for example, popularity scores associated with the songs, beat counts or known tempo data (e.g., retrieved from a metadata source including such information) saved in the database or otherwise known ahead of time, artist/album/song title data, and/or the like.

To accommodate network connections, the karaoke jukebox system 302 may include a network interface 318, which connects the karaoke jukebox system 302 to the AV network 304 and/or other outside resources. The network interface 318 of the karaoke jukebox system 302 also may accommodate connections to patrons' mobile devices 320. It will be appreciated that such connections may be direct connections to the karaoke jukebox system 302 or indirect connections, e.g., mediated by the AV network 304, a local server, and/or the like.

Audio may be output from the karaoke jukebox system 302 using one or more audio output ports and/or circuits 322. The audio output 322 may support zoned output, e.g., to multiple speakers and/or speaker systems 324. The operating system of the jukebox may maintain separate song and/or karaoke queues for the various zones in certain exemplary embodiments. For instance, separate queues may be maintained so that songs may be played in certain zones even though other zones are playing different songs and/or are participating in karaoke. Auxiliary and/or microphone input ports 326 may facilitate one or more microphone connections, e.g., for karaoke, general announcement and/or other purposes. A camera 328 integral with or otherwise connected to the karaoke jukebox system 302 may be configured to capture images and/or videos, e.g., for use in photo booth and/or other modes (and in some cases at least temporarily stored on a storage location of the jukebox device). For example, the camera may be used for custom attract loops (e.g., where images and/or video from the location are captured and incorporated into standard attract videos/images at predefined or other times), security purposes, etc. A video output circuit 330 may facilitate connections to multiple displays 332, e.g., through a switching device 334 as described herein.

A storage location of the AV network 304 may include a master catalog 336 of instances of media available for playback on the karaoke jukebox system 302. This may include, for example, songs, advertisements, attract media clips, and/or the like. The AV network 304 also may include a social network interface 338, enabling connections to be made to one or more social networks 340 (such as, for example, myTouchTunes, Facebook, Twitter, LinkedIn, etc.). One or more remote devices 342 may be able to connect with the AV network 304, the social networks 340, and/or the karaoke jukebox system 302 (e.g., directly or using the AV network 304 as an intermediary) in certain exemplary embodiments.

In different scenarios, a KJ may be a member of the venue staff, an enthusiastic audience participant, an operator, or an automated (machine) controller in different exemplary embodiments. A human user may, for example, operate a simple remote control or remote controlled equipped smart device, e.g., to manage the sequence of subsequent performers, make a simple audio adjustments, and provide spontaneous event related commentary or supplemental audio and video clips or segment initiation. In example use cases, a control system may be used to move a nervous performer back in the queue, raise or lower the volume for a particular performer, play prerecorded applause or cheering, display encouraging or amusing comments on the video display systems, skip performers who are no longer present (e.g., because they have left the venue, are not available, have decided to skip their performance, etc.), and/or the like. Human KJs may be located at or remote from the venue in different example scenarios.

An example karaoke jukebox remote control usable in connection with certain exemplary embodiments is shown in FIG. 4. The example karaoke jukebox remote control shown in FIG. 4 may have a plurality of buttons or switches. For instance, volume controls 402 and 404 may be used to increase and decrease the microphone volume, respectively. Other buttons (not shown) may be used to adjust the background music, etc. The KJ may use dedicated buttons, menus, or the like, to cause encouraging messages to be displayed to a display visible by the performer and/or the audience. For instance, the KJ may trigger random "good" or encouraging messages, and "bad" or taunting messages to be displayed by pressing the good and bad message buttons 406 and 408, respectively. In certain exemplary embodiments, a KJ may have dedicated buttons for dedicated messages. Alternatively, or in addition, in certain exemplary embodiments, the karaoke jukebox remote control may have a keypad or other input mechanism so that the KJ can input custom messages or select from a catalog of predefined custom messages. The KJ may cause the performance to be recorded by pressing the record button 410, and may cause the music and/or recording to be paused by pressing the pause button 412. A KJ may skip a performer by pressing the skip button 414, e.g., if the performer is not there or has not checked in (e.g., via an SMS or email message, by talking to the KJ prior to the performance, etc.) The KJ also may trigger canned applause or other effects by pressing the applause button 416 or the like. The karaoke jukebox remote control may have a remote transmitter that operates under infrared, RF, Bluetooth, or other frequencies to communicate with the karaoke jukebox system for these and/or other purposes. In certain exemplary embodiments, the karaoke jukebox remote control may include a microphone connected to the karaoke jukebox system and/or speakers in the venue, e.g., so that KJ can make announcements, offer verbal words of encouragement, call the next performer, etc. It will be appreciated that the example remote control may have these and/or other buttons or switches for controlling the jukebox in either or both of jukebox and karaoke modes. In certain exemplary embodiments, the KJ's remote control may be a virtual remote control accessible via an electronic device such as, for example, a laptop, smart phone, tablet, or the like.

In certain exemplary embodiments, the jukebox, operating in a karaoke mode, may be configured to take over one or more peripheral displays connected to the jukebox, e.g., by sending a karaoke alert signal and overriding the video source.

Because the display systems within a venue may be prewired and because it has been observed that the staff of a location typically does not want to be involved in potentially tedious management of the displays (which may be televisions in some example setups), it would be desirable to provide a technique for initiating karaoke and having the displays the location owner has chosen to automatically switch from the broadcast video feed to the karaoke feed. Certain exemplary embodiments therefore may incorporate a small computing device, sometimes referred to herein as a switching device (e.g., switching device 334 in FIG. 3), between the existing video or audio-video feed from the satellite, cable, internal broadcast source, or other video feed, and the display device. In "normal" broadcast mode, television signals may pass through the switching device. However, when the jukebox is switched into karaoke mode, a control signal may be sent to the switching device, which then overrides the inbound broadcast source and replaces it with video and/or images to support the karaoke experience. One or more TVs may be connected to the single switching device, thereby allowing the ability to cascade the display to many televisions, with potentially all rendering the same karaoke video signal. In certain exemplary embodiments, the control signal may have information embedded therein indicating which displays are to be switched to karaoke mode, and which are not. The switching device may read or decode this signal and cause the correct video signal(s) to be transmitted to the appropriate display(s).

A data stream of lyrics, performance, and/or other data may be created for display on an associated display device. This information may be created by the jukebox, the switching device, a video server, or some other device. The created data may include, for example, an ongoing display of upcoming performers, information about the current performance (e.g., lyrics, performer identifier, song identifier, etc.), comments about previous performers, the experience in the venue generally, etc. A data stream of lyrics and performance data in certain exemplary embodiments may be displayed on or via the karaoke jukebox alone, one or more displays connected to the karaoke system, portable devices logged into the jukebox system at or remote from the venue, and/or the like.

Certain exemplary embodiments may enable a patron to search for lyrics to discover a song to sing. It will be appreciated that it would be desirable to enable patrons to find music that they would feel comfortable singing. Unfortunately, however, it oftentimes is difficult for individuals to spontaneously think of a song that they would enjoy singing and/or that they could sing well (or at least enjoyably). The more "hints" or "triggers" provided to the patron to find the song, however, the higher the likelihood that the patron will ultimately find an acceptable song and thereby volunteer to perform. Thus, certain exemplary embodiments enable patrons to search the karaoke catalog in one or more ways including, for example, by original artist, by song title, by genre, by key, by beats per minute, by performance type (e.g., solo, duet, group, etc.), by year or the period when a song may have been popular, etc. In addition, or in the alternative, a performer may want to sing a song about a particular subject, possibly making it appropriate for the moment (e.g., a patriot song on Independence Day, a Christmas or Hanukkah song during the month of December, a birthday-related song on a friend's birthday, etc.). Collections of songs may be assembled into songbooks that offer similar characteristic that can be labeled and potentially assist the performer in finding a song. Oftentimes, performers recall only a portion of the lyrics of the song. For these situations, patrons may be able to use a search function to search a lyrics database for a phrase or selection of words to find songs containing them.

Performers may identify themselves. Identification of performers may, for example, facilitate retention of performance data. Indeed, a performance name could be provided as a casual or playful name or handle, or simply the first name of the individual to perform. Providing performance names also may help performers know when their turns are, e.g., if a queue is visually displayed on a suitable display device. Performance names may be used in presentations of the actual performance, e.g., to help identify the singing "artist." An example tagline may be provided, with suitable text such as, for example, "Coming up next, My Way, by Dave."

Performers also may want to "keep" or otherwise have access to their performances or data about their performances such as, for example, what song was sung, when they sang it, the location they sang it in, etc. This information may be stored in a database on the jukebox and/or in the audiovisual distribution record, e.g., as a part of a patron's personal karaoke record. To maintain such a personal karaoke record, a patron may login to the jukebox system with a user id/password combination, or create a new profile, and submit credentials to an authorized station service from a social network that the performer participates in such as, for example, Facebook, Twitter, myTouchTunes, or the like. The karaoke jukebox system may then associate the audio-video and performance data with the performer, e.g., by using profile information. Appropriate follow-on actions then may be taken on the performer's behalf such as, for example, copying media or metadata to a remote repository for subsequent playback, posting elements of the performance to a social network web service under the performance credentials, etc. The posting to the social networking site may be as simple as a "Tweet" along the lines of "@Dave performing #My Way at #Michael's Bar," potentially with an expected or actual performance time to either "advertise" or "commemorate" the experience. Alternatively, or in addition, more content-rich data may be posted such as, for example, an audio and/or audiovisual clip of some or all of the performance.

FIG. 5 shows example performance data to be stored in association with a karaoke performance on a karaoke jukebox in accordance with certain exemplary embodiments. Each performance may be tagged with a performance ID 502, which may be a computer-generated unique alphanumeric or other identifier. The performance date and/or time 504 also may be specified, along with an indication as to the location or venue 506 in which the performance is taking place. The performer's name or other identifier 508 may be included in example performance data shown in FIG. 5. The song performed 510, as well as the optional score or rating 512 may also be stored. The inclusion of the location or venue 506, performer name 508, and/or song performed 510 may enable searches to be made through an appropriate user interface, e.g., accessible via a mobile application on a mobile device, on a remote computer, etc., e.g., for enabling a connection to and search on the karaoke jukebox. For instance, a particular patron may want to review all of the songs that that patron has (or his/her friends have) performed. A venue or location may want to view all of the performances from a particular night, rate them by score or other factor, and then offer a prize. A virtual head-to-head competition can be made based on multiple performers singing the same song and prizes awarded accordingly. The example performance data shown in FIG. 5 and/or other information may be stored in a database on the karaoke jukebox system and/or a central server, in certain exemplary embodiments.

Figure 6:
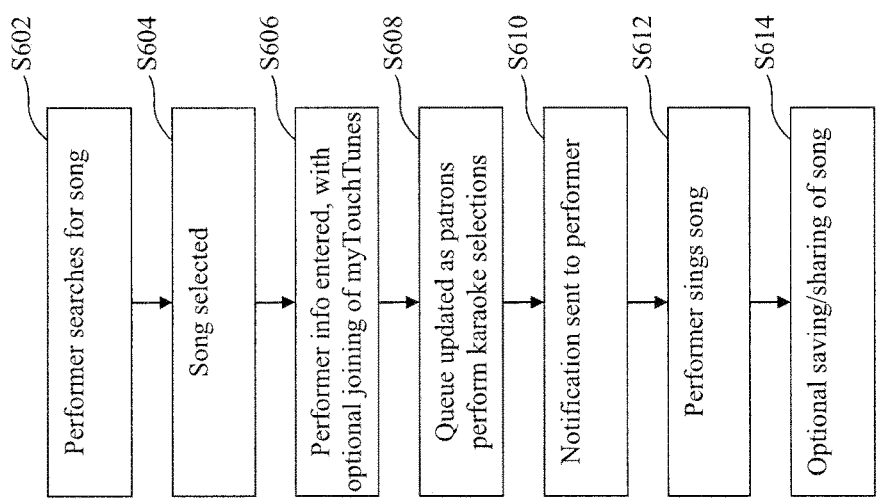
FIG. 6 is a flowchart showing an illustrative process for logging into a karaoke jukebox, selecting a song to be performed, and optionally uploading data to a social networking site, in accordance with certain exemplary embodiments.

FIG. 6 is a flowchart showing an illustrative process for logging into a karaoke jukebox, selecting on a display or with a remote control a song to be performed, and optionally with a communication arrangement uploading data to a social networking site, in accordance with certain exemplary embodiments. A performer searches for a song in step S602. The search may be performed based on, for example, song name, artist, album, popular or recommended karaoke songs (e.g., dynamically updated for the venue, dynamically updated for all karaoke jukebox enabled venues, based on a predetermined list, etc.), songs the performer has sung before, songs recommended specifically for an identified performer (e.g., based on the performer's prior performance history, prior scores, known vocal range, etc.). A song is selected in step S604, e.g., using the karaoke jukebox system or a mobile device connected to the karaoke jukebox system (such as, for example, a bar-top or wall mount terminal, a mobile device of the performer in communication with the karaoke jukebox system, etc.). If the performer has not already been identified to the karaoke jukebox system (e.g., by virtue of using one's own mobile device, having previously logged into the karaoke jukebox system, etc.), in step S606, the performer may be prompted to enter certain personal information (such as name, telephone number, email address, and/or the like), e.g., so that the performer can be contacted at the right time and in a desired manner. The performer may have the option to join myTouchTunes at this time. In step S608, the queue may be updated as various patrons perform their karaoke selections. At the appropriate time, in step S610, the performer may be notified that it is time or almost time to perform. An SMS, email, or other message may be sent to the performer, e.g., based on known, entered, or other criteria in certain exemplary embodiments. In certain exemplary embodiments, some or all of the karaoke performer queue may be displayed for these and/or other purposes. In step S612, the performer sings the song. The singer may be rated or scored based on quantitative measures such as, for example, synchronicity with the beat, deviations from the expected notes or pitches, etc., and/or more qualitative measures such as, for example, crowd reaction, measured applause, subjective scores from a KJ or other authorized personnel or even guest judges, etc., e.g., as determined via a suitable measurement arrangement. Optionally, some or all aspects of the performance may be saved in step S614, with such aspects also optionally being shared. For instance, audio and/or video of the performance may be saved and/or shared to a social networking site for later viewing.

In certain exemplary embodiments, a karaoke player may be linked with a smart phone, tablet, or other suitable device. This may be advantageous in that it may allow patrons to see the karaoke queue, or at least a portion thereof. In some cases, patrons may want to check on their locations in the queue to manage their time in the venue. In other cases, patrons may want to look at the queue to determine whether it is "worth it" to sign up for a song. Integration with a mobile device therefore may make it possible to view the queue or a portion thereof, browse through the karaoke catalog from a "safe" location where there is not a lot of pressure to make an immediate selection, review the lyrics of a potential song, submit credentials and/or performance name along with the song selection to enter the queue, watch the performance on the mobile device the lyrics for the current song being performed, etc. The smart phone, tablet, or other computing device may interface with the jukebox device directly or via the audiovisual distribution network in different embodiments, e.g., to retrieve queue information, sign up for a performance, browse the catalog, etc. Thus, a remote interface may be provided to the jukebox and/or audiovisual network, allowing the mobile device user to log in and access the lyrics database, karaoke queue, etc., through a customized and simplified user interface.

In certain exemplary embodiments, the time of one or more mobile devices in a location may be synchronized with the time of the karaoke jukebox system. For instance, mobile devices within the location may be able to determine the real time, or at least an offset between the time within the device and the time on the karaoke jukebox or system as a whole. This synchronization may allow two or more devices within the venue to present or capture media in a manner that is synchronized to what is being presented on or captured via the karaoke jukebox. This media could be promotional, the actual lyrics of the song and the timed visual progression through the lyrics, games associated with karaoke or the performer's performance, time-based quiz or voting interactions, and/or the like. The synchronization of time between the devices may facilitate public workgroup contests, quizzes or surveys, etc., being completed in a fair and visually sensible manner.

Certain exemplary embodiments enable the creation of a "mixed performance" that accepts audio from the karaoke jukebox microphone(s) input(s), as well as the backing music audio track. Thus, in certain exemplary embodiments, the karaoke jukebox offers real-time music mixing and manipulation arrangement by, for example, overlaying the inbound performer audio while also rendering the song music media. These two audio streams may be mixed by the mixing arrangement together to create a merged audio file, including both original music and audio captured in the venue. This resulting merged file may be considered a new work to be tracked for royalty and rights holder properties. However, the resulting merged file may be transferred and/or re-performed under the karaoke jukebox systems' control, e.g., to facilitate rights tracking and/or royalty sharing. Additional audio may be pre-pended or appended to the merged file, e.g., to include sponsored advertisements, information about the venue and/or performance, rights information, etc.

In a similar vein, a configuration arrangement of the karaoke jukebox system may be used to configure the jukebox to alternatively or in addition create a mixed performance of the microphone(s) input(s) and the backing music, together with one or more still images in a video file for later access. Doing so may help to create the illusion of a professional performance for the karaoke performer, adding to the overall sense of enjoyment on the part of the performer. The performer may take one or more pictures on the karaoke jukebox device itself, from a connected mobile device, from an image stored on the performer's social network environment, and/or other source(s). For those recordings that are retained, pictures may be used as graphics along with the recorded performance audio. Multiple pictures may be used in a slideshow-like fashion. In certain exemplary embodiments, the karaoke jukebox system may automatically insert pictures at predefined locations. Such locations may include, for example, the beginning, middle, and/or end of the song. Other locations may include, for example, automatically detected and/or predefined "transition locations" in a song (e.g., at the well known different parts of Queen's "Bohemian Rhapsody," whenever a beat is dropped in Rush's "Freewill," etc.).

In place of, or in addition, using still images, certain exemplary embodiments may alternatively or additionally incorporate video recordings in a video file for later access. For instance, if the performer chose to sing into a camera in, on, or of the karaoke jukebox, it may be possible to record the video and merge it with the audio from the microphone (s) and the background music to generate a common audio-video file of the performance. This audio video file also may be subject to the rights holder's music restrictions and therefore may also be restricted to the ownership rights assigned to the video file by the performer and/or the owner of the background music. The karaoke jukebox system including network services may maintain control over some or all aspects of the media so as to help ensure a respect for all of the stakeholder's rights.

The video file may be made to include automated lead-in and/or lead-out audio and/or video for later access. The lead-in/lead-out audio/video may be stored on or accessible by the karaoke jukebox system, and the performer may or may not select such clips in different implementations. For karaoke jukebox performances that have an associated video, these clips may effectively serve as an "envelope" for the performance. This may help to create a professional looking memento of a pleasant performance event, that optionally may be purchased for a price (e.g., via subsequent download from the karaoke jukebox system, a social networking site like myTouchTunes, retrieved via email, etc.), automatically distributed to registered karaoke jukebox users, uploaded in whole or in part to social networking sites, etc.

Figure 7B:
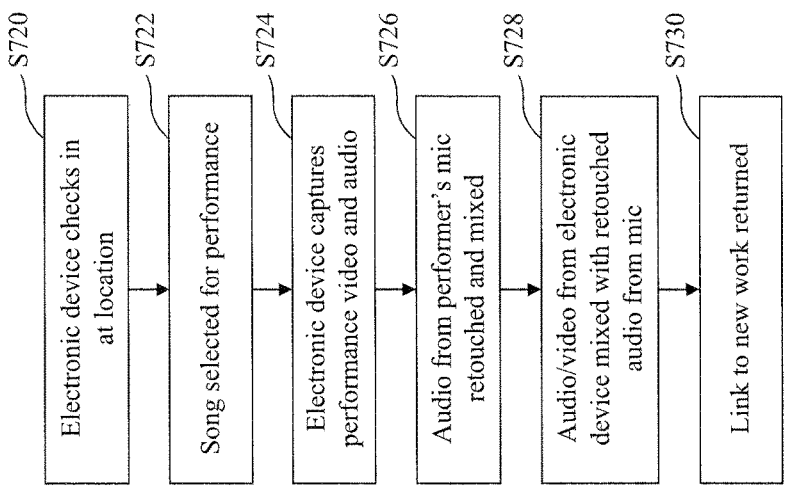
FIG. 7*b* is a flowchart showing an illustrative "use case" for a performer competing a karaoke performance at a venue in accordance with certain exemplary embodiments.
Figure 7A:
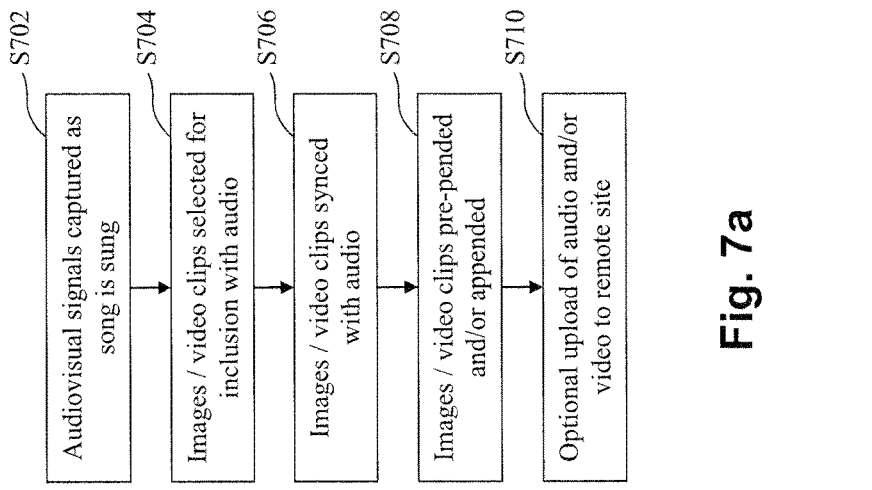
FIG. 7*a* is a flowchart showing an illustrative process for combining captured audio, image, and/or video content, in accordance with certain exemplary embodiments.

FIG. 7a is a flowchart showing an illustrative process for combining captured audio, image, and/or video content, in accordance with certain exemplary embodiments. Audiovisual signals are captured as a song is sung, e.g., in step S702. For instance, audio data may be captured using the microphone into which the performer is singing, thereby resulting in a high-quality capture of this portion of the performance. The performer's audio may be digitally or otherwise overlaid or combined with the background music, as that is available via the karaoke jukebox system itself. Images and/or video may be captured by a camera mounted on the karaoke jukebox system, cameras set up in the location or venue, and/or mobile devices of patrons in the location or venue. Images and/or video clips may be selected for inclusion with the audio. It will be appreciated that pre-canned or prerecorded video clips may be included, e.g., at the beginning and/or end of the clip, during "breaks" in the music, etc. In cases where there is only one video source, the selection may be made automatically. In cases where there are multiple possible video sources, the performer, KJ, or other editor may select the appropriate clip(s) and/or image (s) and also indicate where they should be placed in the overall stream. In other still other cases, clips and/or images may be selected automatically on a random or non-random basis, e.g., by determining where the performer is standing or facing and selecting an appropriate image or video clip. In step S706, the audio and image(s) and video(s) may be synced together, e.g., based on a master or common time reference values. Further images and/or video clips may be pre-pended or appended in step S708. The combined video and/or audio may be optionally uploaded, in whole or in part, to a social media site, a common server on a remote site, made available to the performer via a directly link emailed or other sent to the performer, etc.

FIG. 7b is a flowchart showing an illustrative "use case" for a performer competing a karaoke performance at a venue in accordance with certain exemplary embodiments. In step S720, an electronic device of a user check in to a location, e.g., through a social network and/or via an application running on the electronic device (which may be, for example, a smart phone, tablet, or other device). In this example scenario, the user is a friend of the person about to perform. Because the user is checked in at the location, the application knows who is performing what song, when. For instance, the application may have access to a karaoke song queue on the karaoke jukebox device at the location. The performer selects a song in step S722. The friend of the performer may actuate a "record" button on the electronic device, at which point the electronic device may be caused to capture audio and/or video of the performance in step S724. It will be appreciated that the audio recording may be highly directional and of a potentially lower quality because of the hardware of the particular user's device, the location of the user, and the potentially high degree of ambient or background noise. Correspondingly, the video may be limited by where the user points the camera. In certain exemplary embodiments, the audio and/or video data may be stored to the device and later transmitted to a network storage location (e.g., in the cloud) for subsequent process, e.g., as described below. In certain exemplary embodiments, the audio and/or video data may be streamed to and/or stored directly on a network storage location.

As the performer performs the song, audio from the performer's microphone may be captured. This microphone may be a high-quality input source and may be controlled to capture a small amount of background noise, especially when compared with the amount of background noise of the electronic device. The audio from the performer's microphone may be digitally "retouched" and mixed with the underlying high-quality music from the karaoke jukebox, e.g., in connection with a suitable module of the jukebox, a server, or other computer resource. Digital and/or other effects may be added, for example, to add reverb, depth to the vocals, harmony lines, auto-tune features, etc. These effects may be triggered automatically, e.g., at predetermined points in the song, e.g., where the original recording originally included such features. A metadata database may be consulted by the computer system doing the retouching for such information and optionally to trigger such effects. The digital and/or other effects may be added by applying known filters, algorithms, transforms, and/or the like at these and/or other predefined or user-specified times. In certain exemplary embodiments, the digital and/or other effects may be added directly on the karaoke jukebox itself, e.g., via a suitably configured audio manipulation module running thereon.

Referring once again to FIG. 7b, the audio and/or video from the electronic device may be mixed with the retouched audio from the microphone that has been overlaid onto the underlying song audio in step S728. The combination of different audio streams from different sources may become possible because the electronic device was checked in to the location and was synchronized with the local karaoke jukebox system, e.g., thereby providing common timestamps so that the different audio streams can be overlaid in a coherent fashion, even if recording is started and stopped one or more times, the recording from the microphone and the recording from the electronic device start and/or stop at different times, etc. An audio and/or video selection arrangement may be triggered locally or remotely to determine the mixing conditions of each stream with a selected predetermined audio level. Selectively blending together the different audio streams in this way may help create high quality audio while blending in at least some of the ambient sounds for a more user-generated content (UGC), personalized, or do-it-yourself feel, providing a greater sense of personal ownership in the music-making process and a greater sense of connectedness to the venue and the particular musical event, potentially in a way that simulates a small or intimate "rock star like" performance. In certain exemplary embodiments, the audio streams may be blended together in equal or other proportions. A greater percentage from the electronic device will result in what oftentimes may be considered a more "amateurish" or "less professional" quality recording, whereas a greater percentage from the karaoke jukebox device will result in what oftentimes may be considered a more professional or higher quality recording. Some, all, or none of the audio data from a given source may be replaced with some, all, or none of the audio data from one or more other sources. Replacing 80% of the audio from the electronic device has been found to retain a suitable amount of ambient sound from the venue while still producing a very high quality overall song. However, certain exemplary embodiments may replace more or less than 80%, e.g., as discussed above. It is noted that the replacement or blending may take place on a server in the cloud (e.g., where, or having access to, the audio from the electronic device is stored, after the audio from the karaoke jukebox device is transferred thereto or accessed therefrom, for example), on the karaoke jukebox device itself, or some other location.

In certain exemplary embodiments, audio from multiple electronic devices may be combined with the higher quality audio data from the karaoke jukebox system. This may be advantageous when, for example, highly directionalized audio is captured representing, for example, left- or right-channel audio data, e.g., by virtue of the location of the person doing the recording. In certain exemplary embodiments, left and right channel audio data may be mixed in at equal parts, e.g., using a suitable interface arrangement. In other cases, the source recording(s) may be converted to monophonic data and replicated over both left and right channels. Similarly, vdata may be mixed in from the various sources, as well. This may be advantageous, for example, if a computer algorithm detects too much darkness, too much light, fast movements that might cause dizziness when played back, etc. In certain exemplary embodiments, all audio and/or video streams may be stored for later mixing and matching, e.g., by the performer, the recorder(s), the venue, and/or others.

Still referring to FIG. 7b, once the new work is created, in step S730, a link enabling its download may be sent to some or all involved parties. For instance, a link may be provided to the owner of the electronic device who captured the audio and/or video, with corresponding contact information being known by virtue of the application running on the electronic device; the performer of the song, with corresponding contact information being known by virtue of the performer having provided login or other identifying credentials to the karaoke jukebox system (directly and/or through the KJ), the KJ, the venue, and/or other parties. In some implementations, all of this information may be at least temporarily saved at a suitable storage location until the link is sent and/or accessed. In certain exemplary embodiments, the links may be links to streaming media. In certain exemplary embodiments, audio and/or video files may be distributed rather than links.

In certain exemplary embodiments, the performer may be able to preview the media before it is distributed to others, e.g., using the link, accessing information from a jukebox or other designated terminal or device, etc. For instance, the performer may use the corresponding device and a user interface thereon to designate created audio/video packages as being available to anyone, anyone who recorded the performance, friends only, venue only, lists or sub-lists of friends possibly organized in groups, etc. Thus, a performer may have at least some control over user-generated contact that uses the particular performer's likeness. Similarly, in certain exemplary embodiments, the owner or operator of the electronic device may designate the created audio/video packages as being only selectively available. These features advantageously may promote privacy, help performers retain rights in their likenesses, help provide for overall music royalty accounting, etc.

Figure 8:
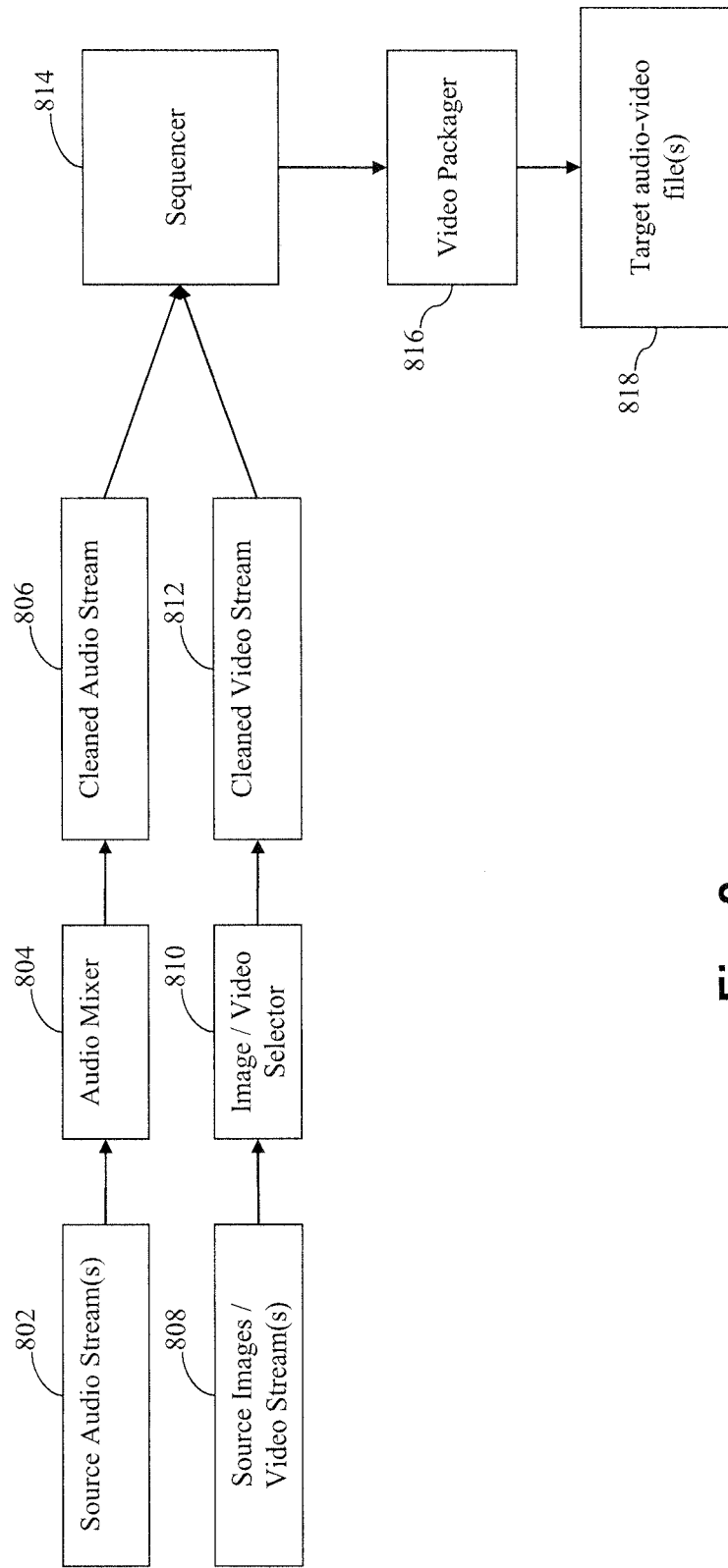
FIG. 8 is an audio-video sequencing system in accordance with certain exemplary embodiments.

FIG. 8 is an audio-video sequencing system implementing the selections made on the audio and/or video selection arrangement in accordance with certain exemplary embodiments. A source audio stream 802 is (or multiple source audio streams are) received from the microphone (and/or electronic devices such as smart phones, tablets, and/or the like) and sent to an audio mixer 804, where it is combined with the background music and/or live sounds from the crowd (e.g., from the electronic devices). The audio mixer 804 may assign different weights to the different audio streams, e.g., such that a small amount of ambient noise is added, whereas the vocal levels are provided at a level suitable for the underlying song being performed. This mixing produces a cleaned and combined audio stream 806. Similarly, one or more source images and/or one or more source video streams 808 are fed to an image/video selector 810. Following such selections, a cleaned and combined video stream 812 is produced. The cleaned and combined audio stream 806 and the cleaned and combined video stream 812 may be provided to a sequencer 814, where they are mapped to one another in a coherent fashion and such that, if combined, they would result in a logical video file, e.g., using the synchronized times associated with the audio and video/images. The sequenced data is then passed to a video packager 816, where they are combined. Optional additional content may be added via the packager 816. Such optional additional content may include, for example, prepended or appended audio and/or video (e.g., with advertisement, sponsor, copyright, download, and/or other information). The target audio and/or video file(s) 818 ultimately may be produced, and optionally uploaded in whole or in part to a server, social networking site, or the like.

The acoustic settings of a venue may be adjusted to properly accommodate the transition from conventional audio to karaoke audio in certain example instances. Karaoke jukebox systems are typically installed in venues where the usage is not 100% karaoke and, as such, the audio systems within locations may be set up through an appropriate interface to support various zones with a relative volume given to each his own. Because the focal point for a karaoke performance typically is the stage or area from which the patron performs, it is possible that the relative volume for each of the zones does not correspond to acoustically logical setup for karaoke. Thus, certain exemplary embodiments may dynamically adjust the volumes for the zones so as to optimize the acoustics for karaoke performances. For instance, plural acoustic program settings may be provided, e.g., for accommodating live jukebox, background music, karaoke, live DJ, and/or other events. These settings may be specified in advance (e.g., by an operator, manager, location staff, or other authorized personnel) and/or dynamically adjusted (e.g., by an operator, manager, location staff, or other authorized personnel). One the relative balance is established, the plural settings may be saved to a non-transitory computer readable storage medium (e.g., of or in communication with the karaoke jukebox system) for possible later consultation. Transition settings between the various modes also may be saved to facilitate switchover as between the various modes in a simple manner.

A microphone configuration utility module may be provided to help establish an improved acoustic balance in the venue. Display screens may be displayed after triggering said configuration utility and may in certain instances instruct or indicate (e.g., on a layout of the establishment or a generic layout) to the technician where to place the microphone(s). After the technician indicates to the configuration utility that the microphone was appropriately placed, the configuration utility may trigger (in connection with speakers) the emission of a series of tones emitted from the various possible zones that may be received by the microphone's inputs and processed to establish the improved balance and volume limits to be applied to the control circuit of the speakers. This technique may ease installation of the karaoke jukebox system and help reduce the likelihood of feedback. In certain exemplary embodiments, the user may be asked to stand in a central area (e.g., a performance area) with the microphone(s). In other exemplary embodiments, the installer may be requested to reposition the microphone (s) in front of the various speakers installed within the location, listen to test signals projected from the speakers, and allow the system to adjust the appropriate volumes and identify potentials for feedback or poor sound quality. The configuration utility arrangement may in certain exemplary embodiments comprise a selection display or arrangement to optionally undertake a zone-by-zone and/or speaker-by-speaker test to be performed in certain example situations. The resulting profile may be stored and used for adjustments in volume, balance levels, etc., when the jukebox switches between modes. These sound equalization techniques may be similar to those provided by Yamaha's YPAO system.

A module of the karaoke jukebox system of certain exemplary embodiments may be configured to detect a dominant melody line within a song and to allow the processor(s) of the jukebox to measure and compare the performer to be measured against this melody line. Such a comparison may be visually displayed for the performer and/or the audience, e.g., so that they can compare the karaoke performance against the performance popularized by the originating artist. This may be accomplished by, for example, comparing the observed sound to a reference saved in the jukebox, network storage location (e.g., of the central server, from an outside provider database, etc.), or elsewhere. In some cases, it is possible to obtain metadata or the like that includes song performance evaluation data, e.g., from an outside source such as, for example, a database maintained by a separate provider, a store of pre-computed metadata managed by the jukebox provider (and accessible via the central server or the like), etc. In other cases, however, the karaoke jukebox system may be able to implement algorithms to search for a melody line against which the performance is to be gauged.

The karaoke jukebox's implementation of this dynamic melody creation, interpolation, or extraction, can be compared against the inbound audio to create informative and entertaining renderings on the displays connected to the karaoke jukebox system. A score can be associated to the performance by comparing the performance to the actual or inferred melody line and/or detected timing or syncopation to the original material for scoring on note accuracy, timing accuracy, and/or the like, e.g., resulting from the comparison of the karaoke performance against the performance popularized by the originating artist and saved in a memory for later use and/or consultation. These accuracy assessments can take place in a regular sampling in certain instances, resulting in a score for each sample and allowing the system to produce an aggregate score depending on the policies in place such as, for example, favoring strong beginning or endings, favoring entire song, discarding deviations beyond a threshold, weighting deviations differently, etc.

In certain exemplary embodiments, the supporting instrumentation (e.g., the song data absent to vocal tracks including, for example, the rhythm section, etc.) may be modified based on, for example, the calculated quality of the performance as compared to the derived melody line. For instance, if a scoring system of the karaoke jukebox system determines that the performer is performing above a threshold, the karaoke jukebox system may be made to generate additional audio signals to be layered into the performance audio (such as applause) and to display new video (e.g., cheering crowds, crowds waving lighters, etc.) and/or cues on the karaoke jukebox video system.

Similarly, in addition or in the alternative, the performer's microphone volume may be altered (potentially dynamically), e.g., based on the calculated quality of the performance as compared to the derived melody line. The scoring system may determine that one performer out of a group of performers singing at the same or different times is scoring higher and thus "doing better" than others. For that singer a, dynamic melody creation, interpolation, extraction arrangement of the jukebox, or the like, may be configured or programmed to have the volume of audio increased relative to the other performers. Similarly, poor performers may have their volume reduced. Additionally, or alternatively, even within a single song, the microphone volume may be increased relative to the underlying song for a good performer, whereas the microphone volume may be reduced the microphone volume may be for a poor performer and/or supporting vocals may be added.

As alluded to above, then, in certain exemplary embodiments, a singer's performance may be based on the calculated quality of the performance as compared to the derived melody line. By using the different scores of performers saved in memory, for example, the scoring system may be able to rate the performance of a performer as an overall score to allow the performer to be compared to other performers and performances of that particular performer or other performers. Similarly, scoring may be based in part on a detection regarding the cadence of the song lyrics and a corresponding comparison to the beat of the song. A karaoke jukebox may use algorithms related to beat detection to alter its lighting, as well as for cadence comparison related to perceived consonants to the song beat. Improved alignment and timing may be made to result in a higher score. Scores in absolute terms and/or tending to reflect comparative performance, e.g., over time for a particular performer, may be provided in certain exemplary embodiments.

Depending on the resulting beat detection and performance comparison provided by said above algorithm, it may be desirable to add supporting acoustics to the performance, for example, to add beat or rhythm backing instrumentals to the performance. If a performer appears to be off-beat, it may be desirable to reduce the volume of that performer's microphone, slow down or speed up the song accordingly, and/or take other ameliorative actions to make the song sound better or at least "not as bad" as it otherwise might.

Thus, certain exemplary embodiments support alteration of the supporting instrumentation based on the calculated quality of the performance as compared to the consonants timing to the beat or the like, microphone volume based on the calculated quality of the performance as compared to the consonants timing to the beat o the like, etc. The singer's performance may be rated based on a variety of factors as indicated above.

FIG. 9 is a flowchart showing an illustrative process for scoring a karaoke performance, in accordance with certain exemplary embodiments. Scoring metrics and/or baseline data is/are defined or calculated in step S902. Baseline data may correspond to, for example, the rhythm of the song or syncopated or otherwise punctuated portions of the song, notes, and/or the like. In step S904, the song is performed. The performance is compared to the baseline during and/or after the performance in step S906. Feedback may be provided during and/or after the performance in step S908. The feedback may be encouraging or taunting comments, instructions or other visual indications to sing higher or lower (e.g., using a pitch meter or the like), generated applause or cheers or the like, etc. Feedback may be produced automatically (e.g., in the case of pitch meter or the like, cheers, etc.), based on patron-specified messages (e.g., sent via text, email, through a mobile application running on a mobile device of the patron, etc.), KJ provided messages, etc. A score may be calculated in step S910, e.g., based in part on the scoring metrics. The scoring metrics may, for instance, determine how many points are to be awarded for singing a note within a specified range of an expected pitch, singing a word or series of words or beat-boxing or the like at appropriate or expected times, manipulating the microphone or other props in an expected way, etc. This score may be archived in step S912. In so doing, information regarding the performance (e.g., as shown and described in connection with FIG. 5, for example) may be saved. Optionally, the song performance may be saved and/or shared in step S914. In certain exemplary embodiments, a performer's scores may be tracked over time and/or may be used as a baseline "handicap" for subsequent scoring, for example.

The key that a performer is best suited to is rarely known for the average individual attempting karaoke. Performers therefore may inadvertently find themselves attempting to sing a song that out of their vocal range, potentially presenting a greater challenge than otherwise would be necessary or might be desirable (e.g., for an enjoyable experience). A key change algorithm in certain exemplary embodiments therefore may change the key of the song by dynamically transposing it, or raising or lowering the music frequency, or even auto-tuning the incoming audio from the performer's microphone. However, it may be possible for certain exemplary embodiments to recommend a best key for a performer to use and/or a best key for a performer to use on a particular song, e.g., based on past performance and scores, historical or predicted vocal ranges, etc.

It also would be advantageous for a performer to be able to determine their natural key. This may be possible by having the performer sing a short scale or arpeggio following some prompting audio. Alternatively, or in addition, "corrections" for a performer may be made in substantially real time, e.g., by having the person sing a short scale or ratio or song lyric and displaying a graphic showing higher or lower, or just right. This may be performed as a part of a per-performance singer calibration step or during karaoke mode in certain instances.

The key determination algorithm may be able to guide a performer to his or her most natural key (e.g., by visually or otherwise informing the performer how well the performer sings the short scale or audio segment described above, compared to a known or derived baseline) and, once determined, suggest a difficulty rating for each song for that performer, e.g., based on how far away a given song is from the natural key, etc. For instance, songs that are within a whole step of a natural key may be rated as easy, songs that are within a major third may be rated as medium difficulty, songs that are between a major third and a major fifth away from a natural key may be rated as hard, and songs beyond that may be rated as "very hard" or "expert." Such rating may be saved in a memory and compared to the natural key of the performer, e.g., to generate a display list within which the difficulty level is indicated. It also may be able to inspect the number of determined melody line notes that are outside of the performer's range or expected range. The greater number of derived melody notes within the performers range, the higher the confidence level would be that the song would be appropriate for the patron. A song with many notes outside the performer's perceived range would be a more difficult song to perform.

Auto-tuning or auto-tune-like features also may be present on or accessible via the karaoke system and selectively actuated within predetermined thresholds to compensate for deviations within certain amounts and/or to create interesting effects at the appropriate times during certain song performances.

FIG. 10 is a flowchart showing an illustrative process for adjusting aspects of a karaoke performance, in accordance with certain exemplary embodiments. Similar to the description in FIG. 9, baseline data may be defined and/or calculated in step S1002. Optionally, performer-specific adjustment settings may be retrieved (e.g., from a central server) in step S1004. The performer-specific settings may indicate, for example, that the user needs a particular average auto-tune adjustment when singing a given song, that the volume should be increased or decreased in some way, that distortions should be added, etc. In certain exemplary embodiments, the performer-specific settings may be customized for a particular song, venue, and/or the like. The song is performed in step S1006. Similar to step S906 in FIG. 9, a comparison to the baseline data may be made in step S1008. Settings may be adjusted based on deviations (e.g., within predetermined thresholds) from the baseline data. For instance, auto-tune settings may be adjusted, the song may be transposed or have its pitch altered, tempo may be increased or decreased, etc. In step S1012 performer-based settings may be saved and/or modified based on this performance Similar to step S914 in FIG. 9, in step S1014, the song may be saved and/or shared.

If a performer has been identified to the system and the system has determined a most comfortable key (e.g., through an advising procedure such as that described above, the performer submitting a most comfortable key, an analysis of past performances, etc.), the system may be configured to suggest the key that a song should be performed in and/or that is most suitable for the performer and yet still recognizable to the audience. This may be accomplished, for example, by comparing the song, the metadata identifying when singing is taking place, and the perceived or derived melody. Song suggestions also may be generated and/or particular songs ranked based on this data in certain exemplary embodiments.

Rather than the performer selecting a specific song the system may in certain instance provide a game allowing other performers to issue a challenge, e.g., by selecting a song to be sung by a performer who has already agreed to participate in the game and optionally sending a message to that performer, displaying a message on a shared or centralized display, etc. In one example scenario, the game program may offer the possibility to define one or several teams with the name or other indicia of the singers. There could be, for example, multiple (e.g., two or more) teams of one or more (e.g., three) singers. The game program may allow each team may take turns selecting a song for one or more of the other teams' singers. With little preparation, the challenged singers may be asked to perform the song chosen by the opponents. The audience may rate the song performance through a scoring system, simple applause that could be detected by the microphone, by sending text, email, or other messages, etc., and the game program may generate a ranking by using such information. Rankings could additionally or alternatively be based on the more objective techniques described above. Different weights could be assigned to objective (system-determined) and subjective (audience-provided) feedback to determine an overall score. Indeed, objectively "bad" performances oftentimes are enjoyable to audience members, and good "stage presence" can sometimes make up for some objective deficiencies in the performance. The tables could then be turned, and the challenged singers may be able to select a song for their opponents in an example karaoke jukebox operating mode.

In another example variation, the system may be set up to select songs at random but from one or more specific categories, genres, etc. (e.g., from country classics). In this mode, patrons may be asked to sign up to participate in the "country classics challenge" and may be asked to perform the songs selected by the system based on criteria established at the beginning of the contest.

In still another example variation, possible songs may be presented to the audience for the next performer. Based on voting from mobile phones, applause judged by the performer or the system, etc., one of the possible next songs may be selected. This sort of "karaoke roulette" may allow for a tournament orientation, a game that allows an evening or segment of an evening to take place, etc. The scoring may be the same as or different from that described above.

It will be appreciated that these and/or other "variations" may be provided in various combinations and sub-combinations in different exemplary embodiments to provide enjoyable karaoke experiences. Thus, it will be appreciated that these and/or other "variations" may be available on a single karaoke jukebox device, e.g., in different operating modes selectable by a KJ, venue staff, or other persons.

The karaoke jukebox system are provided with a connection arrangement that may support connections to smart phones or portable devices in a manner that allows them to enter the karaoke jukebox environment but continues to respect and manage the licensed content being presented on the karaoke jukebox. The connections from the smart phones or portable devices may take place directly from the portable device to a local area wireless system or near field communication system within the venue, through Bluetooth connections, over a wide area network connecting the smart phone to the karaoke jukebox system server infrastructure, or in some other way.

By virtue of commands and exchange of messages, the server infrastructure may communicate to the karaoke jukebox system commands for changing behavior. These commands may include, for example:

A request for a music or karaoke catalog;
A request for lyrics for a song within the catalog;
A submission of user credentials to log in to the karaoke jukebox system;
A command to check in or initiate a session with respect to a particular venue;
A submission of a song performance request;
A withdrawal of the song performance request;
A request to defer or accelerate a performance request;
A comment or vote or request for information about the current performance;
A request for the pending queue of performances;
A submission from the mobile device to the karaoke jukebox of a photo taken of a performer;
A submission from mobile device to the karaoke jukebox of a picture or video taken of a performer's performance;
A request from the mobile device to the karaoke jukebox and the karaoke jukebox server infrastructure to establish a venue time allowing for synchronization of the devices and the synchronous presentation of lyrics;
Information concerning performance and submission of other vote, a survey response, responses related input;
Other features, as appropriate.

In certain exemplary embodiments, a mobile device may interact with the karaoke jukebox system to search for content using suitable criteria such as, for example, song name, artist, album, genre, theme, recommendations, collections, etc.

In certain exemplary embodiments, a mobile device may interact with the karaoke jukebox system to follow synchronized lyrics being presented on the karaoke jukebox device and/or secondary displays, directly on a mobile device.

In certain exemplary embodiments, a mobile device may interact with the karaoke jukebox system to select a song from the catalog and to submit that song name and a performance name for addition to the performance queue.

In certain exemplary embodiments, the karaoke jukebox system is provided with an arrangement enabling a mobile device to interact with the jukebox system by delivering comment messages to comment on a performance from the mobile application such as, for example, sending encouragements to enthusiastically support the performer, to remain neutral, to comment on how good or how poor the performance is, etc. In certain exemplary embodiments, the messages sent by the mobile device may be used to vote up or down, or like or dislike a performance, e.g., by allotting a timeframe to send messages considered as votes, by inserting in the message a flag identifying the message as a vote, etc. More numerical voting or scoring also may be possible. The votes and/or scoring features may be tabulated and displayed via a display in the karaoke jukebox system.

In certain exemplary embodiments, a mobile device may interact with the karaoke jukebox system to record a performance using the video camera in the mobile device. This video stream may be sent to the karaoke jukebox system, and/or the server for merging with the high quality audio processed through the microphone(s) connected to the karaoke jukebox system, e.g., to create performance video file for later access.

Thus, it may be possible to use a mobile application on the mobile device to record video of the performer's performance of a song. The jukebox system, server, or mobile device may include an arrangement to appropriately synchronize that video with the audio captured by the karaoke jukebox system. In addition, it may be desirable to have some, all, or none of the ambient noise of the crowd and the venue to be added to the composite performance audio. Accordingly, the audio and video files captured by the mobile device may be transmitted through the local wireless within the location, over a wide area network through the karaoke jukebox server infrastructure, or via some other means, to the karaoke jukebox system. At that time either, within the karaoke jukebox system or within the karaoke jukebox server infrastructure, for example, the original song music, the recorded audio from the performer or performers, any real-time alteration such as reverb, the video from the mobile device and, optionally the audience audio from the mobile device, may be integrated into a complete video performance package. This video performance package may be a video file on its own, a series of files that would enable the creation of a video file based on mix input rules governing the relative volumes of all audio data and the resulting quality metrics of the output audio video file, etc. Synchronization may make this combination possible. Similar to the description above, audio and/or video content may be pre-pended or appended.

In certain exemplary embodiments, a mobile device may interact with the karaoke jukebox system to purchase a rehearsal package for use at home or at a location other than a venue, with the package optionally including a fixed number of recordings. On the mobile device, it may be desirable to select a song and, if required, purchase the rights to using that song and lyric data to rehearse for a future performance. This rehearsal package may allow the mobile user to purchase or to have temporary access to a version of the song lyric data playable within the karaoke mobile device one or more times, e.g., up to a limit identified within the package. This rehearsal package may (either for free or at some charge) enable the user to practice singing on the mobile device for a number of hours or days, a finite number of performances, or in an unlimited manner. In certain example implementations, after this time has elapsed, the number of performances has been met, etc., the music and lyrics may not be made available as part of the rehearsal package. It also may be possible to purchase special rehearsal packages that have no limit or much larger limits on rehearsal access to ration or rehearsal number of attempts in different implementations. In certain exemplary embodiments, the rehearsal application may be available for free or a one-time cost, whereas particular rehearsal packages with particular songs may be provided for free or for some amount of money.

Figure 11:
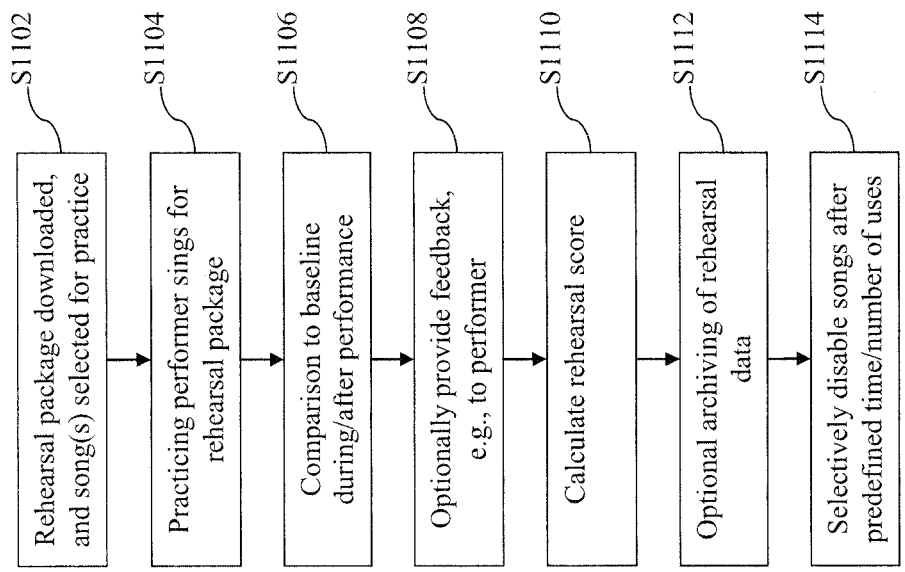
FIG. 11 is a flowchart showing an illustrative process for using a rehearsal package in accordance with certain exemplary embodiments.

FIG. 11 is a flowchart showing an illustrative process for using a rehearsal package in accordance with certain exemplary embodiments. In step S1102, a rehearsal package is downloaded (e.g., to the device on which the package is to be run). A rehearsal package may include one or more songs for practice purposes. In certain exemplary embodiments, a rehearsal package may be matched with one or more songs, e.g., so that a user may download a rehearsal package/song combination. In other exemplary embodiments, a generic rehearsal package may be provided with songs optionally being separately downloadable. The performer may sing for the rehearsal package as practice in step S1104. Similar to as described above, a comparison may be made to baseline data during and/or after the practice performance in step S1106. Baseline data may be calculated in substantially real time, preprogrammed as a part of the rehearsal package, etc. Feedback optionally may be provided in step S1108. A rehearsal score may be calculated in step S1110. The rehearsal data optionally may be archived (e.g., to the device on which the package is running, a network location such as, for example, a central server, etc.) in step S1112. This optional archiving may allow a performer to track his/her performances and possible improvements over time. It also may be used to enable adjustments to be made in a live karaoke jukebox environment, e.g., such that expected auto-tune, volume, tempo, pitch adjustment, and/or other settings may be altered to account for expected deviations from baseline data. In the event that a rehearsal package and/or song has limited usage, the same may be selectively disabled (e.g., after a predetermined number of uses, after a certain time has elapsed, etc.), in step S1114. In certain exemplary embodiments, the rehearsal package may include commercial songs, scales, simple compositions, public domain songs, and/or the like.

Performance and/or grading techniques such as those described above may be possible via a rehearsal module running on a mobile device equipped with a suitable mobile karaoke jukebox application. For instance, it may be possible in certain exemplary embodiments to use a rehearsal package via the mobile device to detect the dominant melody line within a song and to allow the performer to be measured against this melody line. For instance, when using a rehearsal package on the karaoke mobile device, it may be possible to offer the ability for the performer to be measured against this melody line and observe visual and/or audio feedback meters, gauges, or indicators. This may involve the mobile application detecting the dominant melody line, making use of a metadata file including the melody line, etc., and comparing the input audio to the expected melody.

It may be possible in certain exemplary embodiments to use a rehearsal package via the mobile device to alter the supporting instrumentation based on the calculated quality of the performance as compared to the derived melody line. For example, additional beat backing instrumentals could be added as encouragement, or additional voice support may be added for "bad" performances.

It may be possible in certain exemplary embodiments to use a rehearsal package via the mobile device to alter the performer's microphone volume, e.g., based on the calculated quality of the performance as compared to the derived melody line.

It may be possible in certain exemplary embodiments to use a rehearsal package via the mobile device to rate the performer's performance based on the calculated quality of the performance as compared to the derived melody line.

It may be possible in certain exemplary embodiments to use a rehearsal package via the mobile device to detect the rhythm and beat within a song and to allow the performer to be measured by the comparison of consonants timing to the beat. As in the karaoke jukebox system, it also may be desirable within the karaoke mobile system that the music obtained from the karaoke jukebox could be analyzed for beat detection. This beat detection may be used to detect the rhythm and intonation of consonants within the performance and provide a comparison to the music being rehearsed. Alternatively, or in addition, metadata may be provided to aid with or reduce the need for sophisticated detection techniques.

It may be possible in certain exemplary embodiments to use a rehearsal package via the mobile device to alter the supporting instrumentation based on the calculated quality of the performance as compared to the consonants timing to the beat. Depending on the score of this comparison, additional backing instrumentation could be added, removed, etc.

It may be possible in certain exemplary embodiments to use a rehearsal package via the mobile device to alter the performer's microphone volume based on the calculated quality of the performance as compared to the consonants timing to the beat.

It may be possible in certain exemplary embodiments to use a rehearsal package via the mobile device to rate the performer's performance based on the calculated quality of the performance as compared to the consonants timing to the beat.

Performers may use their mobile devices to identify themselves and view personal, competitive, historical, and/or other performance data. For instance, previous performance data for poor performers who have identified themselves may be maintained on the karaoke jukebox server infrastructure. This content may be available through controlled player systems so as to respect the original rights holders' work. The karaoke jukebox mobile application may connect to the karaoke jukebox server infrastructure for the purpose of obtaining previous performances and performance data for the individual who has submitted the appropriate credentials. In other words, to view a video, a mobile device user may have to access content from a secure site or portal through which royalty and/or other accounting metrics may be maintained. This approach may allow the karaoke mobile device to play contents from the karaoke jukebox server infrastructure on the karaoke mobile device in a controlled manner that also respects appropriate copyright laws and/or other relevant agreements. It also may be possible for karaoke jukebox patrons to lend or provide temporary access to media related to their performances, which may be stored on the karaoke jukebox server infrastructure. That media may, for example, be viewed using controlled karaoke jukebox player systems that continue to respect the rights of the original song rights holders and also the rights of the performer.

An identified performer may be able to view previous performances via a mobile device. For instance, on the karaoke mobile device, once an individual has submitted the appropriate credentials, the individual may be able to view their own content (performances and performance data), as well as content for those performers to which they have been provided temporary or permanent access.

An identified performer may be able to share a performance with others through a submission to a social media service through a mobile device. For instance, it may be possible for performers to submit a performance, a performance snippet, or performance data or a combination thereof, to a social media site, e.g., once they have submitted their credentials for a social media service. In certain implementations, such submissions may be automated (e.g., for a venue's social network presence, for certain registered users who have configured their applications appropriately, etc.). For this media to play in the social media site, the social media site may have to support a karaoke jukebox system media player that that is configured to respect all of the rights of those concerned (e.g., by providing limited access, royalty accounting functions, etc.).

Conventional jukebox environments and karaoke environments differ in the sense that, for karaoke environments, there is the concept of a performance soundstage. The karaoke experience may be improved by their being stronger sound around the performance and less sound when far from the performance.

In addition, or in the alternative, a performer may benefit from a monitor, e.g., so that the performer can perhaps more easily hear the music, voice, etc., and make the appropriate adjustments. Monitors may be provided on the floor in front of the performer and facing up at an angle. However, this arrangement can be problematic within some normal bars and restaurants, as the performance stage often serves "double-duty" as the dance floor during jukebox periods. It may be more convenient to have a portable and optionally wireless performer monitor that could connect to the karaoke jukebox when required in certain example scenarios. In certain exemplary embodiments, a performer may use wireless headphones connected to the karaoke jukebox as a monitor. In other exemplary embodiments, a mobile application running on a portable device of the performer may be used to playback the background and/or vocal audio, thereby functioning as a monitor.

The karaoke monitor may in certain implementations make this connection to the karaoke jukebox wirelessly and without any perceived latency. This could be accomplished through conventional wireless data technology, through analog RF communications that could be less subject to interference from other equipment within the venue, and/or other suitable techniques. This sort of arrangement may help avoid the requirement for a wire running across a potentially high-traffic area. It also may be desirable to have this monitor speaker be battery operated, thereby helping to reduce the need for a power cord. This monitor system could be moved to a safe location where it could be recharged during the day and then put into position temporarily during karaoke performances. The karaoke jukebox system may treat this as an additional zone and allowed the performer or the KJ to adjust relative volume for the performers.

Certain exemplary embodiments relate to karaoke video and lighting accessories. As in conventional jukeboxes, karaoke jukeboxes may have the ability to control outbound lighting via a DMX output stream, a serial stream of data indicating light control, or some other means. The karaoke jukebox also may be able to control performer spotlights installed in the venue. These venue spotlights may be aimed at the performance area and may alter color and intensity based on the data stream transmitted from the jukebox, e.g., in time to the music and/or in response to metadata associated with the song being performed, scoring, audience reactions, KJ cues, etc. In addition, or in the alternative, it may be possible, under control of the karaoke jukebox system, to move the spotlights according to predetermined animations such as, for example, searchlight and audience highlight, as well as a variety of other video effects with the lights moving about. The lights may return to the stage based on commands from the karaoke jukebox, after a predefined animation has run, upon KJ cues, etc.

The pan-tilt-zoom (PTZ) capability of these spotlights may in certain exemplary embodiments also be applied to a video camera in certain exemplary embodiments. A video camera may, for example, respond to pan, tilt, and zoom controls from an operator using either a remote control, the karaoke mobile device specially equipped with the remote control, an automated device tracking the performer, etc. Performer tracking could take place from the performer positioning him or herself within a target that is displayed on the second screen, the karaoke jukebox, a screen visible on the audio monitor, or elsewhere. Once positioned inside the screen, and with the song beginning, the karaoke jukebox system may transmit pan-tilt-zoom commands as appropriate to the camera, e.g., based on face, motion, and/or other tracking of the performer.

This PTZ camera and spotlight capability also may be controlled by a camera, trained on the performer, or elsewhere. However, in certain exemplary embodiments, it may respond to infrared light or other signals being emitted by the performer's microphone, e.g., for tracking purposes. A periodic confirmation of the face location of the performer holding the microphone may allow the camera to self-correct throughout the performance in certain example instances.

The performance monitor may include both audio speakers and a video screen for prompting the performer in certain exemplary embodiments. This video screen may perform a face tracking alignment and show the singer's performance superimposed with the lyrics or, alternatively or in addition, could be simply the lyrics or the performance.

The karaoke jukebox microphone system may include a mechanism for animating in visible light such as, for example, infrared or a spatial (e.g., geo) positioning signal, potentially allowing the camera and/or spotlight within the venue to illuminate and record video of the performance. The karaoke jukebox microphone system may have the ability through either a gesture or a button to restart a song from the karaoke system in certain example implementations. The karaoke jukebox microphone system may have the ability either through a gesture or a button to allow the performer to enhance voice performance (e.g., via auto-tuning features). The gesture could allow the second screen or the monitor screen to display options for the performance such as, for example, change key, add reverb, auto-tune, etc.

The karaoke jukebox system may include a server infrastructure that allows patrons using their mobile devices, home computers, or other devices, to access and interact with (e.g., through a browser) the karaoke jukebox environment. This interaction may take place in a matter such that the media presented is secure and respects the song rights holders' rights.

Thus, the karaoke jukebox infrastructure may allow performers to identify themselves through credentials to gain access to the system or at least access to protected media content, performance data, and/or the like. Identified performers with suitable rights may be able to view previous performances, a record of previous performances, and/or the like, through the karaoke jukebox infrastructure.

An identified user could, subject to fees and/or the limits imposed by the rights holder, share access to performance data or performances with other identified users. In addition, or in the alternative, an identified user could, using social media credentials, post access to performance data, performances, or portions thereof, on a corresponding social media site. If the site supports a karaoke jukebox infrastructure media player, for example, it may allow for controlled access to other users already qualifying for access based on authorization by the identified user. In certain exemplary embodiments, generated content may be made available in a proprietary format that is only accessible via a jukebox infrastructure media player. For instance, the proprietary format may include digital rights management (DRM) features, watermarks, and/or the like, and may thus facilitate rights-tracking and royalty accounting.

For performances where unlimited rights have been acquired or where the rights are not required, it may be possible to post performance data or performances to fully public sites. It also may be advantageous for both the rights holders and further performers to be able to post snippets of performance data or performances to social media sites and to sites used to promote the karaoke experience at the venue or on behalf of the karaoke network or a partner of the karaoke network. These snippets need not necessarily contain the entire performance, but instead may provide an opportunity to share a portion of the experience and encourage further investigations. For example, snippets may effectively serve as "teasers," incentivizing a person to purchase a performance, e.g., as a memento of an enjoyable outing.

An identified user may be able to purchase or request use of a rehearsal package for use out of the venue. As indicated above, this rehearsal package may include a duration of time for which the user is able to have access to the song(s) and lyric data for the purpose of practicing, a finite number of performances where the user would have access to the music and the lyric data, etc. In addition a rehearsal package may include guidance instructions or anecdotes surrounding the performance of a particular song.

It may be helpful for the performer to view the quality of his performance as established by comparing the voice to the derived melody line or a melody metadata for that song. This could be graphically or acoustically presented to the performer to encourage and adjust his or her performance. Based on the scoring of the performer's rehearsal, the supporting instrumentation could be altered to provide encouragement. Similarly, using a rehearsal package, the performer's microphone volume may be altered based on the calculated quality of the performance as compared to the derived melody line. The performance ultimately could be rated, e.g., based on the calculated quality of the performance as compared to the derived melody line, beat of song and the lyrics metadata to provide feedback as to the timing of the rehearsal, etc. Based on the scoring of the performer's rehearsal of the song timing and rhythm, the supporting instrumentation may be altered to encourage the rehearsal. In addition, or in the alternative, the rehearsal package may include audio snippets of encouragement from performers or music experts.

The performance packages discussed herein may be provided as standalone components, modules, or arrangements, executable on a computer device including at least one processor and memory. Such components, modules, or arrangements may, for example, be configured to execute process steps corresponding to the flowcharts shown and described herein. The information obtained via rehearsal packages may be stored and uploaded to the karaoke jukebox server, e.g., for future consultation, e.g., in the event that the singer ever attempts to perform a song. Based on performance data from the rehearsal package, values such as degree of auto-tuning, microphone volume, background music volume, etc., may be read and set for the venue.

The following are illustrative use cases for an improved karaoke jukebox system in accordance with certain exemplary embodiments.

Figure 12E:
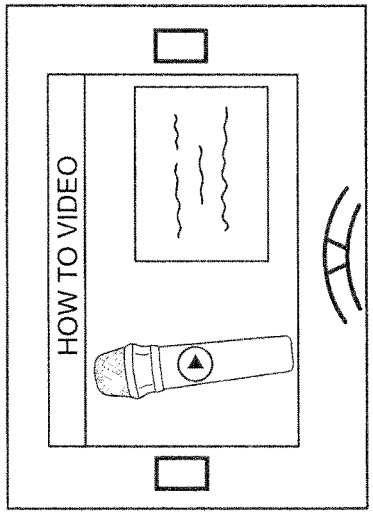
FIGS. 12a-12f show a first use case pertaining to first time song queuing in accordance with certain exemplary embodiments.
Figure 12F:
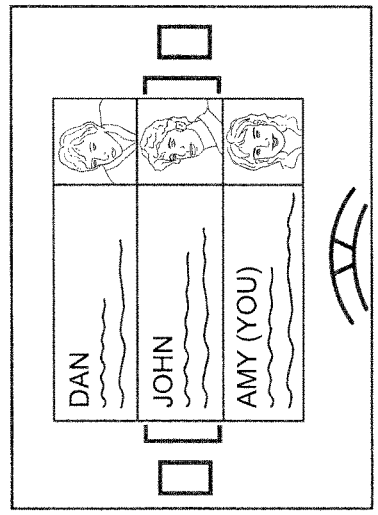
Figure 12C:
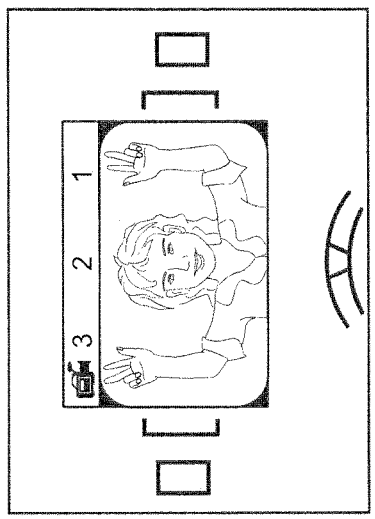
Figure 12D:
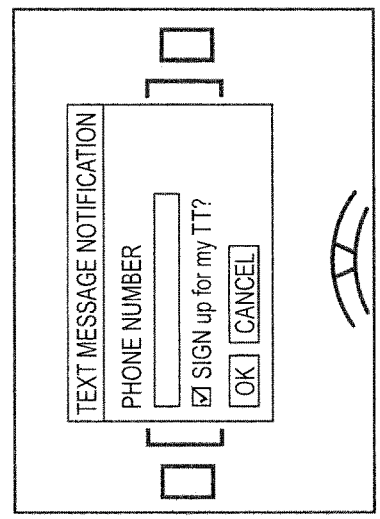
Figure 12A:
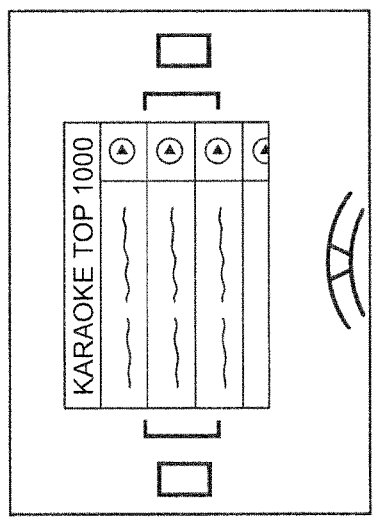
Figure 12B:
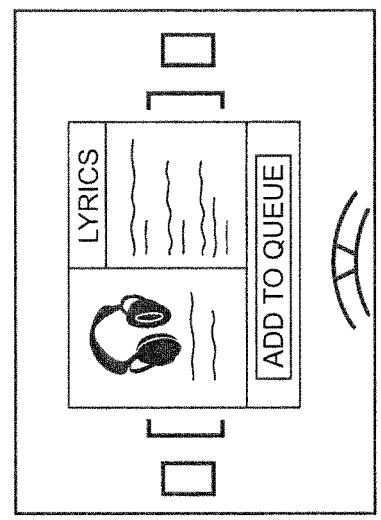

FIGS. 12a-12f show a first use case pertaining to first time song queuing in accordance with certain exemplary embodiments. A patron browses on a display for a song, possibly using karaoke specific browsing criteria (FIG. 12a). The browsing may take place via the karaoke jukebox device, a mobile device in the venue, etc. A preview of the lyrics may be provided, and the song selected on the display may be added to the queue (FIG. 12b). A photo of the patron may be taken (FIG. 12c), e.g., for the queue and/or performance display. The patron may opt-in for SMS or other notification (in which case the user may need to enter a telephone number if the user is not already a recognized user of the karaoke jukebox system or has not provided such data through a credentialed social media service into which the patron has logged in) (FIG. 12d). The patron may be prompted to sign up for myTouchTunes. The song may be paid for, and a "how it works" video may be displayed (FIG. 12e). Some or all of the queue may be displayed for the user, optionally with the photos or other indicators of the soon-to-be performing patrons (FIG. 12f).

FIGS. 13a-13f show a second use case pertaining to smart song suggestions in accordance with certain exemplary embodiments. A user may view the myTouchTunes karaoke mobile application suggestion screen and be prompted to take a range or other test (FIG. 13a). The user may then take the test to determine the "best" or at least recommended songs to be sung (FIG. 13b). The user may view the results of the range test and the song suggestions (FIG. 13c). These suggestions may be viewed based on the patron's interested, and the patron may be prompted to scan the karaoke library (FIG. 13d). The song results from the library scan may be viewed (FIG. 13e), and the song may be added to the queue. Some or all of the queue may be displayed for the user, optionally with the photos or other indicators of the soon-to-be performing patrons (FIG. 13f).

Figure 14E:
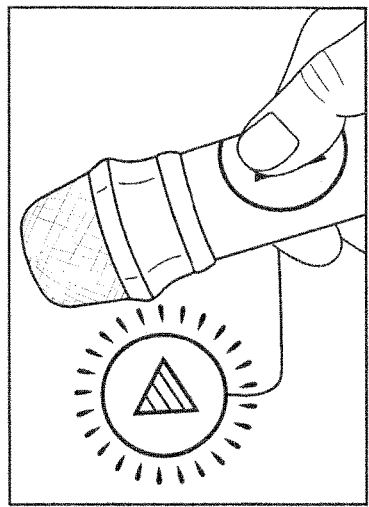
FIGS. 14a-14f show a third use case pertaining to performing a song in accordance with certain exemplary embodiments.
Figure 14F:
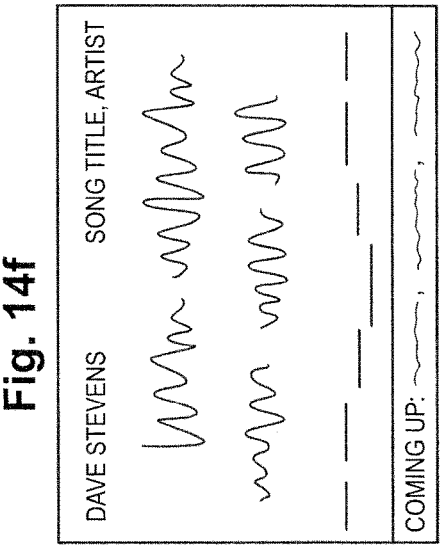
Figure 14C:
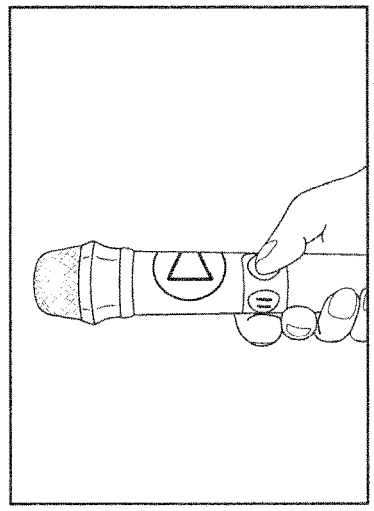
Figure 14D:
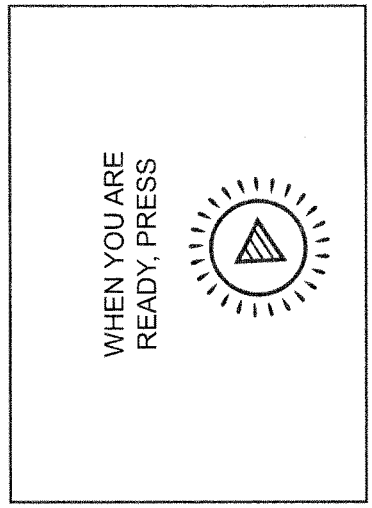
Figure 14A:
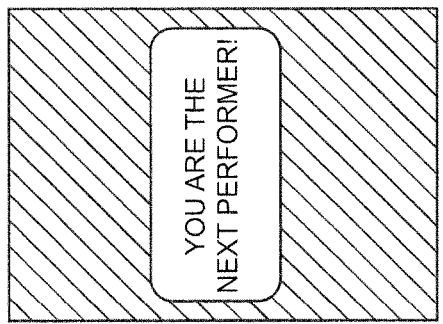
Figure 14B:
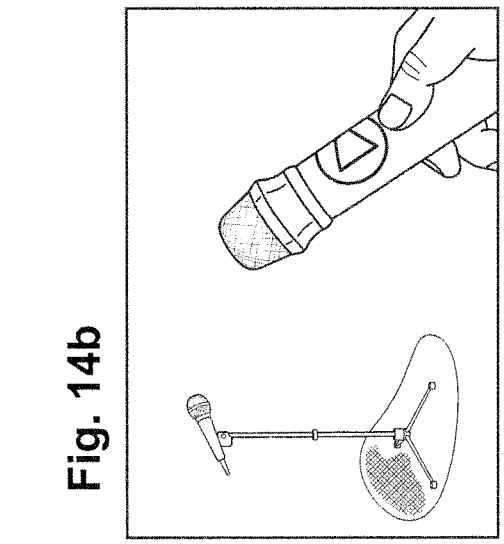
Figure 15A:
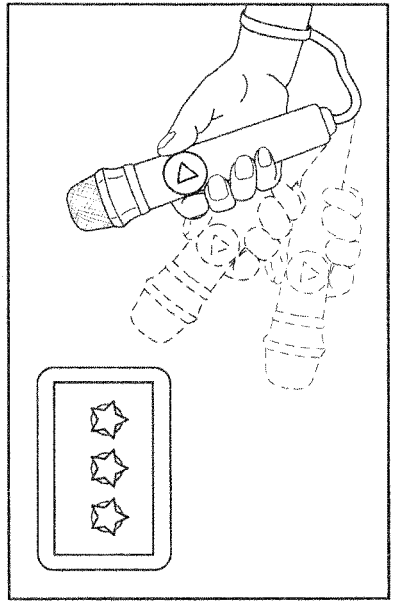
FIGS. 15a-15d show prompts for actions to be undertaken during a performance that may be provided in accordance with certain exemplary embodiments.
Figure 15B:
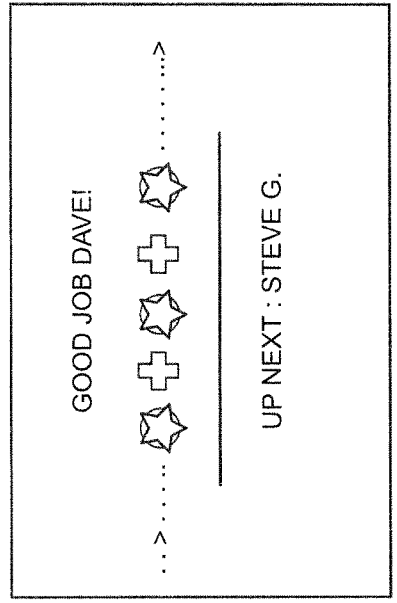
Figure 15C:
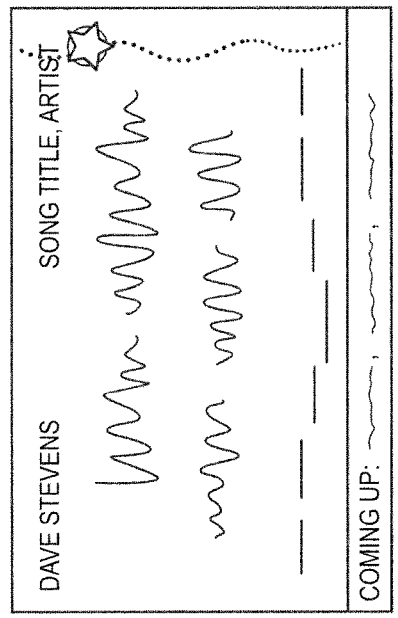
Figure 15D:
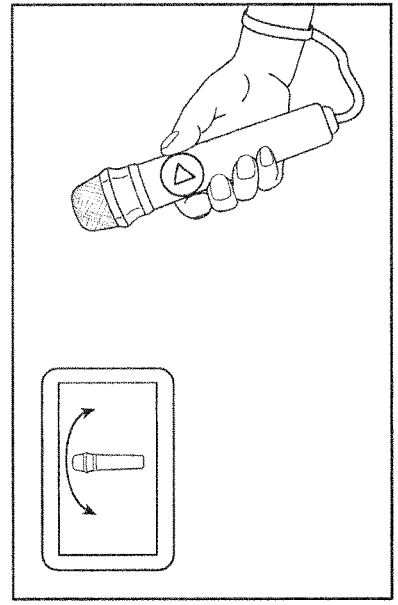

FIGS. 14a-14f show a third use case pertaining to performing a song in accordance with certain exemplary embodiments. The patron may receive a notification (e.g., an SMS, email, or other notification) that it is about to be that patron's turn to perform (FIG. 14a). The patron may step onto the staging area and obtain the microphone (e.g., from the microphone stand) (FIG. 14b). Pitch help optionally may be selected (e.g., via a button on the microphone) (FIG. 14c). The patron may be instructed to press the play button (e.g., on the microphone) when the patron is ready to perform (FIG. 14d). When the play button is depressed, the microphone may be activated and the music may be started (FIG. 14e). The lyrics and/or melody may be displayed to help the performer complete the performance aspect of the karaoke experience (FIG. 14f). It is noted that settings may be downloaded and put into place if the user is a recognized user and has previously set such settings (e.g., regarding pitch help, transposing, volume, etc.), has completed one or more rehearsal modules, has a karaoke history that can be read and summarized, etc.

The patron looks at the lyrics screen and is able to see feedback from the crowd. Prompts for actions to be undertaken during a performance may be provided, e.g., as shown in FIGS. 15a-15d. For instance, in a sixteen bar break, an indication for motion control is provided. The indications may be intended to correspond with the beat, and the patron may see the motion and/or feedback on the screen. When the song is over, the crowd reaction may be shown on the feedback screen. In certain exemplary embodiments, the microphone may be provided with one or more gyroscopes, accelerometers (linear or non-linear), etc., for determining or inferring the position, movement, and/or orientation thereof. A comparison between movements signaled by the display and the signal transmitted to or otherwise obtained via the jukebox or server and corresponding to actual movements may be calculated, and the performer's score may be based in part on this tracking in certain exemplary embodiments. These and/or other motion sensors and/or locators may help determine or infer the position of the microphone and thus the performer, enabling a tracking system for camera and/or lighting arrangements in connection with the karaoke jukebox system to orientate the camera and/or lighting towards the performer at all or selected times. Gyroscopes, accelerometers, and/or the like, provided to the microphone, may be used to track or infer movement in certain exemplary embodiments. The camera and/or lighting may be integral with or separate from (but in operable connection with) the karaoke jukebox system in certain exemplary embodiments.

Figure 16A:
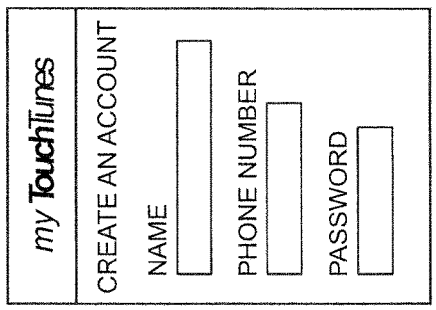
FIGS. 16a-16f show a fourth use case pertaining to audience engagement in accordance with certain exemplary embodiments.
Figure 16C:
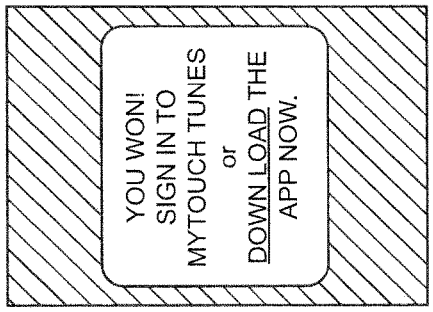
Figure 16E:
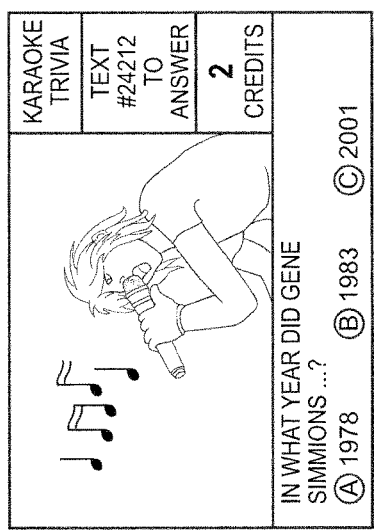
Figure 16B:
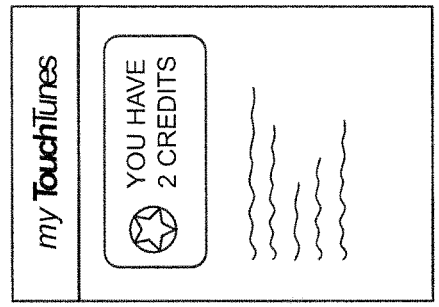
Figure 16D:
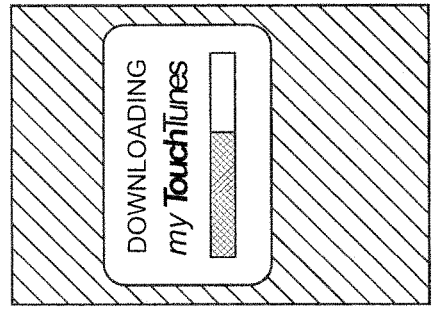
Figure 16F:
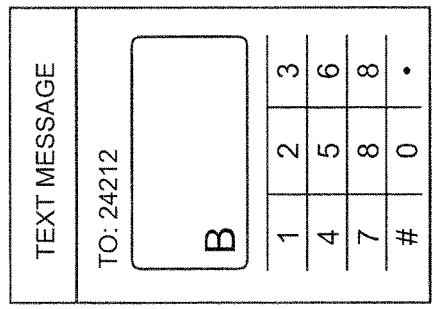
Figure 17A:
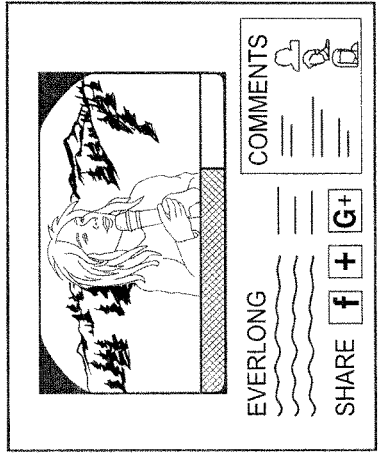
FIGS. 17a-17f show a fifth use case pertaining to socializing the karaoke experience in accordance with certain exemplary embodiments.
Figure 17C:
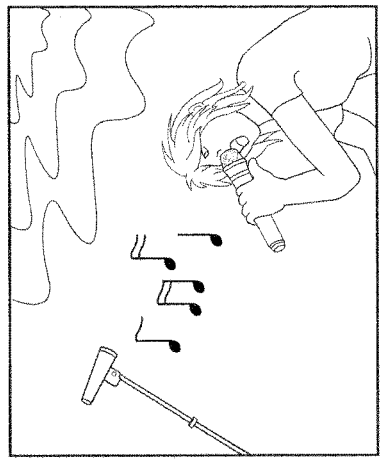
Figure 17E:
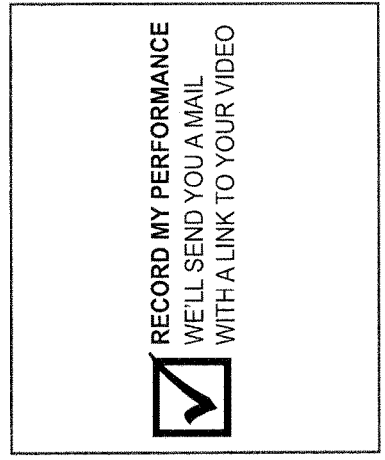
Figure 17B:
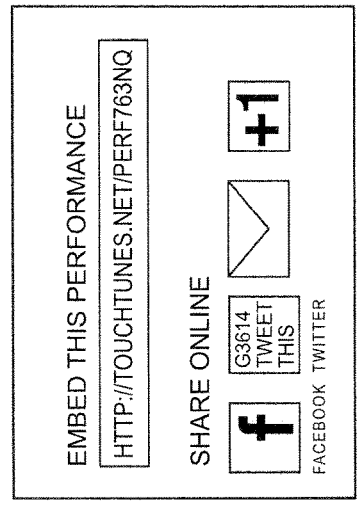
Figure 17D:
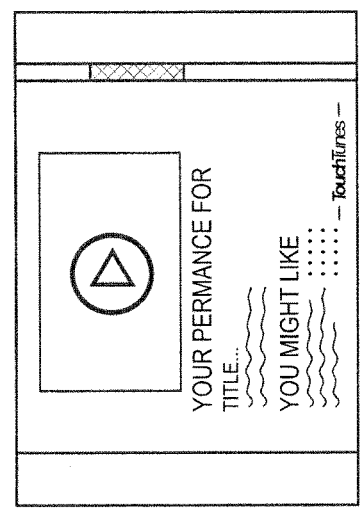
Figure 17F:
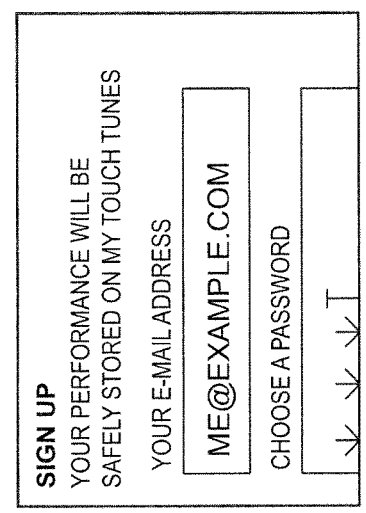
Figure 18A:
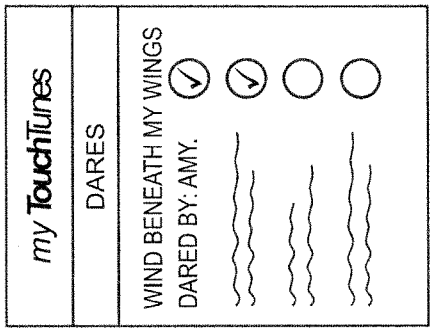
FIGS. 18a-18f show a sixth use case pertaining to performer engagement in accordance with certain exemplary embodiments.
Figure 18C:
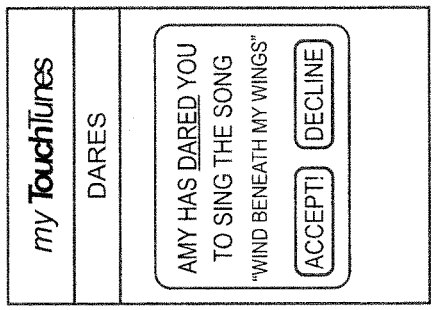
Figure 18B:
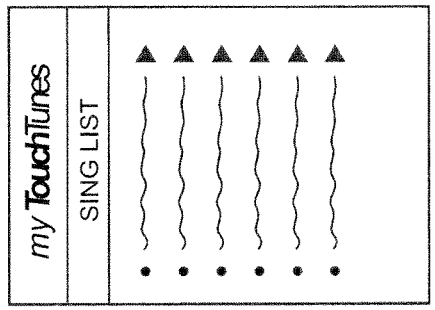
Figure 18E:
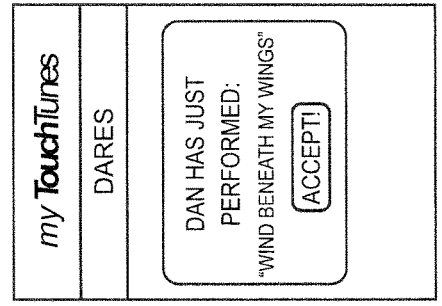
Figure 18D:
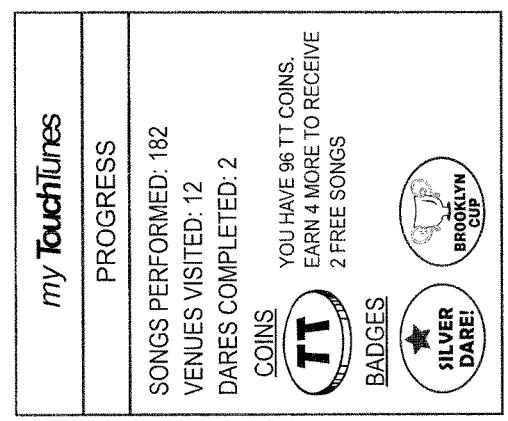
Figure 18F:
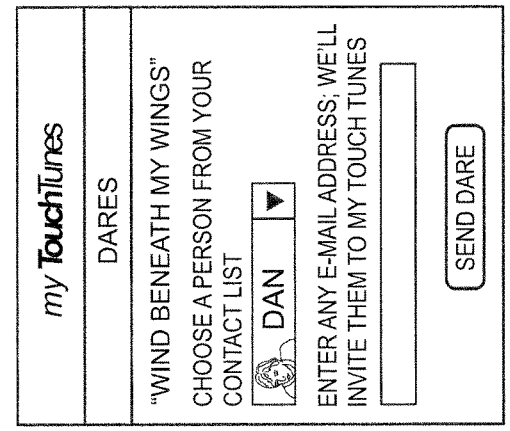

FIGS. 16a-16f show a fourth use case pertaining to audience engagement in accordance with certain exemplary embodiments. For instance, trivia may be shown on a display (FIG. 16a). A user may submit an answer to a multiple choice or other question via SMS, email, a dedicated application accessible on a mobile device, etc. (FIG. 16b). Patrons may receive feedback if they have won a prize (e.g., credits) and may be prompted to download the myTouchTunes application (FIG. 16c). The user may then download myTouchTunes (FIG. 16d), register for an account (FIG. 16e), and use the credits won from the trivia contest (FIG. 16f). Of course, it will be appreciated that other audience engagement features may be offered including, for example, rating a singer's performance, voting for a next song to be performed or for a patron to perform, etc.

FIGS. 17a-17f show a fifth use case pertaining to socializing the karaoke experience in accordance with certain exemplary embodiments. When queuing a song, a patron may opt to have a video recording made of the performance. The patron may also be asked to sign up for a myTouchTunes account if the patron is not already a recognized user of myTouchTunes. A video of the performance may be captured and saved to myTouchTunes. The patron may later receive an e-mail with a link to the video of the performance. After following the link, the patron may log into myTouchTunes to watch the video of performance. Some or all of the video of the performance may be shared via Twitter, Facebook, and/or other social networks.

In certain exemplary embodiments, the video that is captured may incorporate video content captured by a camera integral with the karaoke jukebox system, external cameras provided in the location, and/or video captured by one or more portable devices (e.g., smart phones or the like) of one or more patrons in the establishment. Because devices connected to the karaoke jukebox system may have a synchronized time base, the disparate sources may be spliced together as the performance is taking place or at a later time. For instance, it may be possible for a KJ to instruct one or more displays in the venue to receive a video signal from a particular device. Much like a director, the KJ may switch the effective input video source. A patron may also be able to do this at a later time, e.g., to create a custom movie of the performance. For instance, video from plural devices may be submitted (automatically or upon a user request) to the central audiovisual network server and associated with a particular performance date/time and/or performer. The performer or others may search through a catalog of user-generated content to make their own movies. High-quality audio recorded by the karaoke jukebox microphone may be added as the audio track to the video. As above, this may be facilitated by virtue of the time synchronization features of certain exemplary embodiments. In certain exemplary embodiments, a composite video may be automatically generated. For instance, the video may randomly select different video segments or mix in the karaoke jukebox video content with user content on a random, pseudo-random, or non-random basis. The other patrons' cameras may provide different angles of the performance. Thus, in certain example instances, regardless of whether the video content is user-generated or automatically generated, the other views may be selectively incorporated, e.g., based on the performer's movements. The performer's movements may be tracked by the karaoke jukebox, the position-indicating or -inferring devices (e.g., trackers, accelerometers, gyros, etc.) incorporated into the microphone, etc. Based on this data, tracking data associated with the devices, facial or image recognition performed on the videos, and/or the like, certain videos may be selected for merging into a common video file, e.g., with the high-quality captured audio.

FIGS. 18a-18f show a sixth use case pertaining to performer engagement in accordance with certain exemplary embodiments. The patron first searches for a song to be performed, e.g., by a friend. The song may be selected because it is expected to sound entertaining, funny, particularly good or bad, etc. The patron may select a friend who already uses myTouchTunes. Alternatively, a user may enter an email address to invite a friend to join myTouchTunes and/or participate in the karaoke experience. The friend may receive a notification that a "dare" to perform a song has been received and may decide whether accepts the dare. The friend may perform the song, possibly earning the friend a reward (e.g., unlocking a "dare badge"), earning a "coin" or credit or token for each person checked-in at the site, and progress of the contest may be reflected on a display. The dare may be marked as complete, and the sender may be notified that dare has been completed. Of course, it will be appreciated that there are other ways for encouraging performer engagement, e.g., as between two or more individuals or teams of individuals, and that this is only one example of how challenges may be issued and completions of challenges rewarded. If a dare is accepted, the song may be added to the karaoke queue, together with an indication of the dared person (the person to perform the song) and/or the person who initiated the dare.

FIGS. 19*a*-19*f* show a seventh use case pertaining to performer engagement in accordance with certain exemplary embodiments. A venue manager may use the karaoke jukebox to configure the venue location. The venue may be shown on karaoke venue map on myTouchTunes, e.g., with information such as its name, address, themes, etc. Karaoke music preferences also may be configured, e.g., to give priority to certain genres, determines whether karaoke performances are pay-per-play performances, the cost of each performance, etc. The karaoke jukebox may prioritize the specified genres in user interface elements displayed to patrons interacting with the karaoke jukebox or a mobile device checked in to the location. Details regarding karaoke availability and lists of special events taking place at the venue also may be specified by authorized personnel. Similarly, karaoke nights and events from some or all connected venues may be listed on the myTouchTunes calendar. In some cases, only those locations that a patron has subscribed to or otherwise expressed interest in may be displayed on the calendar. In this regard, in certain exemplary embodiments, a module running on the jukebox and/or having control of the jukebox may enable an authorized user to provide such settings.

Photo booths are known in the art. However, the inventors of the instant application have realized it is possible to build on the familiar fun of the traditional photo booth through modern technology to create a next generation experience. For instance, rather than providing a rather sterile environment in which pictures can only be taken at fixed intervals, certain exemplary embodiments relate to the incorporation of photo booth like activities into a jukebox and/or karaoke jukebox. In certain of such exemplary embodiments, a series of digital photographs may be taken in succession (e.g., 12 photos in some number of seconds). In certain of such exemplary embodiments, the flash color may be optimized or improved for the environment through the use of LEDs or other lights disposed on the jukebox (e.g., by having the camera determine the lighting and then calculating the amount of offset for the lighting features, and adjusting the flash when taking the picture). Digital filters may help improve the quality of the picture and/or enable a user to express creativity. For instance, music themed filters, backgrounds, or the like may be added to a picture along with, or rather than, frames that may be music, venue, or otherwise themed. Drawing tools may enable users to make further modifications to captured images. Digital "proof sheets" may give users a potentially greater control of their photos and enable users to pick their favorites. Because photos are taken digitally, they may be delivered to a user or users through a digital channel such as, for example, email, posting to a server or social media site, etc. Captured and optionally subsequently modified images may be incorporated into music videos, karaoke performances, attract loops, uploaded to social media sites for the venue and/or user(s) whose picture(s) are taken, and/or the like.

The following description provides an example use case for a photo booth jukebox in accordance with certain exemplary embodiments. An attract loop for the photo booth may include previously taken and/or canned photos. From a "home screen," a user may opt to switch to jukebox mode (e.g., to access jukebox related features), a photo booth mode, or a video mode. When the user has selected the photo booth mode, the user may have the option to take a test picture. Test pictures may be used to help users orient themselves in front of the camera, demonstrate how much of the picture will be cropped out, etc. Before taking a live shot, a user may be prompted to provide advance payment and/or accept the terms and conditions of use.

Figure 20:
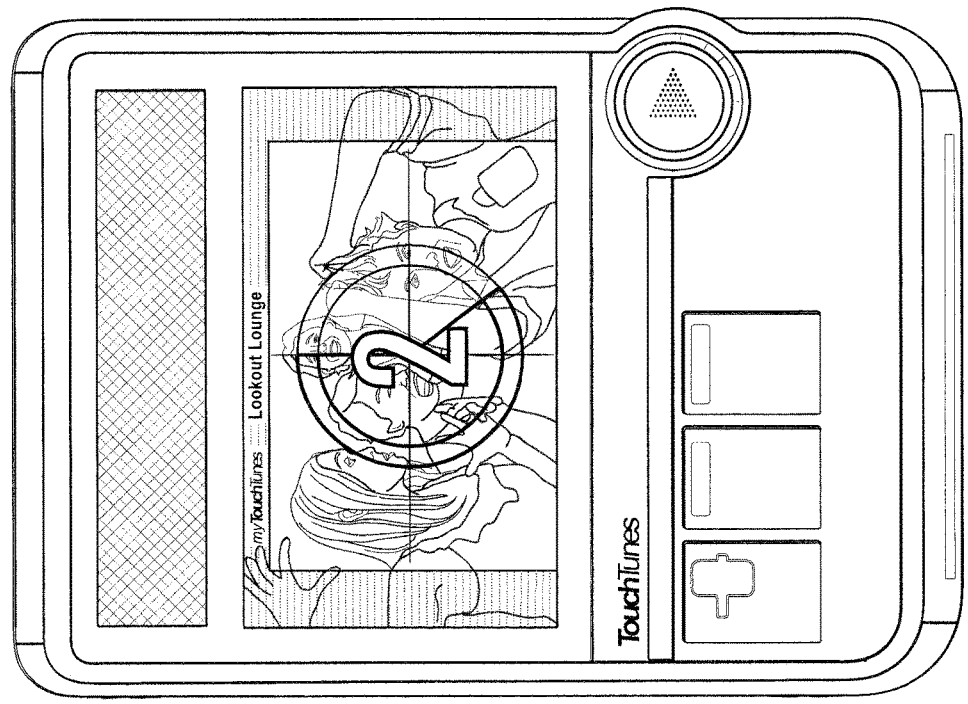
FIG. 20 shows an example countdown screenshot in accordance with certain exemplary embodiments.

When the photo booth is ready to take a picture, a countdown may be displayed on the jukebox or related display, e.g., so that the person(s) being photographed can compose himself/herself/themselves appropriately. FIG. 20 shows an example countdown screenshot in accordance with certain exemplary embodiments. The areas that will be cropped from the image may be indicated, e.g., as being grayed out compared to the main image area.

Figure 21:
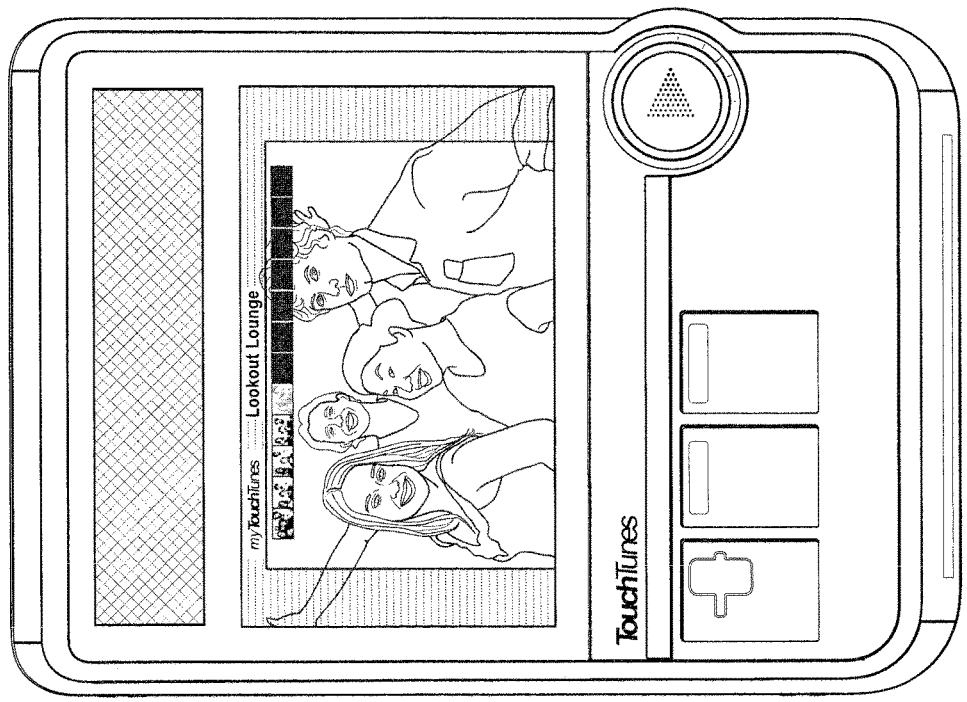
FIG. 21 shows an example photo burst screenshot in accordance with certain exemplary embodiments.

One or more photos may be taken. The photos may be taken each time a user actuates a button or the like (optionally followed by a countdown), in a fairly rapid photo burst manner, and/or the like. For instance, FIG. 21 shows an example photo burst screenshot in accordance with certain exemplary embodiments. A current picture is displayed on the jukebox in a main display area. A timeline (shown above the main area in this example) may indicate how many pictures have been taken while providing a small representation of each, while also showing how many more pictures may be taken. The currently displayed picture may be highlighted. An ancillary display such as the LED array above the main screen may similarly show the progress of the photo burst.

Figure 22:
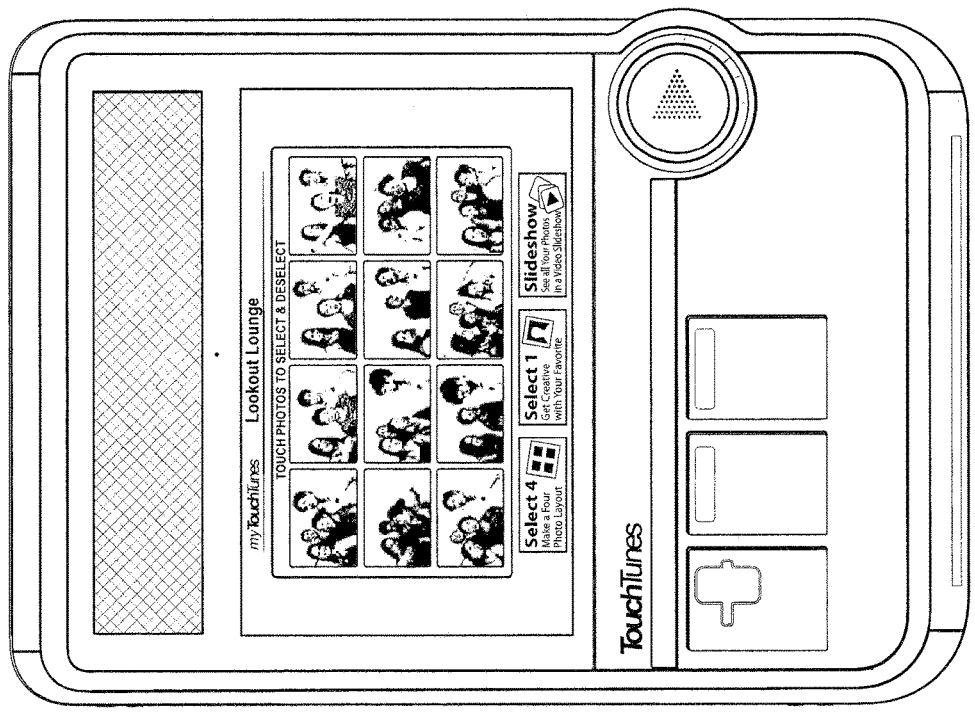
FIG. 22 shows an example screenshot displaying an electronic or digital "proof sheet" in accordance with certain exemplary embodiments.

An electronic or digital "proof sheet" may be displayed, an example of which is shown in FIG. 22. Twelve pictures are shown in this example, as that is how many images were captured during the photo burst. However, it will be appreciated that more or fewer images may be taken in different example scenarios. In situations where more images are displayed than are to be printed, saved, or otherwise manipulated, a user may select some proper subset of the images (e.g., four of twelve images, etc.).

Figure 23:
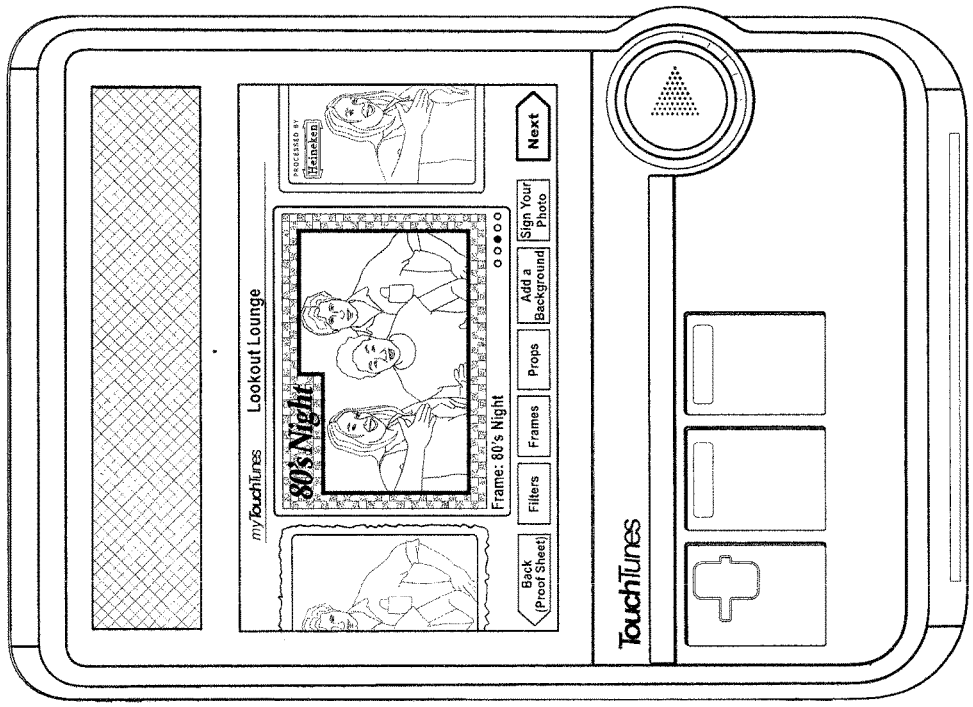
FIG. 23 shows an example screenshot allowing frames to be added to an image in accordance with certain exemplary embodiments.

Various filters may be applied and/or elements added to some or all of the selected images. For example, a "rock star filter" may add multiple spotlights of different colors, while adding lens flares and/or the appearance of fog to create a "rock star like" atmosphere for the picture. The images may be converted to black and white or sepia tone, softened, have their corners faded out or otherwise distorted to give the appearance of a vintage or Technicolor image, etc. Blurring, shading, sharpening, red eye reduction, lens flares, etc., may be added. Images may have their color levels, brightness, contrast, etc., adjusted. Frames may include, for example, vintage or rounded frames, themed frames (e.g., as shown in FIG. 23); frames for a particular sponsor (e.g., advertiser) or the venue; etc. In certain exemplary embodiments, raw image data may be uploaded to a remote location and may be subsequently manipulated in these and/or other ways, e.g., via a web-based interface accessible via a mobile application, a remote computing device running a browser, and/or the like.

A user may select a target output device or location for the image. For instance, a user may opt to print the picture(s) to a printer integral with or otherwise connected to the photo booth jukebox, send a digital copy via email or MMS message, post the picture to a particular social networking site, etc. The photo booth jukebox may have suitable network and/or telephony connections (potentially through optional servers or gateways) for accomplishing the digital transmission of the image(s). A user may purchase additional copies for print or for digital transmission. Digital transmitted images may have copy protection, digital watermarks, etc., that may help guard against unauthorized reproduction. In some scenarios, a user may pay a premium for a non-protected image. In cases where an image is to be uploaded to a social media site on behalf of the user, a registered user's profile may be queried to obtain the relevant username and password or other credentialing information to allow logging in and posting to the site. If such information has not been provided, or if the user is not a recognized registered user, the photo booth jukebox may prompt the user to enter such information.

When printing and/or digital transmission is complete, the user may be prompted to return to the proof sheet, start a new photo session, return to jukebox mode, etc. The attract loop may be updated to include the recently captured image in certain example instances (e.g., in the event that the user does not "opt out" of such inclusion).

As can be appreciated from the above, technology can be leveraged to improve conventional photo booth experiences, while also tying them into the jukebox and venue environment. For instance, the photo booth jukebox may become a "photo director," instructing users to "strike a pose." Participants may respond to suggestions about expressions to make ("Show me scared"), iconic poses ("Now Vogue!"), etc. Such pictures may be printed, digitally transmitted, uploaded to a social networking site, etc.

In another example mode, users may sign up for a "night unfolding," "scavenger hunt," or "challenge" mode. Throughout a predefined time, a mobile application running on a mobile device of a user may prompt the user to take pictures at various times, with various people, with certain expressions/poses/items/etc., and/or the like. These photos may be turned into a slide show, video, or the like, that can be digitally transmitted. Prizes may be awarded for successful completion of a challenge. Contests also may be run, e.g., for costume parties, etc., where user-based voting is possible.

Time limits may be imposed in certain cases, e.g., to help ensure that the jukebox is not used for excessive photo booth operations. For instance, a user may complete a photo booth experience within 1-10 minutes, with a typical minimum time being about one and one-half minutes, and a maximum time of seven minutes being set. If a jukebox is busy or has not been used or the queue is running low, deactivation of some or all of the photo booth features may be triggered. Timers may be displayed when a predefined use time is coming to an end (e.g., 30 seconds before a 7 minute period is about to elapse), etc. In some cases, if user chooses to take a test shot, the photo may remain on the screen for a short time (e.g., 10 seconds) or until a begin or play button is pressed. A test shot may be deactivated after a short time (e.g., 2 minutes) after use, as well. Live preview functions may be provided in certain exemplary embodiments. The live preview functions may display raw image data, which may be maintained for possible later use. Facial detection for focus and metering may be activated, e.g., using known algorithms. Optimization filters may be run once photos are taken, potentially including a skin smoothing function and creating an enhanced effect to separate foreground elements from background elements. Users may have predefined times for completing different sub-operations within the photo booth experience. For instance, the user may have 1 minute to complete selections from the proof sheet, 3 minutes to modify photos, 2 minutes to print/transmit selections, etc. These timers may restart if the user returns to the proof sheet or starts a new photo booth session. Of course, it will be appreciated that these time frames are provided by way of example, and that longer or shorter time limits may be imposed in some situations, whereas some situations may not include time limits at all.

Users may be charged for various features in different embodiments. For instance, a base purchase price of, for example, $5, may enable the user to take a photo burst, select four photos, and print them out. This price may be reduced if no printer is attached, if a network connection is not possible, etc. Text messaging, emailing, uploading, extra prints, more manipulations, etc., may cost a premium in certain scenarios. In certain scenarios, digital transmissions and/or uploads may be provided free of cost, or possibly free of cost if the user opts in to allowing the venue to use the images for publicity and/or other purposes.

With the advent of real-time broadband connectivity, it is possible for patrons to make use of music lists that they, or their friends, maintain on external data services (such as, for example, social networking sites). These data services may also allow for patrons to post their current activities or observations. The digital jukebox systems of certain exemplary embodiments may allow patrons to identify themselves to the jukebox by submitting credentials to a jukebox individual account or a social networking account. Once identified, the activities such as music selection, comments on music, social plans, collections of music, etc., can be shared through the social networks.

In creating an identity on a jukebox network, it would be desirable to enable the patron to submit an image to be associated with an account. Such an image may be referred to as an avatar of a patron. It would be desirable to enable a patron to create an avatar either by a separate transaction performed from a computer or mobile smart phone where a photograph is submitted to the jukebox network, or directly through the jukebox itself.

This may be accomplished in certain exemplary situations by configuring the jukebox with picture-taking capabilities, and by allowing a patron to associate this picture with the individual's account. These images could be representative of a single person, a group account representing all the staff at a particular location, a close-knit group of friends sharing an evening, a larger group, etc. Alternatively, or in addition, rather than a still frame avatar, certain exemplary embodiments enable patrons to take short videos of themselves and use these videos as avatars, or mementos of the time spent at the location. Indeed, these images and/or videos, like activity and music sharing, may provide visual mementos of time spent together in the venue. This may provide a more enjoyable experience for individuals, enabling them to enjoy music and have a photo or video record of the evening.

As jukeboxes become more sophisticated and migrate towards media centers and incorporate more media center capabilities, it would be desirable to provide supplemental audio and microphone capabilities. Doing so in certain situations could allow individuals at the jukebox to interact with a system or remote individual and be able to hear audio intended just for them and not for broadcast throughout the venue. In addition, or in the alternative, individuals could respond or submit audio that would be picked up by a microphone configured to favor local audio rather than the audio on the surroundings.

These microphones, which may be provided inside the jukebox, as wireless peripherals to the jukebox, etc., may allow patrons in certain exemplary instances to add audio clips to their avatars (e.g., still photo or video avatars) that could be experienced through social media distribution services. Individuals could see their friends' avatars and hear associated audio clips.

A venue could also periodically have the most popular or featured patrons possessing an avatar or avatar with audio being presented over the jukebox controlled audio and video systems in certain exemplary embodiments. These could be similar to an individual's introduction of a playlist or music set.

The camera used for capturing the avatar in the jukebox could also have additional capabilities and/or be leveraged in a number of different ways, e.g., as set forth herein. For instance, the jukeboxes of certain exemplary embodiments may be configured to take photographs while playing music, thereby allowing patrons to engage with the jukebox without interrupting the play of music. Multitasking operating systems and/or functionalities may be provided for these and/or other purposes.

Alternative pictures not intended for avatar creation could be provided as a charged-for service. Patrons may pay for such images by providing music credits to the jukebox. This photograph taken by the jukebox could, in return for a number of credits, or cash paid via credit card or bills or coins, or virtual wallet associated with individuals social media account, be modified, printed, and/or distributed over, email, the Internet, a social network, to mobile applications, e.g., as set forth herein.

In-venue printing capability also may be provided. For instance, in certain exemplary embodiments, the jukebox may include within its form a printing means allowing patrons to obtain prints of their photographs from the jukebox device after a short delay. Alternatively, a remote printing station controlled by the jukebox and used for printing photographs and other materials (such as coupons, promotional vouchers, etc.) may be under the control of or at least in communication with the jukebox, so that these images may be printed on behalf of individuals, venues, advertisers, and/or others. Any suitable wired or wireless connection may be provided. For instance, a network printer may be configured, e.g., over a LAN or WAN connection, Bluetooth, and/or the like.

Videos could also be paid for music credits or cash or credit or a virtual wallet account, etc., to allow patrons to take the video of the moment and to share this video via a social media website, email, and Internet link, and/or the like. Audio optionally may be captured along with the video, e.g., through a microphone provided to the jukebox and/or synced from a remote source (e.g., a mobile device of the patron). The synchronization may be facilitated by providing a common or shared timestamp service as between the various devices involved in the video and/or audio capture.

This video session may also be possible whether music is playing or not, thereby providing a second revenue opportunity for the jukebox device. For instance, the jukebox could earn money for the operator by playing music and selling photo services or video services or audio video services, all at the same or substantially the same time, e.g., through multitasking operations.

As it is possible to operate the camera within the jukebox at all times, and by employing an algorithm that compares recent images captured with the current image, it is possible to detect the motion in front of the jukebox. This motion may be used in certain exemplary embodiments to trigger a particular attract loop, encouraging the passerby to engage in a music or other activity on the jukebox. This motion sensing tracking could also trigger face detection services that would allow a portion of the observed image to be presented on the jukebox or on TV screens connected to the jukebox in certain situations. In addition, or in the alternative, it may be possible to apply a filter or frame to the observed image offering an example of what a photograph or video could look like if one were to be taken and paid for. Captured and/or printed images may be incorporated into standard attract loops advertising the jukebox, karaoke, and/or photo booth features of the smart jukebox in certain exemplary embodiments.

Most jukeboxes are typically installed in locations with subdued lighting. It therefore may be desirable to supplement the available light when taking a picture with light from the jukebox. For example, based on the luminosity detected from the camera, the jukebox may in certain exemplary embodiments compensate its LED and/or other lighting system and, if required or desirable, use the light emitted from the LCD display to supplement both the luminosity of the picture to be taken or video to be taken, thereby possibly improving the effective white balance of the picture to be taken or video to be taken. Of course, other image and/or video characteristics aside from or in addition to white balancing may be adjusted, modified, and/or improved by altering the lights including, for example, color saturation, overall brightness, color tone, exposure, etc. It may also be possible to correct for ambient light asymmetries, inadequacies, and/or the like in certain exemplary embodiments, e.g., by using the camera to detect or surmise the existence of such problems and then instruct the lighting system(s) of the jukebox how to correct for them.

It is very popular to celebrate an event with a group of people using social media. However, a jukebox provides an additional opportunity to non-contiguous interactions to be associated with a single event. For instance, a baseball team could have won an important game that it wishes to commemorate with music and pictures. A first individual could create the event, by identifying himself with credentials and creating an event name. The event could have a theme assigned to it from a series of templates offered by the jukebox. In this example, the patron would select a sports victory theme and give it a name such as "Finally beat the Panthers." Throughout the evening, others could go to the jukebox and using credits or cash or a virtual wallet or the like, add music selections, or photographs, or comments to the event.

In certain exemplary embodiments, each event entry may be performed as part of a payment event. For instance, patrons could pay to take one or more pictures or submit videos or commentary to the event, etc. In addition, or in the alternative, the creation of the event itself may require payment. This payment may cover all, some, or none of the possible subsequent activities that may be associated with the event throughout a night or event or duration of time.

This ability of certain exemplary embodiments to create a media log of the event by using the jukebox may allow a digital memento to be created by the jukebox for a variety of experiences. The event could be an experience that took place before convening at the location, events taking place in the location such as a singing contest, trivia contest, or other group activity.

The ability for the jukebox to be the repository for the event media and then to post this media to social networks or to e-mail addresses of specific individuals may help create a record of the experience on behalf of the group rather than by individual who then shares it with the group.

In certain exemplary embodiments, users may identify themselves through a user name and password combination, an image presented to the camera, or an electronic message from a close proximity device, for the purpose of creating a virtual event and/or adding elements to the event.

In certain instances, a jukebox equipped with photo and/or video capabilities may serve as a draw to individuals in a location to participate and share their experiences. The contribution of social media need not be restricted to that captured solely at the jukebox. For instance, a jukebox photo booth application may allow a user to login or check in to the jukebox from a mobile device and participate in the exchange of entertainment media directly from one's own mobile device. This may in certain exemplary embodiments include the ability to submit media photographs, videos, text, audio, etc., to the jukebox repository, or to consume audio video text and images being projected from the jukebox in real-time or retrospectively.

All of the social media sharing capabilities may be possible from a mobile device that has checked into a jukebox equipped with fully photo booth capability. Thus, capturing, sharing (through the Internet, email, a social networking site, and/or the like), etc., may be enabled through both the jukebox and a plurality of mobile devices at or away from the venue, in certain exemplary embodiments.

A challenge exists in delivering jukebox distributed media to devices within the location so that video imagery and/or audio is/are synchronized. Audio, video, trivia, game data, and/or the like, may become disinteresting or unfair if the time synchronization is not managed effectively. In certain exemplary embodiments, the jukebox may be equipped with a mechanism to synchronize its time and the time of remote devices, e.g., using a network server or direct communications between devices. Additionally, because of the unpredictable latency of wireless networks, it may be desirable for jukebox to discover a latency occurrence and to re-synchronize the timing, allowing all devices to once again be presenting media in a sufficiently synchronized timeframe, so that the media experience is not compromised. Thus, it will be appreciated that certain exemplary embodiments may enable mobile devices to check-in with a jukebox device and establish a time sync between devices over a WAN, WLAN, and/or the like, e.g., so that video, images, and/or audio may be distributed, displayed, captured, and/or otherwise manipulated in an acceptable and appropriate time-synced manner.

Once checked in (e.g., identified to a social networking service as being present at a location based on, for example, transmission of a signal indicating the location and login credentials of the user), mobile devices may be able to participate in a virtual event, or to initiate the creation of a virtual event, in certain exemplary embodiments. This may allow others to submit song selections, audio, video, and commentary to the digital record of the event, for example. From a mobile device, this may take place at no charge, be funded by a virtual wallet associated with the account of the mobile device owner, etc.

Thus, it will be appreciated that using certain exemplary techniques disclosed herein, many people may be able to participate in an event from a variety of different computing devices, thereby forming a collection of different sub-events or activities.

Certain exemplary embodiments described herein may be used in connection with the user interfaces disclosed in, for example, U.S. application Ser. No. 12/929,466, filed on Jan. 26, 2011, which is hereby incorporated herein in its entirety. Furthermore, certain exemplary embodiments may be used in connection with the designs shown and described in U.S. Pat. Nos. D475,029, granted May 27, 2003; D616,414, granted May 25, 2010; D629,382, granted Dec. 21, 2010; D642,553, granted Aug. 2, 2011; Ser. No. 29/371,255 filed Dec. 14, 2010; and/or Ser. No. 29/401,854, filed Sep. 16, 2011, the entire contents of each of which is hereby incorporated herein.

Although certain exemplary embodiments have referred to a karaoke and a photo booth application in combination with a jukebox, it will be appreciated that the techniques disclosed herein may be used in any combination or sub-combination. For instance, the karaoke, photo booth, and/or jukebox techniques disclosed herein may be applied to any type of on-demand paid media kiosk or the like.

As indicated above, certain exemplary embodiments may feature tie-ins to social networking sites. For instance, karaoke contests may be viewed locally, nationally, or even internationally (e.g., worldwide) via social networking sites or the like. People around the world could use social networking or other sites to vote for their favorite performances, and people can advance through a competition. Such techniques could even be used as a possible entryway to a reality-television style competition to be aired on television and/or over the internet. The ultimate competition may be karaoke, live music, or otherwise based.

In certain exemplary embodiments, a patron may develop a list of karaoke or photo booth friends. This list may be generated automatically by scanning connections in a social network in certain exemplary embodiments. In certain exemplary embodiments, the karaoke jukebox system may enable patrons to communicate with their friends via SMS, email, social networking, jukebox-specific, and/or other messages. In certain exemplary embodiments, a "buddy list" may be built and used for instant communications. Patrons could issue karaoke challenges, meet-up requests/messages/details, comments on photos, song or karaoke song suggestions, etc. Messages may be sent automatically to a patron whenever a friend has checked in to a location, signed up for a performance, completed and/or shared a performance, etc.

In addition to possibly being able to buy a memento of a night out (e.g., a karaoke audio and/or video performance; a photo, video, slideshow; event package including songs and photos and/or videos; etc.), messages may be sent to patrons letting them know when their songs have been made available and possibly edited by an editor so that they can subsequently download them (e.g., for a price).

Certain exemplary embodiments relate to an entertainment center comprising a computer capable of communicating with networks, wherein said computer is further connected to at least one display through standard analog, digital, or network-addressable displays, said computer being operable to interact with a remote device connected to one of said networks in communication with said computer, said remote device being operable to accept a code and transmit said code to said computer, and wherein said computer can validate against a database or against an algorithm the validity of said code and, upon positive validation, said computer is configured to allocate a monetary value or a credit value to said remote device. The remote device may be operable to browse content contained on said computer and said remote device may be further operable to select and pay for said content using said monetary or said credit value, said computer may be operable to reduce said monetary or said credit value upon a selection by said remote device. The code may instead or in addition be sent to the remote device and entered on the computer.

Certain exemplary embodiments relate to an out-of-home entertainment center coupled with at least one Internet-based messaging system and/or a social networking site and coupled with at least one remote device, said remote device being connected to the out of home entertainment center by a wired or wireless local area network or through the Internet, wherein the use of some of the entertainment center services by said remote device causes said entertainment center to send messages to said at least one Internet-based messaging system. Connecting the system through the Internet may require a user to input a code to the remote device that uniquely identifies the entertainment center.

Some of the handheld devices referred to herein may be those described, for example, in application Ser. No. 11/902,790, the entire contents of which is incorporated herein by reference.

The present disclosure has used certain terms that should not be interpreted as limiting the invention to a particular embodiment, hardware components and configurations, software configurations, etc. For example, many features and examples have been described in relation to their existence within a bar, pub, or other environment. However, it will be appreciated that the features present in the exemplary embodiments of the present invention are adaptable for use in any location where a jukebox (or multiple jukeboxes) may be located. Similarly, while certain features and functions are described with reference to usage by "users," "owners," "operators," "patrons," etc., it will be appreciated that these terms are generic and may, in most cases, be used interchangeably depending on the embodiment chosen and the feature employed. For example, while it may be advantageous to limit the initial song selection to owners and/or operators, in certain exemplary embodiments, patrons may play a role in the initial song selection. It will be appreciated that the term "display" includes, for example, monitors connected to computers directly or remotely, or embedded ICs such as IP TV technology. Displays may be network addressable. Also, standard digital signs (LED based) also may be considered displays and/or may be provided as network addressable displays.

Although certain exemplary embodiments have been described in connection with out-of-home locations, it will be appreciated that the techniques described herein may be adapted for use in an in-home or personal jukebox device, e.g., that has a suitable connection to the jukebox network or is configured for stand-alone operation.

Moreover, although certain exemplary embodiments have been described in connection with in-home and several illustrative out-of-home scenarios, the exemplary techniques described herein may be used in connection with different locations and/or events. In general, the example techniques for blending high quality audio with ambient audio and/or potentially user-generated video described herein may be used in connection with any kind of live event where a recording might be desirable such as, for example, at concerts; plays and musicals; speeches, rallies, or protests; retail or other shopping events; newsworthy events or events that are reported as news; etc.

In the public or concert performance context, for instance, certain exemplary embodiments provide a means for a performer, record label, school, production company, or other suitably qualified party to allow recordings of a concert and optionally to charge a for those recordings. It currently is common for people attending a concert to use the video recording capabilities of their mobile devices to record portions of the concert. While the audio and video quality oftentimes is relatively low, the recording nonetheless is seen as an important memento of the event. And even though the audio and video quality oftentimes is relatively low, the person or persons recording the performance may not have the legal bundle of rights necessary to do so. Thus, it will be appreciated that it would be desirable to also enable the recording of performances or events in a way that promotes user-generated content while still respecting the rights of those rights holders and also potentially offering them monetary compensation for granting licenses in and to the recordings and/or new works created via the blending approaches.

In certain exemplary embodiments, an artist, booking agent, venue staff, school teacher, or other authorized person may contact a recording service, e.g., run by the assignee of the instant invention, to request that recording and blending services be made available at a particular event. The identified event would be identified, and an entry for the event would become present in a recording schedule used by mobile or other devices equipped with a custom recording application. The custom recording application may be downloaded or otherwise installed for a fee in some scenarios and may be used for unlimited or some limited number of subsequent events. In certain exemplary embodiments, the application may be free or available for a nominal fee, but users may be charged for recordings, e.g., by song, number of songs, or duration of time. Different pricing tiers may be set for different songs, artists, labels, song lengths, event types, etc. For instance, school events may be less expensive than Indie rock events, which may be less expensive than a recording of some or all of a Rolling Stones concert. In some cases, a special labeled version of the recording application may be created, enabling branding and messaging to help market the artist or other artists on the same label or representation.

In one exemplary use case, a user buys a custom summer tour app for a predetermined amount of money (e.g., a Katy Perry Summer Tour app for $10.00). This application permits the user to video three songs in one or more shows. When the tour or show ends, or when the three videos have been captured, a link to the video is provided, with the video including actual audio from the performance mixed in with some ambient crowd noise.

Certain exemplary embodiments may include one or more upload systems. Similarly, the recording system may receive a high quality (e.g., digital) audio feed of the performance and possibly also background acoustics of ambient noise within the venue such as applause and cheering. A mixer or mixing board may be provided on-site to receive such inputs. The mixer or mixing board may be as simple as a mixed balanced line out fed in to the recording service's upload device (e.g., computer, laptop, or other combination of suitably configured hardware and/or software). The upload device may forward either digital versions of the live audio feed, mixed songs (e.g., that have been post-processed after the performance or processed in real-time or substantially in real-time), or multiple unmixed or partially mixed audio streams for later assembly in final mixing. The upload device may be configured to identify the performance (e.g., with a name, date, time, and/or unique identifier) and to characterize the method and format of upload material (e.g., file format, whether the audio stream(s) is/are raw or fully or partially mixed, source device(s) for the audio stream(s), etc.). Video also may be gathered and uploaded via the same device in certain exemplary embodiments, and this type of and/or other related information may be provided. The uploaded data may be stored to a storage location in the cloud. The cloud service may be configured to archive the uploaded material for subsequent processing.

A performance archive system located in or having access to the cloud may process inbound or uploaded audio streams and, where necessary or desirable, add relevant metadata to organize the received audio. For instance, depending on the upload stream, audio may be identified as lead-in or actual song performances. A matching system may be configured to identify contiguous audio streams, and individual identification of songs therefore may not always be required.

Similar to as described in the karaoke jukebox related examples above, audio and/or video may be gathered from audience members using an application on their smart phones, tablets, or other computing devices. A mobile user having a device equipped with the recording application or a specially designed application for this particular artist may, for example, purchase or qualify for the right to record a performance. As indicated above, the recording may be limited in some way, e.g., to a particular number of songs, a total amount of time, etc.

The application, running on or accessible via the device, may interface with an embedded or attached video camera to create a digital recording of a period of/or time during the performance. If the mobile user is satisfied with the recording, (e.g., from reviewing it on their mobile device, or from his/her assessment of the video captured, etc.), the mobile user may choose to save the recording. This may cause the recording to be copied to the cloud for archiving and matching against the performance audio. It is noted that there could be many users for a given performance, with each user possibly submitting his/her own clips for matching.

The recording system cloud service may ingest inbound mobile user mobile clips and (if present) metadata concerning the user and rights purchased. This material may be archived (e.g., stored to a database) as performance mobile video and audio recordings, and associated metadata (as appropriate and as available).

Based on timestamps and metadata received from both the upload feed, or calculated from the time of an upload feed, and metadata timestamps received within the mobile user video feed, a matching process may begin. The audio data files of the mobile video and the upload video may be compared to one another using a pattern matching or algorithm, e.g., with time sequencing capabilities. When the "best" match is obtained, audio segment time delimiters may be used to create a new video with a revised audio mix. That is, transitions between songs, sets, spoken acknowledgements, etc., may be detected or otherwise marked, and used as delimiters for different portions. In addition, if it is determined that a particular user has "missed" the beginning, end, or intermediary portion of an otherwise contiguous clip (e.g., because the user did not recognize the song being played, the user's mobile device ran out of battery, the user was too slow pushing a record button, etc.), the "missing" audio and/or video may be supplied to the segment. This missing data may be supplied by others who managed to record that part, from a "house" or "official" source, etc. Timestamps may facilitate detection of missing parts and location of those portions that are to be added.

Similar to the above, in the audio mix, the audio from the device may be replaced with up to 100% of the uploaded audio from the performer's mixing board, which represents very high quality audio. In some cases, it will may desirable to have some audio from the mobile device, e.g., recording the patrons' reactions to, or comments on, the performance, etc. The amount of mobile background audio included could be configurable at the mobile device in certain exemplary embodiments.

Once the remixing process has taken place, a new mixed song coupled to the mobile video may be used to produce a digital video file that is archived on the cloud server. The address of this video segment may be indexed for distribution to the mobile patron and/or others who qualify for the download. Once the patron's mobile video has been processed, an indication may be sent to the mobile device on which the video originated alerting the user that the video has been processed. This link to the new processed video may be available online for streaming or can be downloaded, depending on the rights authorized by the artist or artist representatives, for example. The link to the video could be e-mailed to other devices, e.g., depending on the rights permitted by the artist. Other individuals (e.g., fan club members, school boosters or parents, etc.) also may receive email or other links. In certain exemplary embodiments, the file, a portion thereof, or a link thereto, could be posted to or disseminated a public service such as a social network site (e.g., as a posting on the performer's page, as a Tweet from an authorized account, etc.).

Thus, it will be appreciated that the example techniques that are being applied for karaoke may be used for non-jukebox and non-karaoke events such as, for example, certain live performances or shows. Certain exemplary embodiments therefore relate to the creation and optional distribution (possibly selling) of new content, including high-quality audio synched with a video captured on a mobile device, with that new work optionally being paid for via a mobile application.

Figure 24:
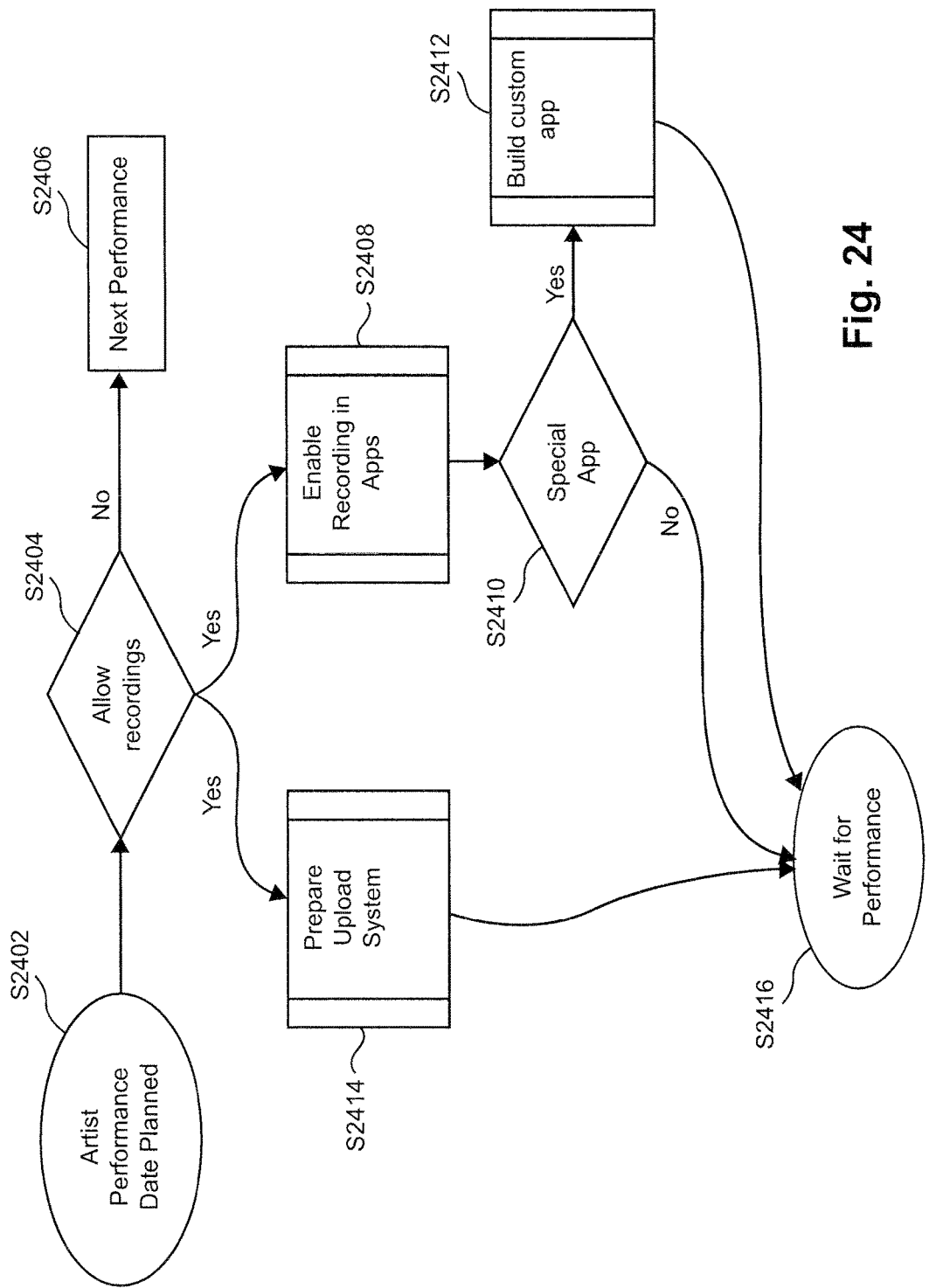
FIG. 24 is a flowchart demonstrating steps in recording a performance or other event in accordance with certain exemplary embodiments.

Example details as to how this may be accomplished will now be explained in connection with FIGS. 24-30. However, it will be appreciated that the various hardware combinations and configurations, and process flows, that are disclosed represent only one way which the embodiments may be constructed, and other combinations, configurations, process flows, and/or the like, may be used in different exemplary embodiments. FIG. 24 is a flowchart demonstrating steps in recording a performance or other event in accordance with certain exemplary embodiments. An artist performance date is planned in step S2402. If recordings are not allowed, e.g., as determined at the decision point 2404, then the process waits for the next performance 52406. Otherwise, if recordings are allowed, the several steps may be taken to prepare for the recordings. For instance, in step S2408, a sub-process for enabling recordings in applications is undertaken. This may include, for example, adding the event to a list of events, potentially including information about the event (e.g., artist name, location, start/end time, cost data, etc.). Some or all of this and/or other associated data may be stored in a database. At step S2410, a decision is made as to whether a customized application is to be provided for the particular event. If so, a custom application may be built in step S2412. The custom application may include, for example, branding and/or a look-and-feel appropriate for an artist, customized advertisements geared towards a particular target audience, etc. If there is no special application, or once the custom application is built, the process waits for the performance at step S2416. At the venue, for example, the upload system is prepared, e.g., in step S2414. This may include, for example, connecting a computer system (including suitable hardware and/or software) to a mixing board, ensuring that potentially secure connections to a remote storage location are made available (e.g., over an Internet connect), etc.

Figure 25:
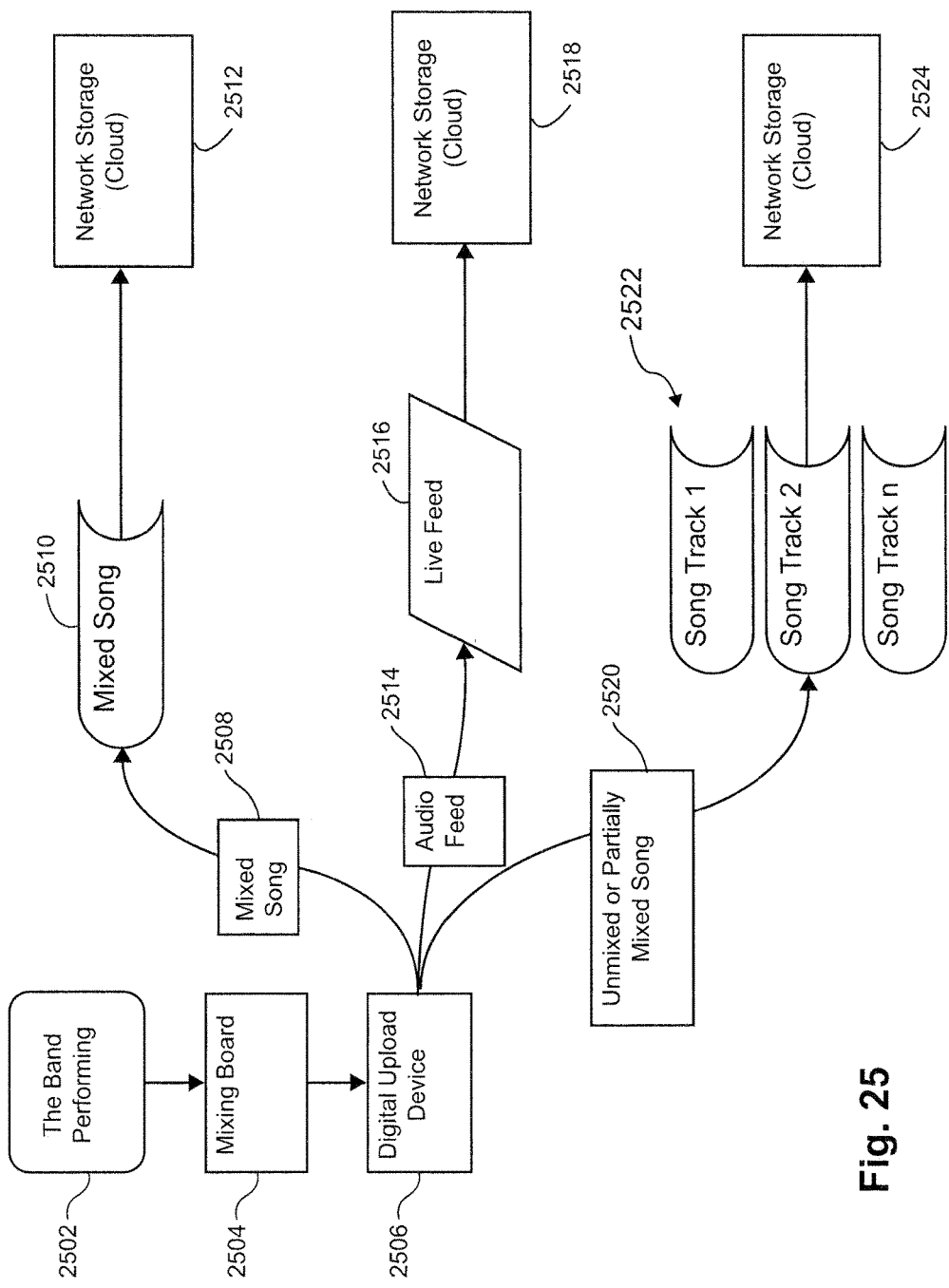
FIG. 25 is a block diagram of illustrative components of an upload system in accordance with certain exemplary embodiments.

FIG. 25 is a block diagram of illustrative components of an upload system in accordance with certain exemplary embodiments. As shown in FIG. 25, audio lines from the band performing 2502 are fed to a mixing board 2504. This may include, for instance, output from microphones, guitars or guitar amplifiers, keyboards, etc. The output from the mixing board is then fed to a digital or other upload device 2506 that stores audio data to a remote storage location (e.g., in the cloud). For instance, raw audio feeds 2514 may be fed as a part of a live feed 2516 to a first network storage location 2518. Mixed audio data 2508 (e.g., including audio for multiple instruments, microphones, and/or other sources) may be stored as a mixed song 2510 that is uploaded to a second network storage location 2512. Similarly, unmixed or partially mixed songs 2520 may be slit into multiple song tracks 2522 and uploaded to a third network storage location 2524. The digital upload device may be providing separately identifiable songs, a continuous live feed stream, or individual tracks to be merged in the cloud. Once received at the network storage device at in the cloud, the performances may be archived, potentially allowing future matching with submitted video recordings.

Figure 26:
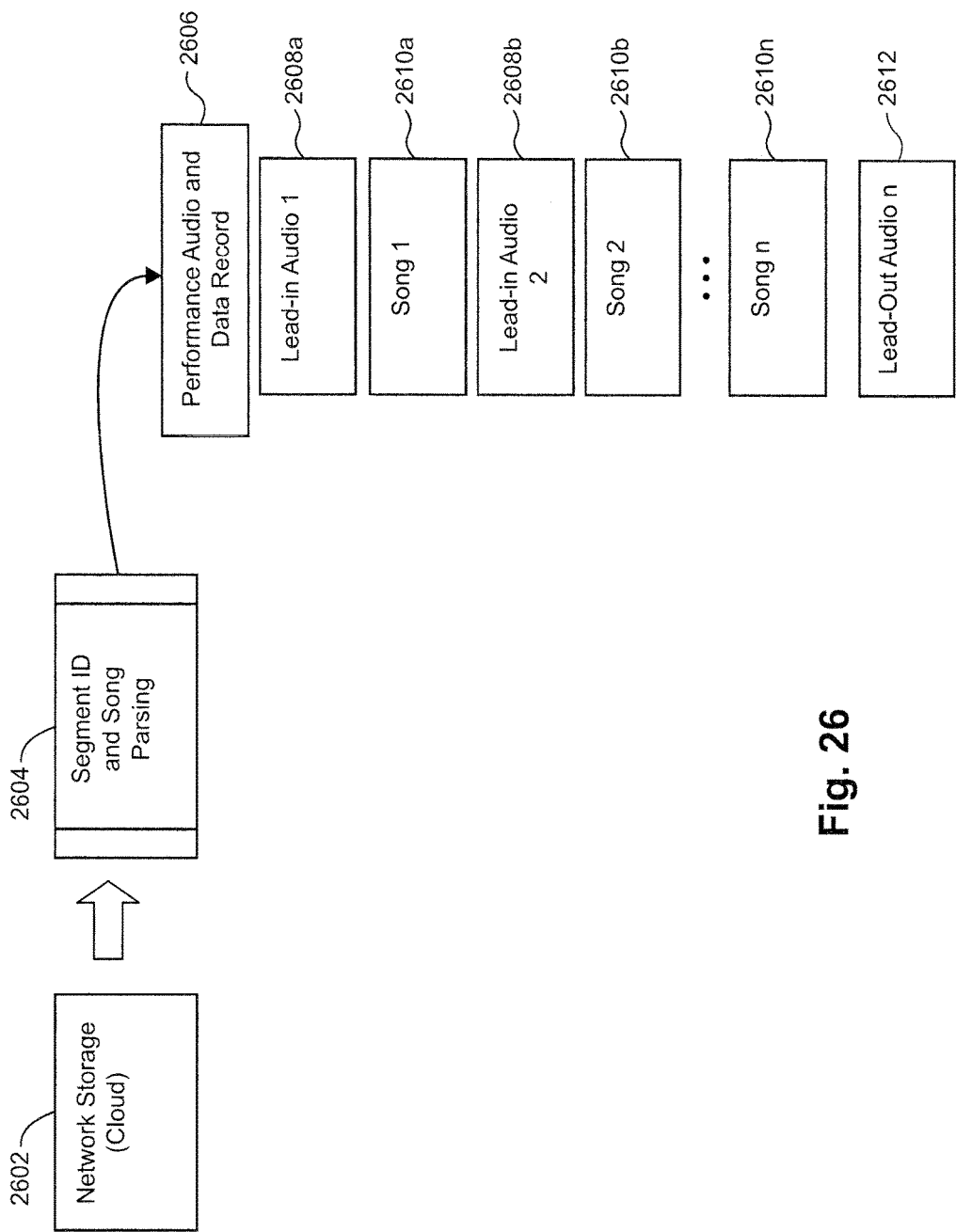
FIG. 26 is a partial schematic view of a performance archive in accordance with certain exemplary embodiments.

FIG. 26 is a partial schematic view of a performance archive in accordance with certain exemplary embodiments. As shown in FIG. 26, a network storage location 2602 includes a segment identifying and song parsing module 2604. The segment identifying and song parsing module 2604 operates on performance audio and data records stored, e.g., in a database including multiple performance audio and data records stored. The example performance audio and data records stored 2606 shown in FIG. 26 includes a plurality of songs 2608a-n. Optional lead-in audio segments 2608a-n are provided for some or all of these songs 2608a-n. Optional lead-out audio 2612 also is provided. As alluded to above, optional lead-in audio 2608 and lead-out audio 2612 may be provided for some of all of the songs 2608. This or separate lead-in and/or lead-out audio may be provided for an event as a whole or in part, e.g., including a set, group of songs (such as a medley, group of continuous or discontinuous separate songs, certain items selected for recording by the artist, label, or mobile device users, etc.), or even an individual song. Although not expressly shown in FIG. 26, metadata may be associated with each of the segments 2608, 2610, and 2612, e.g., indicating timestamps (e.g., for start and end times), lengths, dates, the source of the data (e.g., from the mixer, raw input streams, from a user, etc.), and/or the like. The upload system that is located within the venue or at the event may submit data that is either stored as a contiguous data stream. If metadata or detectable audio cues are available, the data set may be identified with a segment ID and songs may be parsed with the identification of audio type. Possible audio types include lead-in, actual song, lead-out, etc. The audio record may be time stamped based on information provided from the performance venue and the receipt time at the cloud server.

Figure 27:
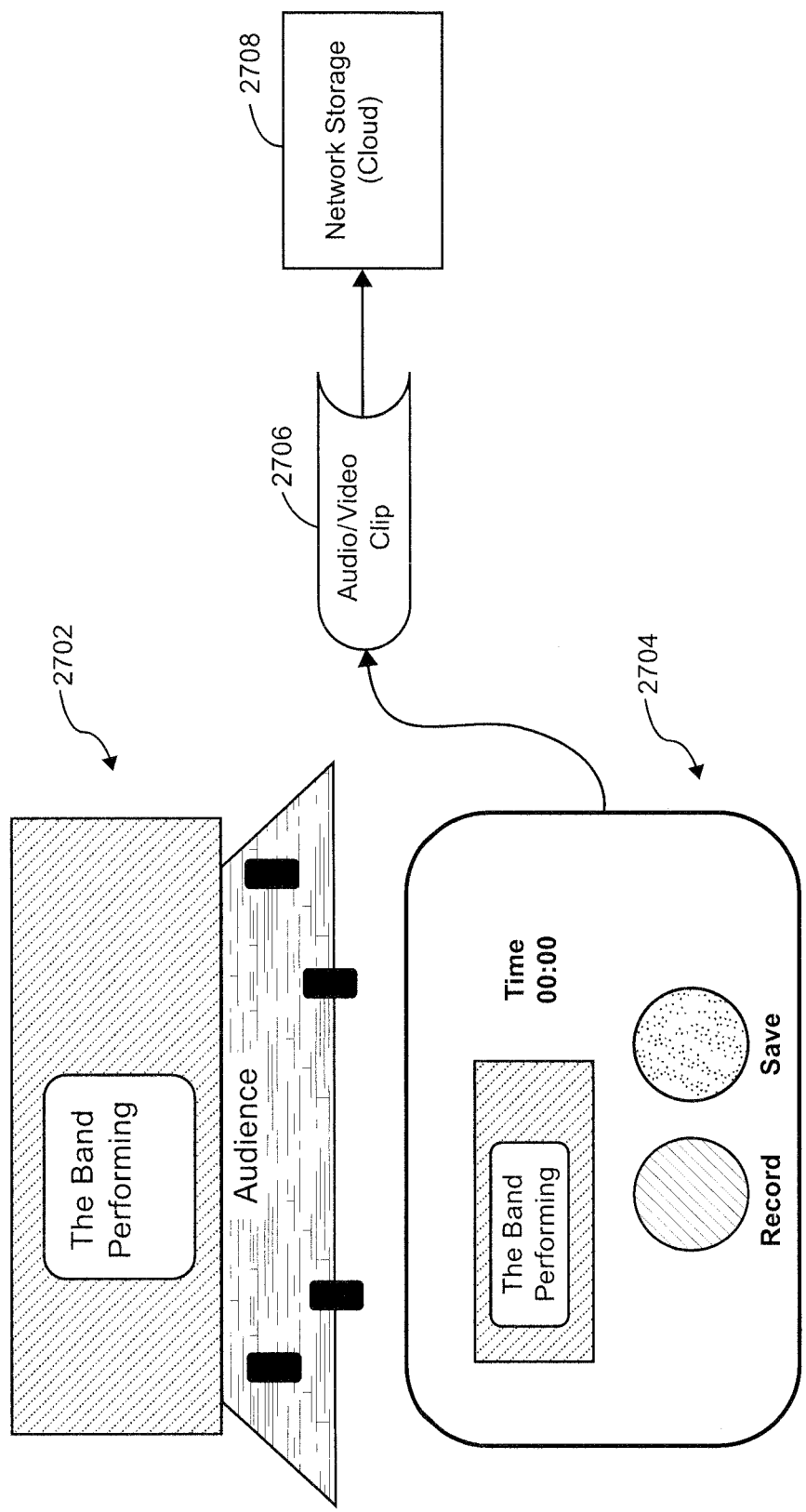
FIG. 27 is a simplified schematic view of a mobile user using a mobile application to record a portion of a performance in accordance with certain exemplary embodiments.

FIG. 27 is a simplified schematic view of a mobile user using a mobile application to record a portion of a performance in accordance with certain exemplary embodiments. A venue 2702 as shown in FIG. 27 shows a band performing before an audience, with multiple speakers provided in the location. A mobile user using a mobile device 2704 may be able to record video of the band performing. A time or other counter may indicate how much of the event has been recorded, e.g., after the user presses a record or other similar button. The user may press a save or other similar button to cause the mobile device to transmit an audio/video clip 2706 to a network storage location 2708. In certain exemplary embodiments, the audio/video data may instead be streamed to the network storage location 2708.

Thus, using a specialized recording application on a mobile device, a patron may select the record feature and, if the user has been authorized to take a recording, either through the purchase of recording rights or, because of the performance being available at no charge from the performer, the mobile device may begin recording all video and audio subject to a potential time restriction. Users may be instructed to begin recording no more than X seconds before song, and to end recording no more than Y seconds following a song (which may be an automatic cutoff in some instances). Alternatively, or in addition, some performances may allow for recording without song delimitation restrictions, but rather allowing a contiguous segment, or continuous segments of a performance.

Figure 28:
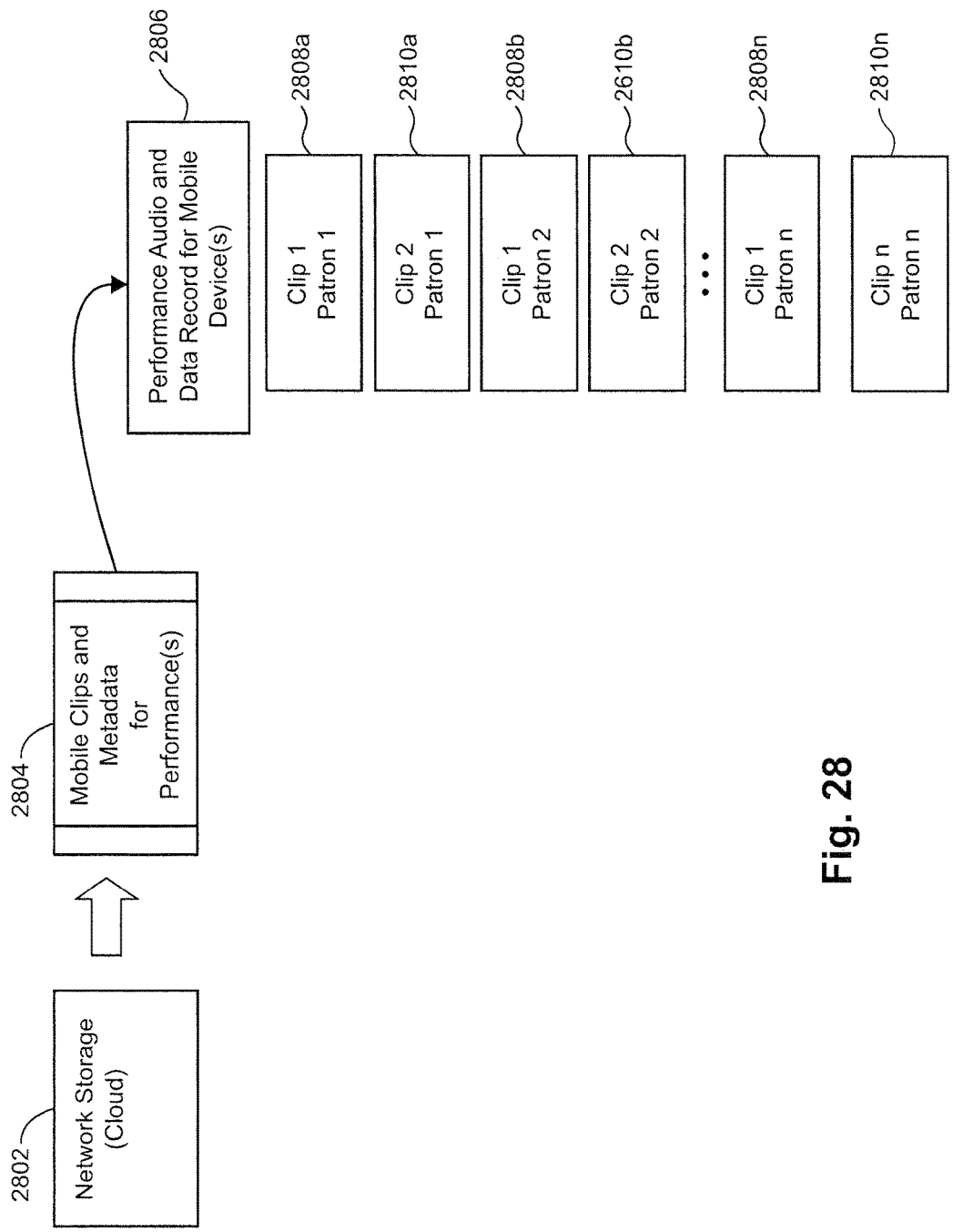
FIG. 28 is a partial schematic view of a performance archive for user-based recordings in accordance with certain exemplary embodiments.

FIG. 28 is a partial schematic view of a performance archive for user-based recordings in accordance with certain exemplary embodiments. As shown in FIG. 28, the network storage location 2802 may include mobile clips and/or associated metadata 2804 for one or more performances. The storage format (e.g., the database) and/or the metadata stored therein may be similar to that described above, e.g., in connection with FIG. 26, for each performance audio and data record 2806. In addition, or in the alternative, unique clip and/or patron identifiers may be provided. As shown in FIG. 28, for example, multiple clips 2808 and 2810 are provided for multiple patrons a-n. The database may be organized such that clips for common events are stored in close relative proximity to one another (e.g., in a common table or common directory), or otherwise linked together, in certain exemplary embodiments. Similarly, clips for a single user may be stored in close relative proximity to one another (e.g., in a common table or common directory), or otherwise linked together, in certain exemplary embodiments.

For each mobile device equipped with the specialized application and the appropriate rights to record, each recorded segment from the pressing of the record to the pressing of the and record button may have the video and audio submitted to the network storage cloud service. The video resolution and audio quality of the submissions may vary because of the capabilities of the mobile device or the bandwidth necessary to transfer this data. Submissions may be archived, e.g., by performance and possibly in time sequence or other order, as they are received in certain exemplary embodiments. The indexing and archiving may be sufficiently capable of conveying an indication as to the general time the recording was made to facilitate matching. These archives may be treated as individual clips, and may be matched against the stored uploaded performance audio data received.

Figure 29:
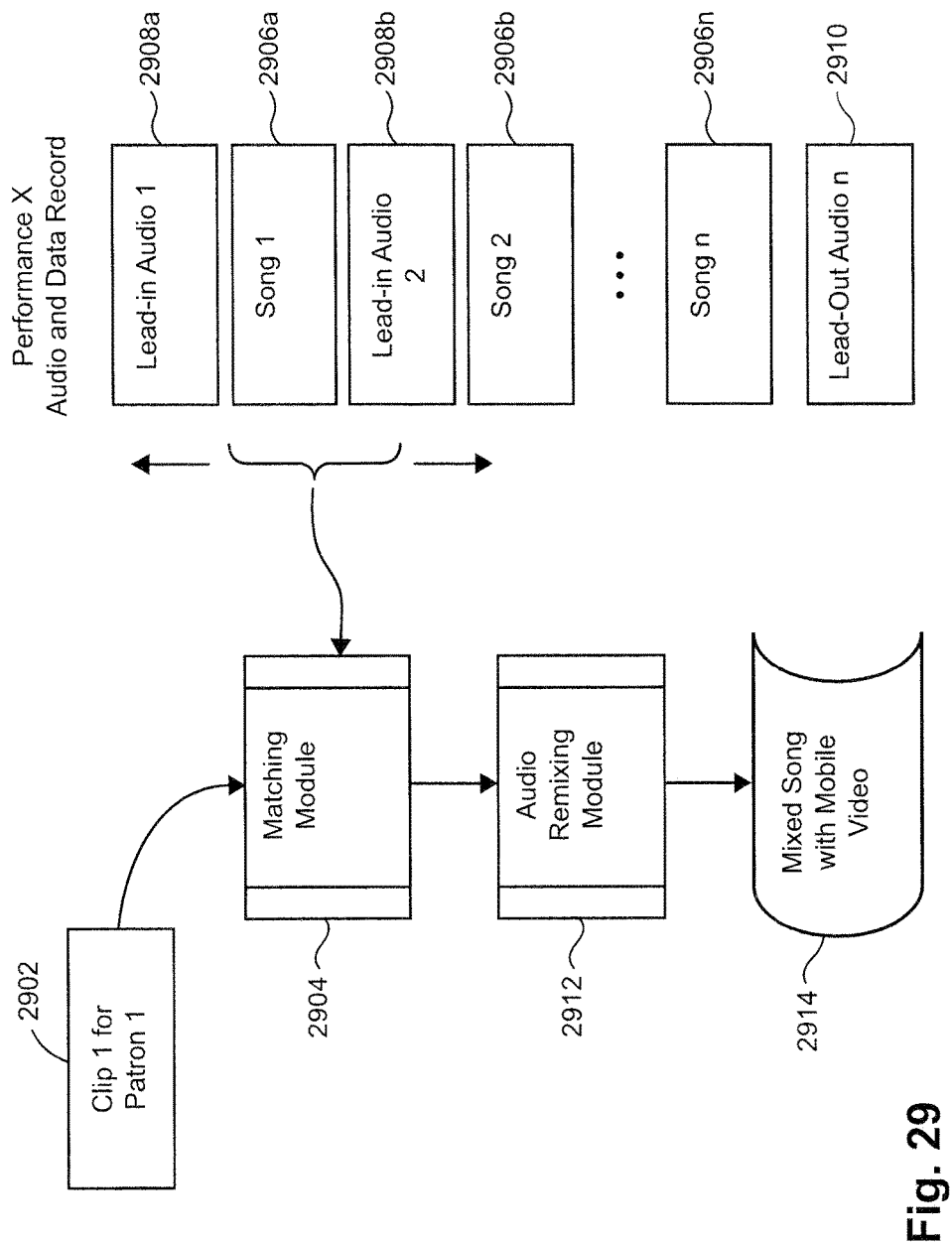
FIG. 29 is a schematic view showing mobile audio clip matching and re-mixing techniques in accordance with certain exemplary embodiments.

FIG. 29 is a schematic view showing mobile audio clip matching and re-mixing techniques in accordance with certain exemplary embodiments. As is shown in FIG. 29, a first clip for a first patron 2902 undergoes a matching process executed via a matching module 2904 of a computer system (e.g., which includes at least one processor and a memory for executing instructions tangibly stored on a computer readable storage medium). The matching module 2904 attempts to find a song 2906 and any related lead-in or lead-out data 2908 and 2910. As shown in the FIG. 29 example, the data for a specific performance (Performance X) may be retrieved and searched. This may be facilitated by metadata associated with the clip, e.g., including some or all of the performance name/identifier, date, time, and/or other informational aspects. In the FIG. 29 example, the matching module 2904 determines that the first clip for the first patron 2902 corresponds to song 1 28906*a* and a portion of the lead-in audio 2908*b* for the second song 2906*b*. That information to be passed to the audio remixing module 2912, which can then retrieve the high quality audio for the first song 2906*a* and optionally pre-pend the proper lead-in audio 2908*a*. The lead-in audio 2908*b* for the second song 2906*b* may be removed. The mixing may take from 0-100% of the ambient background recording from the clip and/or from other sources and mix it with appropriate amounts (0-100%) of the high quality sources. The newly re-mixed audio may be combined with video from the patron and used to generate a mixed song with mobile video 2914. This new work may be downloaded or otherwise made available to the user and/or others. It is noted that some or all of this and/or other processing may be performed in the cloud.

Once the new video was created through a remix of the audio from the uploaded source and the mobile submitted source, the new video may be stored on a cloud server with a unique address (e.g., GUID). In some cases, the video may be controlled by the performer and only accessible through a subsequent transaction. For instance, the patron who had purchased the rights to record one or more segments of the performance may have access via a credential authentication to stream this clip to any device that supports authentication and audio/video playback.

In some circumstances, the performer may be willing to relinquish the rights to control the new video creation and would allow the actual file to be downloaded rather than streamed, e.g., upon the payment of an additional fee. For instance, a user-recorder may be incentivized to sell his/her recording by being rewarded with some monetary credit based on downloads of his/her recording. In other cases, the user-recorder may receive no credit, but rather licensing fees charged to community downloaders may be transferred to the original rights holder(s) and/or facilitators of the upload/download/matching system. These and/or other revenue sharing schemes also may be made available for the karaoke-jukebox embodiments discussed above.

Figure 30:
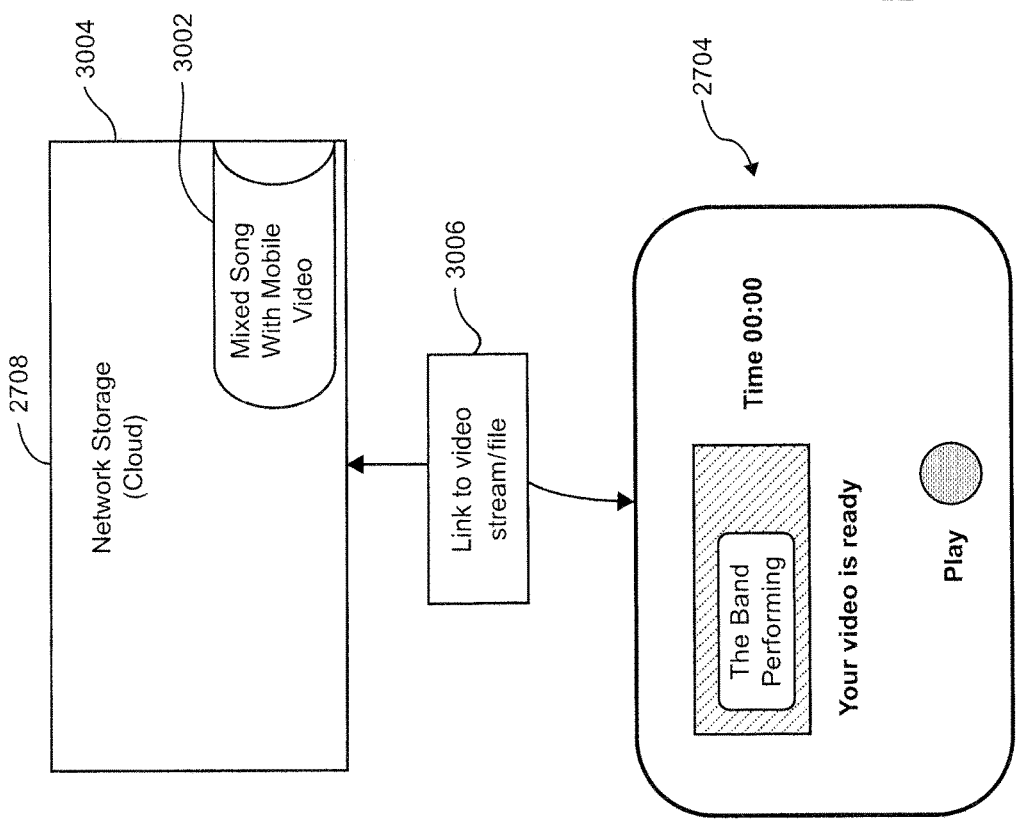
FIG. 30 is a schematic view showing a mobile video file being viewed from a cloud or other network location in accordance with certain exemplary embodiments.

FIG. 30 is a schematic view showing a mobile video file being viewed from a cloud or other network location in accordance with certain exemplary embodiments. Unlike in FIG. 27, the mobile device 2704 is shown in a playback or "media ready" mode, e.g., after the audio and/or video clips are matched and mixed, and a coherent audio and/or video clip is generated. In that regard, the user may access the mixed song with the mobile video 3002 from the network storage location 3004 by accessing a link to the video stream or file 3006. In certain exemplary embodiments, the combined video may not be generated until requested by a user.

Although this may require temporary bursts of processing power, space savings may be generated, as not all clips would need to be combined immediately. In certain exemplary embodiments, a user may be allowed to select which one or more audio clips are to be combined with which one or more video clips, etc., specify levels for high quality audio versus mobile audio, etc. The process to match the uploaded performance with the submitted mobile video clip may take some time. In some instances, the uploaded performance may only be available hours or even days following the performance.

Particular hardware combinations and configurations are disclosed which represent only one way which the embodiments may be constructed, and other combinations and configurations may be used in different exemplary embodiments. For instance, central servers may, in some exemplary embodiments, be comprised of one or more servers acting together or separately to coherently provide the full range of services necessary to enable a functioning jukebox. For example, a cluster of servers may comprise a virtual central server, with one server providing media, another tracking membership, still another processing licensing, etc.

Similarly, the local servers described herein may be incorporated into the jukeboxes. For example, the local servers may appear to function independently, even though they exist as part (e.g. partition) of an integrated mass storage device within the jukebox. Indeed, as hard disks become larger and less expensive, they may preferably serve the functions of local servers.

Also, although the term "song" has been used sometimes in the above-description, this term is not intended to be limiting to the scope of the invention, and any instance or instances of media (e.g., song, video, song/video combination, data, information etc.) can be used in any embodiment herein and still fall within the intended scope of the invention.

It will be appreciated that the screen shots and software arrangements presented herein are only one exemplary method for organizing and displaying the features disclosed herein. Other configurations are possible and are therefore contemplated herein. In this vein, the techniques disclosed herein may be implemented by any suitable combination of hardware, software, firmware, and/or the like. The various modules, arrangements, programs, etc., may be implemented in these and/or other ways.

While the preferred aspects of the invention have been illustrated and described herein, it will be apparent to one of ordinary skill in the art that various changes and/or modifications can be made. Thus, the specific description herein is meant to be exemplary only and is not intended to limit the invention beyond the terms of appended claims.

What is claimed is:

1. A digital jukebox device provided in an out-of-home pay-for-play location, comprising:
   at least one processor and a memory;
   a fee collection mechanism configured to receive payment in exchange for credits usable on the digital jukebox device to play songs;
   a non-transitory computer readable storage medium storing songs available for playback via the digital jukebox device;
   a display;
   a camera; and
   a user interface controllable in connection with the at least one processor and configured to operate in at least first and second modes in connection with the display,
   wherein the first mode is configured to enable users to select songs for playback via the digital jukebox device in exchange for credits,
   wherein the second mode is configured to enable users to use the camera, while the digital jukebox device coordinates playback of songs selected while the user interface was operating in the first mode, to take pictures, and wherein the user interface, when operating in the second mode, is further configured to exit the second mode and enter the first mode, after a predetermined amount of time has been spent in the second mode.

2. The digital jukebox device of claim 1, wherein user interface elements provided in the first mode are not visible while the user interface is operating in the second mode in order to prevent selection of further songs for playback.

3. The digital jukebox device of claim 1, wherein a printer is located in the out-of-home location and operably connected to the digital jukebox device, the printer being configured to print pictures taken via the camera of the digital jukebox device for a fee, the fee being payable with credits.

4. The digital jukebox device of claim 1, wherein the user interface, when operating in the second mode, is further configured to enable users to specify a digital location to which pictures should be digitally transmitted.

5. The digital jukebox device of claim 4, wherein the digital location is an email address.

6. The digital jukebox device of claim 4, wherein the digital location is an MMS message destination.

7. The digital jukebox device of claim 4, wherein the digital location is a social networking site.

8. The digital jukebox device of claim 1, further comprising lighting elements configured to act as a flash for the camera when the user interface is operating in the second mode.

9. The digital jukebox device of claim 8, further comprising program logic configured to (a) determine characteristics of the environment in which the digital jukebox device is provided, (b) calculate an offset for the lighting elements optimized for the environment based on the determination, and (c) adjust the flash using the offset when taking pictures.

10. The digital jukebox device of claim 1, wherein the user interface, when operating in the second mode, is further configured to show a preview of a picture that has been taken.

11. The digital jukebox device of claim 10, wherein the preview comprises a digital proof sheet comprising plural pictures taken in succession.

12. The digital jukebox device of claim 10, wherein the user interface, when operating in the second mode, is further configured to enable a user to select one or more digital effects to be applied to a picture and to adjust the preview in accordance with the one or more selected digital effects.

13. A method of operating a digital jukebox device provided in an out-of-home pay-for-play location, the method comprising:
receiving payment in exchange for credits usable on the digital jukebox device to play songs;
playing back, via the digital jukebox device, songs from a queue of selected songs;
receiving input via a user interface that is operable in at least first and second modes, wherein songs from the queue are playable regardless of the mode in which the user interface is operating;
in response to input received during the first mode, adding a user-selected song to the queue in exchange for a predetermined number of credits;
in response to input received during second mode, causing a camera provided to the digital jukebox device to take a picture; and
causing the user interface to exit the second mode and enter the first mode, after a predetermined amount of time has been spent in the second mode.

14. The method of claim 13, further comprising printing the picture to a printer located in the out-of-home location in exchange for a second predetermined number of credits.

15. The method of claim 13, further comprising digitally transmitting the image to a user-specified location, the user user-specified location being an email address, MMS message destination, and/or social networking site.

16. The method of claim 13, further comprising:
determining characteristics of the environment in which the digital jukebox device is provided;
calculating an offset for lighting elements integral with the digital jukebox device based on the determination, the offset being applicable to the lighting elements in order to improve picture quality; and
controlling the lighting elements using the offset to serve as a flash when taking pictures.

17. The method of claim 13, further comprising displaying a preview of a picture that has been taken.

18. The method of claim 17, wherein the preview comprises a digital proof sheet comprising plural pictures taken in succession.

19. The method of claim 17, further comprising:
applying to the picture one or more user-selected digital effects; and
adjusting the display of the preview in accordance with the one or more user-selected digital effects.

20. The method of claim 13, further comprising adding pictures that have been taken to an attract loop of the digital jukebox device.

21. The method of claim 13, further comprising associating a picture that has been taken with a registered user of the digital jukebox device such that the associated picture is used as an avatar for the digital jukebox device.

22. A non-transitory computer readable storage medium tangibly storing instructions that, when performed using a processor of a digital jukebox device provided in an out-of-home pay-for-play location, control the digital jukebox device to at least:
receive payment in exchange for credits usable on the digital jukebox device to play songs;
play back, via the digital jukebox device, songs from a queue of selected songs;
receive input via a user interface that is operable in at least first and second modes, wherein songs from the queue are playable regardless of the mode in which the user interface is operating;
in response to input received during the first mode, add a user-selected song to the queue in exchange for a predetermined number of credits;
in response to input received during second mode, cause a camera provided to the digital jukebox device to take a picture; and
cause the user interface to exit the second mode and enter the first mode, after a predetermined amount of time has been spent in the second mode.

23. The non-transitory computer readable storage medium of claim 22, further comprising instructions that control the digital jukebox device to at least cause the picture to be printed via a printer located in the out-of-home location and/or digitally transmit the image to a user-specified location, in exchange for a second predetermined number of credits.

24. The non-transitory computer readable storage medium of claim 22, further comprising instructions that control the digital jukebox device to at least:
determine characteristics of the environment in which the digital jukebox device is provided;

calculate an offset for lighting elements integral with the digital jukebox device based on the determination, the offset being applicable to the lighting elements in order to improve picture quality; and control the lighting elements using the offset to serve as a flash when taking pictures.

25. The non-transitory computer readable storage medium of claim 22, further comprising instructions that control the digital jukebox device to at least add pictures that have been taken to an attract loop of the digital jukebox device, provided that the users who took the pictures do not opt out of having their pictures added to the attract loop.

\* \* \* \* \*